(12) United States Patent
Mikami et al.

(10) Patent No.: US 9,379,582 B2
(45) Date of Patent: Jun. 28, 2016

(54) ROTOR, MOTOR AND METHOD FOR MANUFACTURING ROTOR

(71) Applicant: ASMO CO., LTD., Shizuoka-ken (JP)

(72) Inventors: Koji Mikami, Kosai (JP); Yoji Yamada, Hamamatsu (JP); Shigemasa Kato, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 375 days.

(21) Appl. No.: 13/953,549

(22) Filed: Jul. 29, 2013

(65) Prior Publication Data

US 2014/0035422 A1    Feb. 6, 2014

(30) Foreign Application Priority Data

| Jul. 31, 2012 | (JP) | ................................. 2012-170325 |
| Jan. 25, 2013 | (JP) | ................................. 2013-012341 |
| Jan. 25, 2013 | (JP) | ................................. 2013-012343 |
| Mar. 26, 2013 | (JP) | ................................. 2013-064335 |
| Jun. 26, 2013 | (JP) | ................................. 2013-134161 |

(51) Int. Cl.
  *H02K 21/12* (2006.01)
  *H02K 1/27* (2006.01)
  (Continued)

(52) U.S. Cl.
  CPC ............ *H02K 1/2713* (2013.01); *H02K 1/2706* (2013.01); *H02K 15/03* (2013.01); *H02K 29/03* (2013.01); *H02K 1/2766* (2013.01)

(58) Field of Classification Search
  CPC . H02K 1/2706; H02K 1/2713; H02K 1/2766; H02K 29/03; H02K 15/03
  USPC .................... 310/156.69, 156.71–156.73, 263
  See application file for complete search history.

(56) References Cited

U.S. PATENT DOCUMENTS

| 6,239,519 B1 * | 5/2001 | Kaelberer | ................ H02K 1/32 310/263 |
| 8,890,386 B2 * | 11/2014 | Morita | ..................... H02K 1/27 310/156.66 |

(Continued)

FOREIGN PATENT DOCUMENTS

| EP | 2157679 A1 | 2/2010 |
| JP | H03-39355 U | 4/1991 |

(Continued)

OTHER PUBLICATIONS

Japanese Office Action of JP 2013-012343 dated Apr. 26, 2016 with its English Translation.
Japanese Office Action of JP 2013-012341 dated May 10, 2016 with its English Translation.

*Primary Examiner* — Thanh Lam
(74) *Attorney, Agent, or Firm* — Christensen Fonder P.A.

(57) ABSTRACT

A motor includes a shaft, a rotor, and a stator. The rotor includes first and second rotor cores, and a field magnet. Second claw magnetic pole portions of second rotor core are arranged between first claw magnetic pole portions of the first rotor core. The field magnet causes the first claw magnetic pole portions to function as first magnetic poles, and the second claw magnetic pole portions to function as second magnetic poles. Radially inner surfaces of the teeth of a stator core face radially outer surfaces of the first and second claw magnetic poles. Either radially outer surfaces of the first and second claw magnetic pole portions or radially inner surfaces of the teeth each have a cross-sectional shape in a direction orthogonal to the axial direction that is not concentric to a circle of which center is an axis of the rotation shaft.

23 Claims, 37 Drawing Sheets

(51) Int. Cl.
*H02K 29/03* (2006.01)
*H02K 15/03* (2006.01)

(56) References Cited

U.S. PATENT DOCUMENTS

2009/0218907 A1* 9/2009 Kusase ............... H02K 21/044
310/263
2013/0300242 A1 11/2013 Yamada et al.

FOREIGN PATENT DOCUMENTS

| JP | H04-61471 U | 5/1992 |
| JP | 5-43749 U | 6/1993 |
| JP | H09-327139 A | 12/1997 |
| JP | H11-18326 A | 1/1999 |
| JP | 2000-166135 A | 6/2000 |
| JP | 2005-094901 A | 4/2005 |
| JP | 2012115085 A | 6/2012 |

* cited by examiner

ROTOR, MOTOR AND METHOD FOR MANUFACTURING ROTOR

BACKGROUND OF THE INVENTION

The present invention relates to a rotor, a motor, and a method for manufacturing a rotor.

Japanese Laid-Open Utility Model Publication No. 5-43749 proposes a brushless motor that employs a magnetic field Lundell type rotor. The Lundell type rotor has a structure in which a magnet is arranged between two rotor cores formed from the same material and having identical shape. This obtains a superior structure that is simple and compact.

When the brushless motor is used in a device that requires a position retaining function, a large detent torque is necessary. However, the brushless motor that employs a magnetic field Lundell type rotor has a structure in which claw magnetic poles of a rotor core are opposed to the teeth of a stator core. Thus, in the brushless motor that employs a magnetic field Lundell type rotor, the detent torque is small. This is disadvantageous in that a retaining force for retaining the stationary motor in position is weak.

SUMMARY OF THE INVENTION

It is an object of the present invention to provide a Lundell type rotor that increases the detent torque and provides a magnetic field having a strong retaining force, a motor, and a method for manufacturing a rotor core.

To achieve the above object, a first aspect of the present invention is a motor including a rotation shaft, a rotor, and a stator. The rotor includes a first rotor core, a second rotor core, and a field magnet. The first rotor core includes a first core base, which is fixed to the rotation shaft, and a plurality of first claw magnetic pole portions, which are arranged at equal intervals on an outer circumferential portion of the first core base and extend in an axial direction from the outer circumferential portion. The second rotor core includes a second core base, which is fixed to the rotation shaft, and a plurality of second claw magnetic pole portions, which are provided at equal intervals on an outer circumferential portion of the second core base and extend in the axial direction from the outer circumferential portion. Each of the second claw magnetic pole portions is arranged between the first claw magnetic pole portions that are adjacent to each other in a circumferential direction. The field magnet is arranged between the first core base and the second core base. The field magnet is magnetized along the axial direction so that the first claw magnetic pole portions function as first magnetic poles and the second claw magnetic pole portions function as second magnetic poles. The stator includes a stator core and a coil. The stator core is arranged at an outer side of the rotor and including a plurality of teeth arranged at equal intervals along the circumferential direction. Radially inner surfaces of the plurality of teeth face radially outer surfaces of the first and second claw magnetic poles. The coil is wound around each of the teeth. The coil generates a rotating magnetic field when supplied with power. At least either the radially outer surfaces of the first claw magnetic pole portions and the second claw magnetic pole portions or the radially inner surfaces of the teeth each have a cross-sectional shape in a direction orthogonal to the axial direction that is not concentric to a circle of which center is an axis of the rotation shaft.

A second aspect of the present invention is a rotor including a first rotor core, a second rotor core, a field magnet, and a retaining force formation member. The first rotor core includes a first core base, fixed to a rotation shaft, and a plurality of first claw magnetic pole portions, arranged at equal intervals on an outer circumferential portion of the first core base and extending in an axial direction from the outer circumferential portion. The second rotor core includes a second core base, fixed to the rotation shaft, and a plurality of second claw magnetic pole portions, arranged at equal intervals on an outer circumferential portion of the second core base and extending in the axial direction from the outer circumferential portion. Each of the second claw magnetic pole portions is arranged between the first claw magnetic pole portions that are adjacent to each other in a circumferential direction. A field magnet is arranged between the first core base and the second core base. The field magnet is magnetized along the axial direction so that the first claw magnetic pole portions function as first magnetic poles and the second claw magnetic pole portions function as second magnetic poles. A retaining force formation member is fitted onto radially outer surfaces of the first claw magnetic pole portions and the second claw magnetic pole portions. A radially outer surface of the retaining force formation member includes a plurality of regional surfaces respectively opposing the radially outer surfaces of the first claw magnetic pole portions and the second claw magnetic pole portions. Each of the regional surfaces has a cross-sectional shape in a direction orthogonal to the axial direction that is not a concentric to a circle of which center is an axis of the rotation shaft.

A third aspect of the present invention is a rotor including a first rotor core, a second rotor core, a field magnet, a first plate, a second plate, and a retaining force formation bar. The first rotor core includes a first core base, fixed to a rotation shaft, and a plurality of first claw magnetic pole portions, arranged at equal intervals on an outer circumferential portion of the first core base and extending in an axial direction from the outer circumferential portion. The second rotor core includes a second core base, fixed to the rotation shaft, and a plurality of second claw magnetic pole portions, arranged at equal intervals on an outer circumferential portion of the second core base and extending in the axial direction from the outer circumferential portion. Each of the second claw magnetic pole portions is arranged between ones of the first claw magnetic pole portions that are adjacent to each other in a circumferential direction. The field magnet is arranged between the first core base and the second core base. The field magnet is magnetized along the axial direction so that the first claw magnetic pole portions function as first magnetic poles and the second claw magnetic pole portions function as second magnetic poles. The first plate is arranged on an axially outer surface of the first core base. The second plate is arranged on an axially outer surface of the second core base. The retaining force formation bar connects a radially outer circumferential edge portion of the first plate and a radially outer circumferential edge portion of the second plate to cover part of the radially outer surfaces of the first and second claw magnetic pole portions.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A brushless motor according to a first embodiment of the present invention will now be described with reference to FIGS. 1 to 5.

Figure 1:
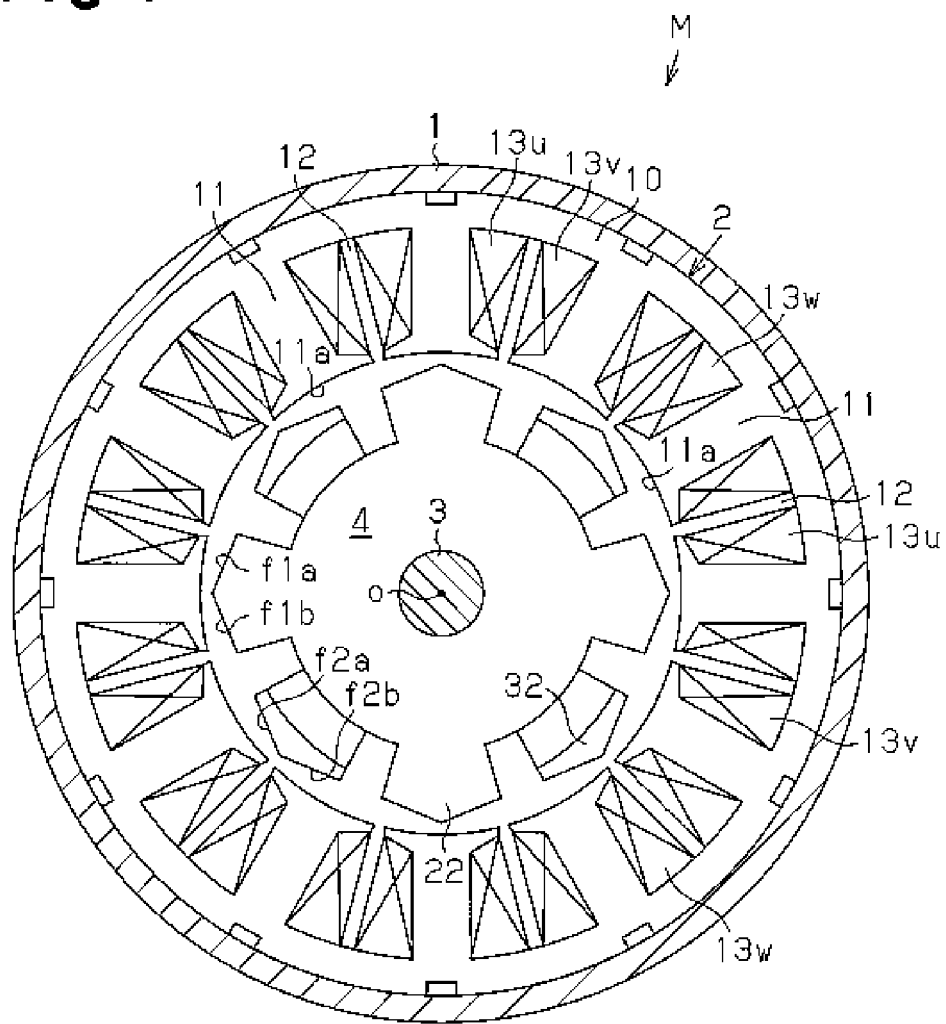
FIG. 1 is a cross-sectional view of a brushless motor according to a first embodiment of the present invention as viewed in an axial direction.

As shown in FIG. 1, a brushless motor M has a stator 2 fixed to an inner circumferential surface of a motor housing 1. A rotor 4 fixed to a rotation shaft 3 and rotated integrally with the rotation shaft 3 is arranged in the stator 2.

(Stator 2)

The stator 2 includes a cylindrical stator core 10, and an outer circumferential surface of the stator core 10 is fixed to the motor housing 1. Teeth 11 are formed in the stator core 10 along an axial direction and arranged in a circumferential direction at equal intervals. The teeth 11 are extended toward a radially inner side. Each tooth 11 is T-shaped and includes an inner circumferential surface 11a in the radial direction that is an arcuate surface obtained by extending an arc concentric to a circle of which center is an axis O of the rotation shaft 3 in the axial direction.

A stator slot 12 is formed between two teeth 11. In the present embodiment, the number of the teeth 11 is twelve, and the number of the stator slots 12 is twelve, which is the same as the number of the teeth 11. Three-phase coils are wound as a concentrated winding on the twelve teeth 11, specifically, a U-phase coil 13u, a V-phase coil 13v, and a W-phase coil 13w are wound in this order on each of the teeth 11 in a circumferential direction.

Further, by applying a three-phase power source voltage to each of the wound phase coils 13u, 13v, 13w, a rotating magnetic field is formed in the stator 2 so that the rotor 4 arranged at the inner side of the stator 2 and fixed to the rotation shaft 3 rotates forward (clockwise direction as viewed in FIG. 1) and backward (counterclockwise direction as viewed in FIG. 1).

Figure 2:
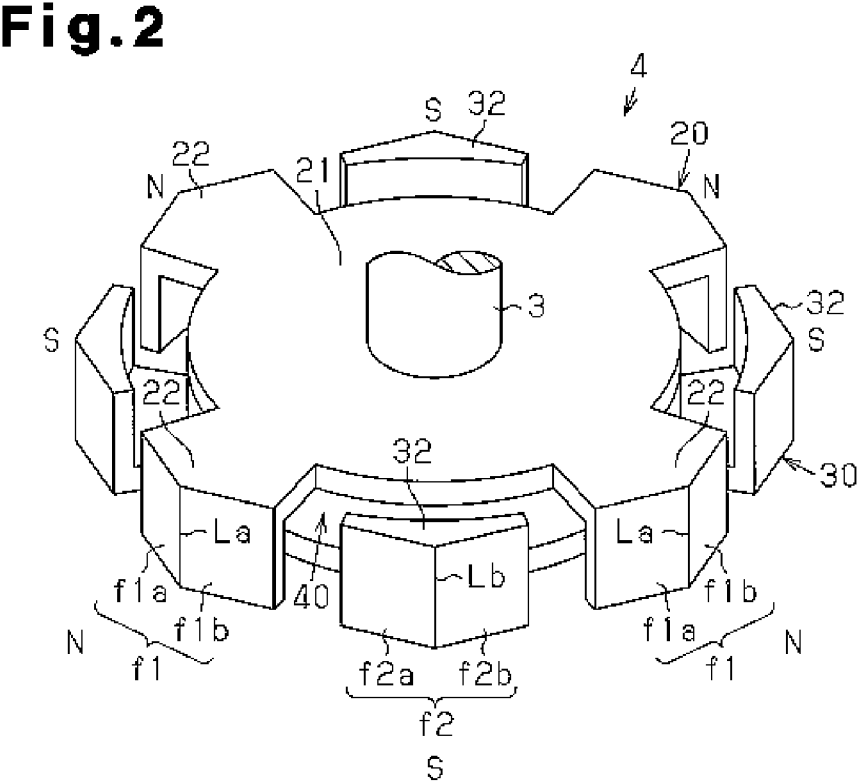
FIG. 2 is a perspective view of a rotor of FIG. 1 as viewed in the axial direction.
Figure 3:
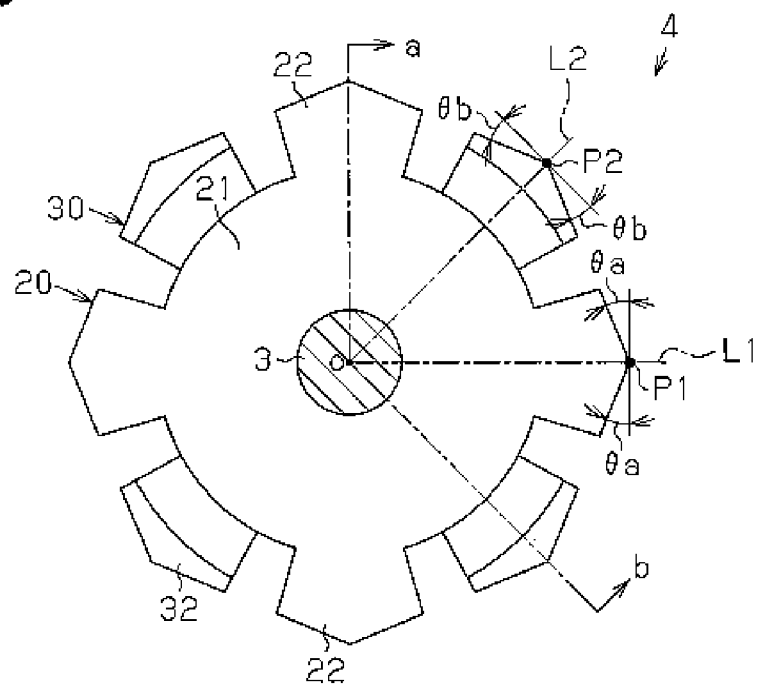
FIG. 3 is a front view of the rotor of FIG. 2 as viewed in the axial direction.
Figure 4:
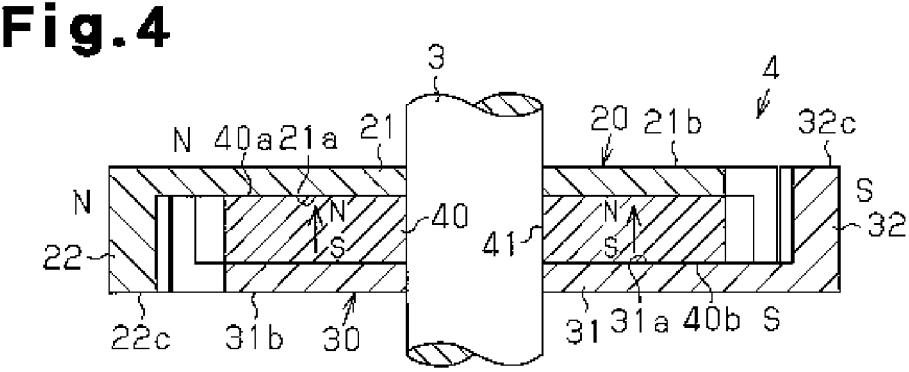
FIG. 4 is a combined cross-sectional view taken along line a-o-b in FIG. 3.
Figure 5:
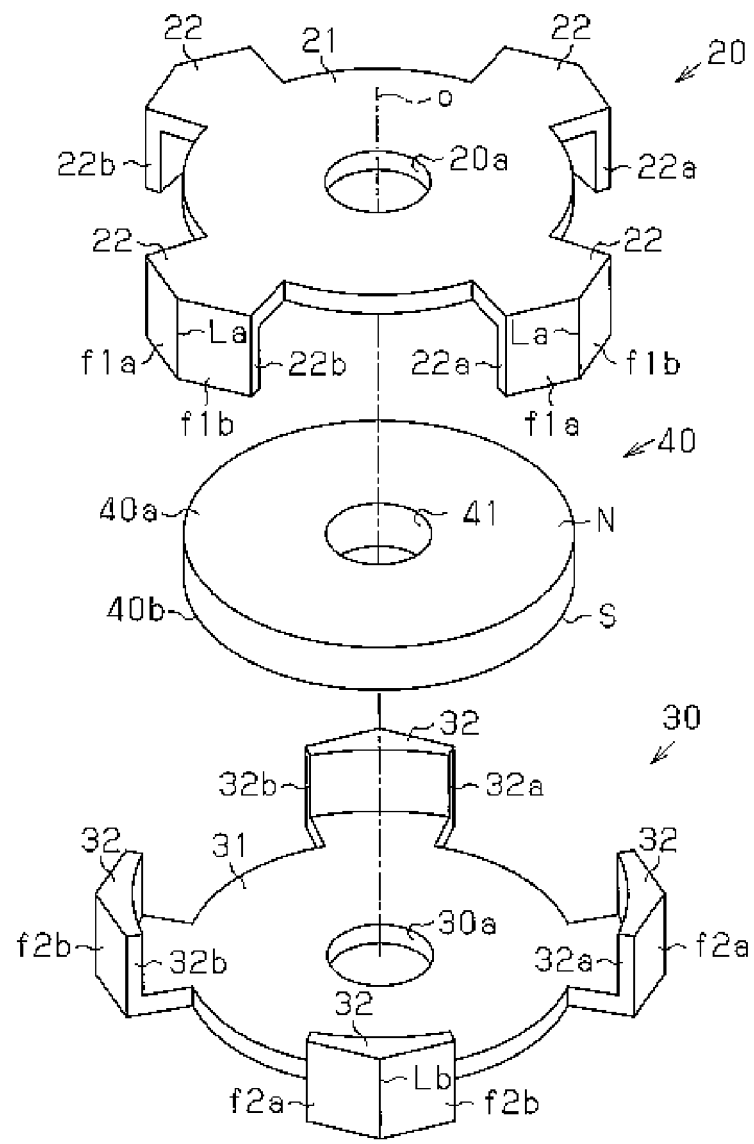
FIG. 5 is an exploded perspective view of the rotor of FIG. 2.

As shown in FIG. 2 to FIG. 5, the rotor 4 arranged at the inner side of the stator 2 includes first and second rotor cores 20, 30, and an annular magnet 40 as a field magnet (refer to FIG. 4 and FIG. 5).

(First Rotor Core 20)

As shown in FIG. 5, the first rotor core 20 includes a first core base 21 formed in a substantially disk shape and having an insertion hole 20a, into which the rotation shaft 3 is inserted and fixed, and a plurality (four in the present embodiment) of first claw magnetic pole portions 22 arranged at equal intervals on an outer circumferential portion of the first core base 21. Each of the first claw magnetic pole portions 22 is formed to protrude to a radially outer side and extend in the axial direction.

Two circumferential end surfaces 22a, 22b of each first claw magnetic pole portion 22 are flat surfaces that extend in a radial direction (not inclined relative to the radial direction as viewed in the axial direction). Further, an angle of each first claw magnetic pole portion 22 in the circumferential direction, that is, an angle between the two circumferential end surfaces 22a, 22b is set to be smaller than an angle of a gap between adjacent ones of the first claw magnetic pole portions 22 in the circumferential direction.

Further, as shown in FIG. 2, a radially outer surface f1 of each first claw magnetic pole portion 22 includes two flat surfaces, namely, a first flat surface f1a and a second flat surface f1b.

More specifically, as shown in FIG. 3, in the radially outer surface f1 of the first claw magnetic pole portion 22, a point that intersects with a linear center line L1 extending through a middle position of the first claw magnetic pole portion 22 in the circumferential direction from an axis O of the rotation shaft 3 is referred to as a peak P1. A line extended from the peak P1 in an axial direction parallel to the axis O of the rotation shaft 3 is referred to as a ridgeline La (refer to FIG. 2 and FIG. 5). Using the ridgeline La as a boundary, cutting is performed toward the radially inner side in a clockwise side and in a counterclockwise side with the same inclination angle θa. Further, using the ridgeline La as the boundary, a surface cut in the clockwise side is referred to as the first flat surface f1a. A surface cut in the counterclockwise side is referred to as the second flat surface f1b.

Accordingly, the radially outer surface f1 of the first claw magnetic pole portion 22 is bulged so that the ridgeline La is the topmost portion closest to the stator 2, and the clockwise side and the counterclockwise side from the ridgeline La become farther from the stator 2. That is, the radially outer surface f1 of the first claw magnetic pole portion 22 has a cross-sectional shape in a direction orthogonal to the axial direction that is not concentric to a circle shape of which center is the axis O of the rotation shaft 3.

(Second Rotor Core 30)

As shown in FIG. 5, the second rotor core 30 has an identical shape as the first rotor core 20. The second rotor core 30 includes a substantially disk-shaped second core base 31 having an insertion hole 30a into which the rotation shaft 3 is inserted and fixed, and four second claw magnetic pole portions 32 arranged at equal intervals at an outer circumferential portion of the second core base 31. Each of the second claw magnetic pole portions 32 is formed to protrude to the radially outer side and extend in the axial direction.

Two circumferential end surfaces 32a, 32b of each second claw magnetic pole portion 32 are flat surfaces that extend in the radial direction. Further, an angle of each second claw magnetic pole portion 32 in the circumferential direction, that is, an angle between the two end surfaces 32a, 32b in the circumferential direction is set to be smaller than an angle of a gap between adjacent ones of the second claw magnetic pole portions 32 that are adjacent in the circumferential direction.

Further, as shown in FIG. 2, a radially outer surface f2 of each second claw magnetic pole portion 32 includes two flat surfaces, namely, a first flat surface f2a and a second flat surface f2b.

More specifically, as shown in FIG. 3, in the radially outer surface f2 of the second claw magnetic pole portion 32, a point that intersects with a linear center line L2 extending through a middle position of the second claw magnetic pole portion 32 in the circumferential direction from the axis O of the rotation shaft 3 is referred to as a peak P2. A line extended from the peak P2 in the axial direction parallel to the axis O of the rotation shaft 3 is referred to as a ridgeline Lb (refer to FIG. 2 and FIG. 5). Using the ridgeline Lb as a boundary, cutting is performed toward the radially inner side in the clockwise side and in the counterclockwise side with the inclination angle θb (=θa). Further, using the ridgeline Lb as the boundary, a surface cut in the clockwise side is referred to as the first flat surface f2a. A surface cut in the counterclockwise side with the ridgeline Lb as the boundary is referred to as the second flat surface f2b.

Accordingly, the radially outer surface f2 of the second claw magnetic pole portion 32 is bulged so that the ridgeline Lb is the topmost portion closest to the stator 2, and the clockwise side and the counterclockwise side from the ridgeline Lb become farther from the stator 2. That is, the radially outer surface f2 of the second claw magnetic pole portion 32 has a cross-sectional shape in a direction orthogonal to the axial direction that is not concentric to a circle shape of which center is the axis O of the rotation shaft 3.

Further, each of the second claw magnetic pole portions 32 of the second rotor core 30 is arranged between corresponding ones of the first claw magnetic pole portions 22. Here, the second rotor core 30 is coupled to the first rotor core 20 such that an annular magnet 40 (refer to FIG. 4) is arranged (sandwiched) between the first core base 21 and the second core base 31 in the axial direction.

More specifically, as shown in FIG. 4, the annular magnet 40 is sandwiched between a surface of the first core base 21 on a second core base 31 side (opposed surface 21a) and a surface of the second core base 31 on a first core base 21 side (opposed surface 31a).

The circumferential end surface 22a of each first claw magnetic pole portion 22 on one side and the circumferential end surface 32b of each second claw magnetic pole portion 32 on the other side are parallel in the axial direction. Thus, a gap between the two end surfaces 22a, 32b is formed to be substantially linear along the axial direction. Further, the circumferential end surface 22b of each first claw magnetic pole portion 22 on the other side and the circumferential end surface 32a of each second claw magnetic pole portion 32 on the one side are formed to be parallel along the axial direction. Thus, a gap between the two end surfaces 22b, 32a is formed to be substantially linear along the axial direction.

As shown in FIG. 4 and FIG. 5, the annular magnet 40 sandwiched between the first rotor core 20 and the second rotor core 30 is an annular plate-shaped permanent magnet formed by a neodymium magnet.

As shown in FIG. 5, the annular magnet 40 has an insertion hole 41, into which the rotation shaft 3 is inserted, at its center position. Further, a side surface 40a of the annular magnet 40 on one side contacts the opposed surface 21a of the first core base 21. A side surface 40b of the annular magnet 40 on the other side contacts the opposed surface 31a of the second core base 31. The annular magnet 40 is sandwiched and fixed between the first rotor core 20 and the second rotor core 30.

An outer diameter of the annular magnet 40 is set to conform to an outer diameter of the first and second core bases 21, 31, and the thickness is set to a predetermined thickness.

That is, as shown in FIG. 4, when the annular magnet 40 is arranged between the first rotor core 20 and the second rotor core 30, a distal end surface 22c of each first claw magnetic pole portion 22 is flush with a counter-opposed surface 31b of the second core base 31, and a distal end surface 32c of each second claw magnetic pole portion 32 is flush with a counter-opposed surface 21b of the first core base 21.

As shown in FIG. 4, the annular magnet 40 is magnetized in the axial direction so that a portion at a first rotor core 20 side becomes an N pole (first magnetic pole) and a portion at a second rotor core 30 side becomes an S pole (second magnetic pole). Accordingly, due to the annular magnet 40, the first claw magnetic pole portions 22 of the first rotor core 20 function as the N poles (the first magnetic poles), and the second claw magnetic pole portions 32 of the second rotor core 30 function as the S poles (the second magnetic poles).

Accordingly, the rotor 4 of the present embodiment is a so-called Lundell type rotor using the annular magnet 40. In the rotor 4, the first claw magnetic pole portions 22 serving as the N poles and the second claw magnetic pole portions 32 serving as the S poles are alternately arranged in the circumferential direction. The number of magnetic poles is eight.

Next, the operation of the first embodiment will be described.

Now, in the brushless motor M, when a three-phase power voltage is applied to the phase coils 13u, 13v, 13w wound about the teeth 11 of the stator core 10 to form a rotating magnetic field in the stator 2, the rotor 4 fixed to the rotation shaft 3 and arranged at the inner side of the stator 2 is rotated by the rotating magnetic field.

Further, when the application of the three-phase power voltage to the phase coils 13u, 13v, 13w is stopped, the rotating magnetic field is eliminated and the rotor 4 stops rotating. Here, the rotor 4 stops at a rotation position where magnetic flux flowing into the teeth 11 of the stator core 10 from the first claw magnetic pole portions 22 of the first rotor core 20 and magnetic flux flowing from the teeth 11 of the stator core 10 into the second claw magnetic pole portions 32 of the second rotor core 30 are most stabilized.

In this case, the ridgeline La (ridgeline Lb) on the radially outer surface f1 (radially outer surface f2) of one of the first and second claw magnetic pole portions 22, 32 is located at a middle position in the circumferential direction of a radially inner circumferential surface 11a of the opposed tooth 11. FIG. 1 shows a case where the ridgelines La on the radially outer surfaces f1 of the first claw magnetic pole portions 22 are located at the middle position in the circumferential direction of the radially inner circumferential surface 11a of the opposed teeth 11. In this case, since the brushless motor M includes the rotor 4 with eight poles and the stator 2 with twelve slots, each of the ridgelines Lb on the radially outer surfaces f2 of the second claw magnetic pole portions 32 is located at a middle position between two teeth 11.

In this state, if the rotor 4 (rotation shaft 3) is rotated, the radially outer surface f1 of the first claw magnetic pole portion 22 moves in the circumferential direction relative to the radially inner circumferential surface 11a of the opposed tooth 11.

The radially outer surfaces f1, f2 of the first and second claw magnetic pole portions 22, 32 are bulged at the ridgelines La, Lb serving as the boundaries. Thus, a change in the magnetic flux accompanying the movement becomes significantly large compared to when the radially outer surfaces of the first claw magnetic pole portions are formed along a circle concentric to the axis of the rotation shaft 3.

Further, a retaining force (detent torque) that returns the magnetic flux to a stable state is in correlation with changes in the magnetic field. In this case, a change in the magnetic field is very large. Thus, the retaining force (detent torque) is large.

In addition, the radially outer surfaces f1, f2 of the first and second claw magnetic pole portions 22, 32 include the first flat surfaces f1a, f2a and the second flat surfaces f1b, f2b that are symmetrically are have inclination angles θa, θb that are the same on each side in the circumferential direction with the ridgelines La, Lb serving as the boundaries. Thus, the same retaining force (detent torque) is provided in each rotating direction of the rotor 4 (rotation shaft 3).

Next, advantages of the first embodiment will be described below.

(1) According to the present embodiment, the cross-sectional shapes of the radially outer surfaces f1, f2 of the first claw magnetic pole portions 22 and second claw magnetic pole portions 32 in a direction orthogonal to the axial direction are not concentric circles of which centers are the axis of the rotation shaft. Thus, gaps vary between the stator 2 and the surfaces of the first and second claw magnetic pole portions 22, 32 causing the rotor 4 to rotate. Thus, large changes occur in the magnetic field due to the variation and produce a load during rotation. This increases the detent torque and increases the retaining force.

(2) According to the present embodiment, since the radially outer surfaces f1, f2 of the first and second claw magnetic pole portions 22, 32 are bulged with the ridgelines La, Lb serving as the boundaries, changes in the magnetic field are large. This allows for the detent torque to increase and the retaining force of the brushless motor M in a stationary state to increase.

(3) According to the present embodiment, the radially outer surfaces f1, f2 of the first and second claw magnetic pole portions 22, 32 have the first flat surfaces f1a, f2a and the second flat surfaces f1b, f2b with symmetrically identical inclination angles θa, θb on both sides in the circumferential direction with the ridgelines La, Lb serving as the boundaries. Accordingly, detent torque (retaining force) of the same magnitude can be generated in any rotating direction of the rotor 4 (rotation shaft 3).

Moreover, in the brushless motor M that is capable of forward and backward rotation, there is no cyclic fluctuation in the cogging toque between forward rotation and backward rotation.

The first embodiment may be modified as follows.

Figure 6:
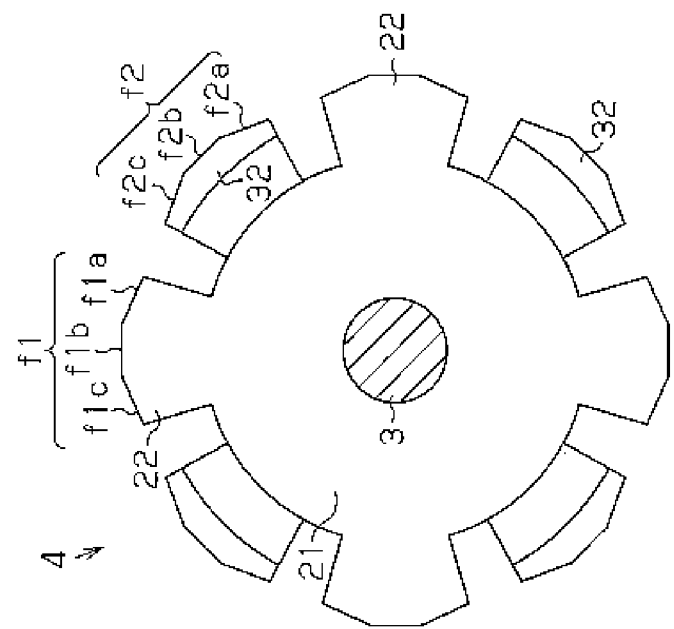
FIG. 6 is a front view of a rotor showing another example of the first embodiment as viewed in the axial direction.

In the present embodiment, the bulged radially outer surfaces f1, f2 include the first flat surfaces and the second flat surfaces. Instead, as shown in FIG. 6, the radially outer surfaces f1, f2 may be bulged by the first flat surfaces f1a, f2a, the second flat surfaces f1b, f2b, and third flat surfaces f1c, f2c. It is only necessary that the radially outer surfaces f1, f2 of the first and second claw magnetic pole portions 22, 32 as viewed in the axial direction not be a surface concentric to a circle of which the center is the axis O of the rotation shaft 3.

Figure 7A:
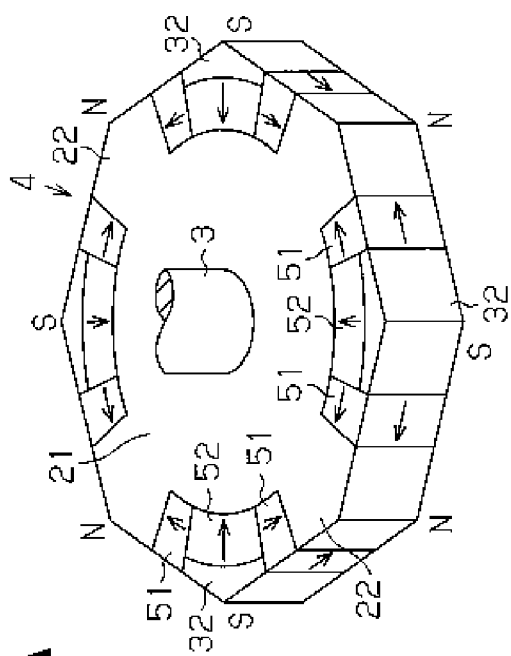
FIG. 7A is a perspective view of a rotor showing another example of the first embodiment as viewed from a first rotor core side.
Figure 7B:
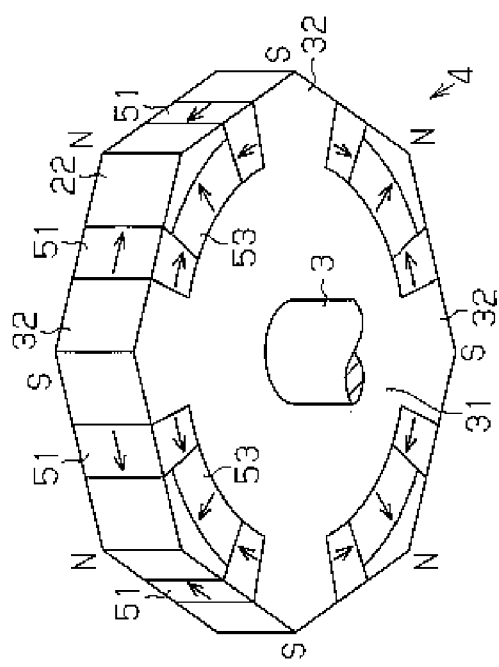
FIG. 7B is a perspective view of the rotor of FIG. 7A as viewed from a second rotor core side.

As shown in FIGS. 7A and 7B, in the rotor 4, interpolar auxiliary magnets 51 may be arranged between the first claw magnetic pole portions 22 and the second claw magnetic pole portions 32, and backside auxiliary magnets 52, 53 may be arranged at the radially inner sides of the first and second claw magnetic pole portions 22, 32.

Here, the interpolar auxiliary magnets 51 is magnetized in the direction such that portions on a first claw magnetic pole portion 22 side become the N poles, and portions on a second claw magnetic pole portion 32 side become the S poles. The backside auxiliary magnets 52 shown in FIG. 7A are magnetized such that portions on a first core base 21 side become the N poles, and portions on a second claw magnetic pole portion 32 side become the S poles. Further, the backside auxiliary magnets 53 shown in FIG. 7B are magnetized such that portions on a second core base 31 side become the S poles, and portions on a first claw magnetic pole portion 22 side become the N poles.

Accordingly, by providing these auxiliary magnets 51, 52, 53, the magnetic flux generated between the first and second claw magnetic pole portions 22, 32 and the teeth 11 of the stator core 10 becomes large, and a change in the magnetic field can be further increased. This further increases the detent torque.

Second Embodiment

Next, a second embodiment of the present invention will be described with reference to FIG. 8 to FIG. 14.

The present embodiment has characteristics in the radially outer surfaces f1, f2 of the first and second claw magnetic pole portions 22, 32 shown in the first embodiment. Accordingly, the characteristic portions will be described in detail, and portions corresponding with the first embodiment will not be described in detail for the sake of convenience.

Figure 8:
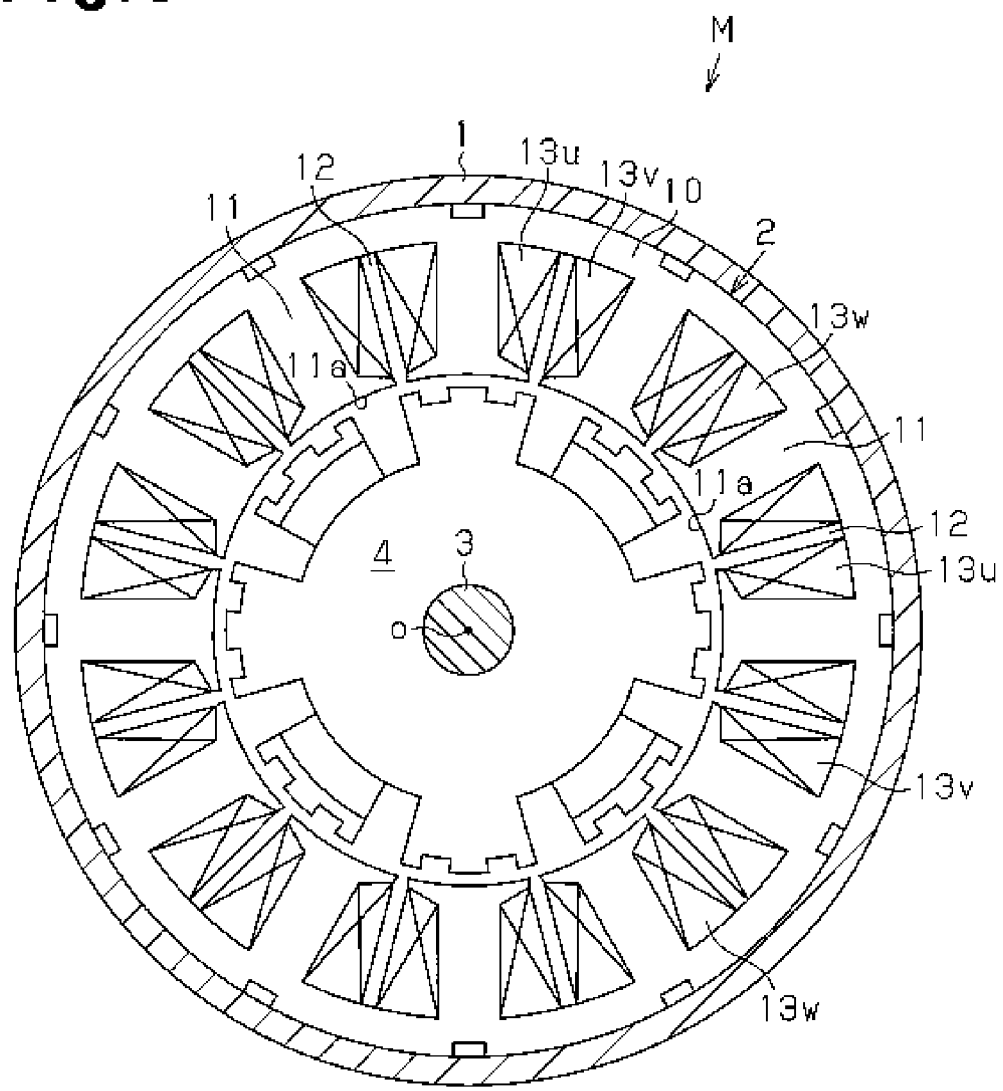
FIG. 8 is a cross-sectional view of a brushless motor according to a second embodiment of the present invention as viewed in the axial direction.
Figure 9:
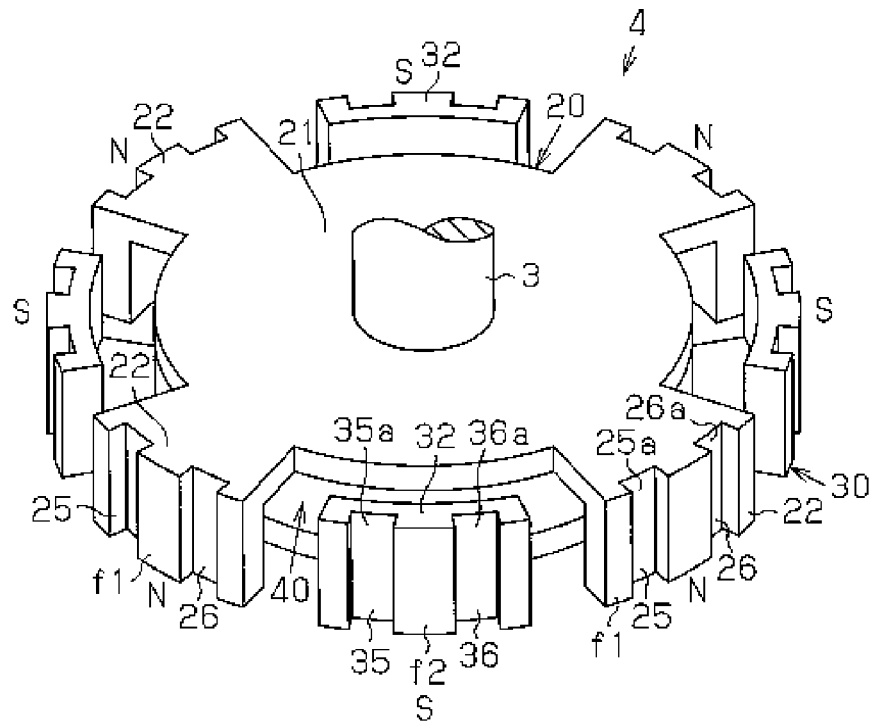
FIG. 9 is a perspective view of the rotor of FIG. 8 as viewed in the axial direction.

As shown in FIG. 8, a brushless motor M of the present embodiment has a stator 2 fixed to an inner circumferential surface of a motor housing 1, and a rotor 4 that is fixed to and rotates integrally with a rotation shaft 3 is arranged at an inner side of the stator 2.

The stator 2 includes a stator core 10, and twelve teeth 11 extend from the stator core 10. Each of the teeth 11 is T-shaped, and an inner circumferential surface 11a thereof in a radial direction is an arcuate surface obtained by extending in the axial direction an arc of a concentric circle which has a center at an axis O of the rotation shaft 3. Further, three-phase coils are wound on the twelve teeth 11 by concentrated winding, specifically, a U-phase coil 13u, a V-phase coil 13v, and a W-phase coil 13w are wound on in this order each of the teeth 11 in a circumferential direction.

Further, by applying a three-phase power voltage to the above wound respective phase coils 13u, 13v, 13w, the stator 2 forms a rotating magnetic field.

As shown in FIG. 9 to FIG. 12, the rotor 4 arranged at the inner side of the stator 2 includes first and second rotor cores 20, 30, and an annular magnet 40 (refer to FIG. 2 and FIG. 3).

Figures 11, 12:
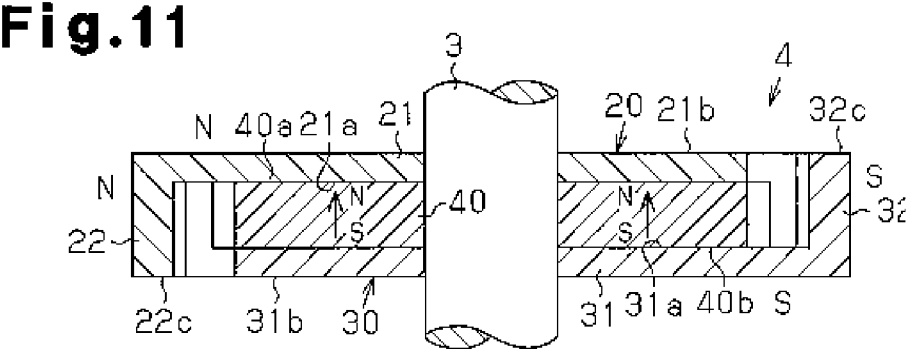
FIG. 11 is a combined cross-sectional view taken along line a-o-b in FIG. 10.
FIG. 12 is an exploded perspective view of the rotor of FIG. 9.

As shown in FIG. 12, the first rotor core 20 includes a first core base 21 formed in a substantially disk shape, and four first claw magnetic pole portions 22 arranged at equal intervals at an outer circumferential portion of the first core base 21. Each of the first claw magnetic pole portions 22 is formed to protrude to a radially outer side and extend in the axial direction.

Further, an angle of each first claw magnetic pole portion 22 in the circumferential direction, that is, an angle between the two circumferential end surfaces 22a, 22b is set to be smaller than an angle of a gap between adjacent ones of first claw magnetic pole portions 22 in the circumferential direction.

Further, the radially outer surfaces f1 of the first claw magnetic pole portions 22 have a cross-sectional shape in a direction orthogonal to the axial direction that includes an arcuate surface of a concentric circle shape having an axis O of the rotation shaft 3 as a center, and two grooves, namely, a first auxiliary groove 25 and a second auxiliary groove 26, are formed on each radially outer surface f1.

Figure 10:
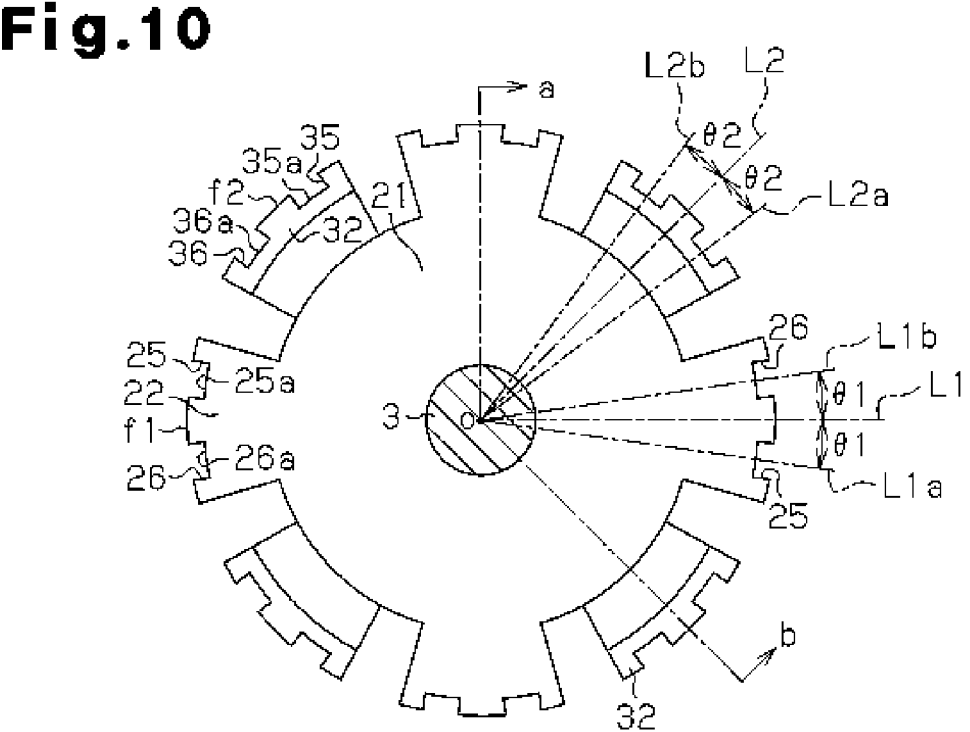
FIG. 10 is a front view of the rotor of FIG. 9 as viewed in the axial direction.

More specifically, as shown in FIG. 10, in the radially outer surface f1 of the first claw magnetic pole portion 22, a straight line that passes through a middle position of the first claw magnetic pole portion 22 in the circumferential direction from the axis O of the rotation shaft 3 is referred to as a center line L1. With the center line L1 as a reference, straight lines that extend from a center axis to be apart by an angle θ1 in a clockwise side and a counterclockwise side are respectively referred to as a first line L1a and a second line L1b.

Here, the angle θ1 is calculated based on a cycle of cogging torque (angle φ) by using the following calculation formula.

$$\theta 1=(\tfrac{1}{2}+n)\cdot\phi$$

Here, n is an integer, and in the present embodiment, n=0.

Generally, the cycle φ of the cogging torque is a value obtained by dividing 360 degrees by the least common multiple of the number of magnetic poles of the rotor 4 and the number of slots of the stator 2.

In this case, since the number of magnetic poles of the rotor 4 is eight and the number of slots of the stator 2 is twelve, the least common multiple becomes twenty four. Further, the cycle φ of the cogging torque becomes 15 (=360/24) degrees.

Accordingly, the angle θ1 becomes 7.5 (=15/2) degrees.

Further, on the radially outer surface f1, grooves with a constant width are arranged in the axial direction respectively to have the first line L1a and the second line L1b positioned apart by 7.5 degrees in a clockwise direction and a counterclockwise direction with the center line L1 as a center, as middle positions in the circumferential direction.

Further, the groove that has the first line L1a as the circumferential middle position is referred to as a first auxiliary groove 25, and on the contrary, the groove that has the second line L1b as the circumferential middle position is referred to as a second auxiliary groove 26. Accordingly, an angle that the first auxiliary groove 25 and the second auxiliary groove 26t form with the axis O of the rotation shaft 3 as the center matches the cycle φ of the cogging torque (=15 degrees).

That is, an angle formed by the center line L1 and the first line L1a and an angle formed by the center line L1 and the second line L1b both become half cycle of the cycle φ of the cogging torque (=7.5 degrees), and the first auxiliary groove 25 and the second auxiliary groove 26 are formed at symmetric positions with the center line L1 as a symmetrical axis.

The first and second auxiliary grooves 25, 26 have a U-shaped cross-section in a direction orthogonal to the axial direction. Bottom surfaces 25a, 26a of the first and second auxiliary grooves 25, 26 are flat surfaces, and are respectively formed at right angle to side surfaces extending to a radially outer side from both sides of the first and second auxiliary grooves 25, 26.

Accordingly, since the bottom surfaces 25a, 26a of the first and second auxiliary grooves 25, 26 being flat, the radially outer surfaces f1 of the first claw magnetic pole portions 22 having the first and second auxiliary grooves 25, 26, as a whole, do not have a cross-sectional shape of the concentric circle shape with the axis O of the rotation shaft 3 as the center, in a direction orthogonal to the axial direction.

As shown in FIG. 12, the second rotor core 30 has an identical shape as the first rotor core 20. The second rotor core 30 includes a substantially disk-shaped second core base 31, and four second claw magnetic pole portions 32 arranged at equal intervals at an outer circumferential portion of the second core base 31. Each of the second claw magnetic pole portions 32 is formed to protrude to the radially outer side and extend in the axial direction.

End surfaces 32a, 32b of each second claw magnetic pole portion 32 in the circumferential direction are flat surfaces that extend in the radial direction. Further, an angle of each second claw magnetic pole portion 32 in the circumferential direction, that is, an angle between the two end surfaces 32a, 32b in the circumferential direction is set to be smaller than an angle of a gap between adjacent ones of the second claw magnetic pole portions 32 in the circumferential direction.

Further, the radially outer surfaces f2 of the second claw magnetic pole portions 32 have a cross-sectional shape in a direction orthogonal to the axial direction that includes an arcuate surface of a concentric circle shape having the axis O of the rotation shaft 3 as a center, and two grooves, namely, a first auxiliary groove 35 and a second auxiliary groove 36, are formed on each radially outer surface f2.

More specifically, as shown in FIG. 10, in the radially outer surface f2 of the second claw magnetic pole portion 32, a straight line that passes through a middle position of the second claw magnetic pole portion 32 in the circumferential direction from the axis O of the rotation shaft 3 is referred to as a center line L2. With the center line L2 as a reference, straight lines that extend from the center axis to be apart by an angle θ2 in the clockwise side and the counterclockwise side are respectively referred to as a first line L2a and a second line L2b. Here, the angle θ2 is calculated based on the cycle φ of the cogging torque by using the following calculation formula, similar to the above.

$$\theta 2=(\tfrac{1}{2}+n)\cdot\phi$$

Here, n is an integer, and in the present embodiment, n=0. The cycle φ of the cogging torque is 15 (=360/24) degrees, similar to the above.

Accordingly, the angle θ2 becomes 7.5 (=15/2) degrees, similar to the above θ1.

Further, on the radially outer surface f2, grooves with a constant width are arranged in the axial direction respectively to have the first line L2a and the second line L2b positioned respectively apart by 7.5 degrees in the clockwise direction and the counterclockwise direction with respect to the center line L2 as a center, as middle positions in the circumferential direction.

Further, the groove that has the first line L2a as the circumferential middle position is referred to as a first auxiliary groove 35, and on the contrary, the groove that has the second line L2b as the circumferential middle position is referred to as a second auxiliary groove 36. Accordingly, an angle that the first auxiliary groove 35 and the second auxiliary groove 36 form with the axis O of the rotation shaft 3 as the center matches the cycle φ of the cogging torque (=15 degrees).

That is, an angle formed by the center line L2 and the first line L2a and an angle formed by the center line L2 and the second line L2b both become half cycle of the cycle φ of the cogging torque (=7.5 degrees). Thus, the first auxiliary groove 35 and the second auxiliary groove 36 are formed at symmetric positions with the center line L2 as a symmetrical axis.

The first and second auxiliary grooves 35, 36 have a U-shaped cross-section in a direction orthogonal to the axial direction. Bottom surfaces 35a, 36a of the first and second auxiliary grooves 35, 36 are flat, and are formed at right angle to side surfaces extending from the radially outer side from both sides of the first and second auxiliary grooves 35, 36.

Accordingly, since the bottom surfaces 35a, 36a of the first and second auxiliary grooves 35, 36 being flat, the radially outer surfaces f2 of the second claw magnetic pole portions 32 having the first and second auxiliary grooves 35, 36, as a whole, do not have a cross-sectional shape of the concentric circle shape with the axis O of the rotation shaft 3 as the center in a direction orthogonal to the axial direction.

Further, in the same manner as the first embodiment, in the second rotor core 30, each of the second claw magnetic pole portions 32 is arranged between respectively corresponding ones of the first claw magnetic pole portions 22. Further, at this point, in the same manner as the first embodiment, the second rotor core 30 is assembled to the first rotor core 20 such that an annular magnet 40 (refer to FIG. 11) is arranged (sandwiched) between the first core base 21 and the second core base 31 in the axial direction.

Next, a method for manufacturing the first and second rotor cores 20, 30 will be described.

Figure 13A:
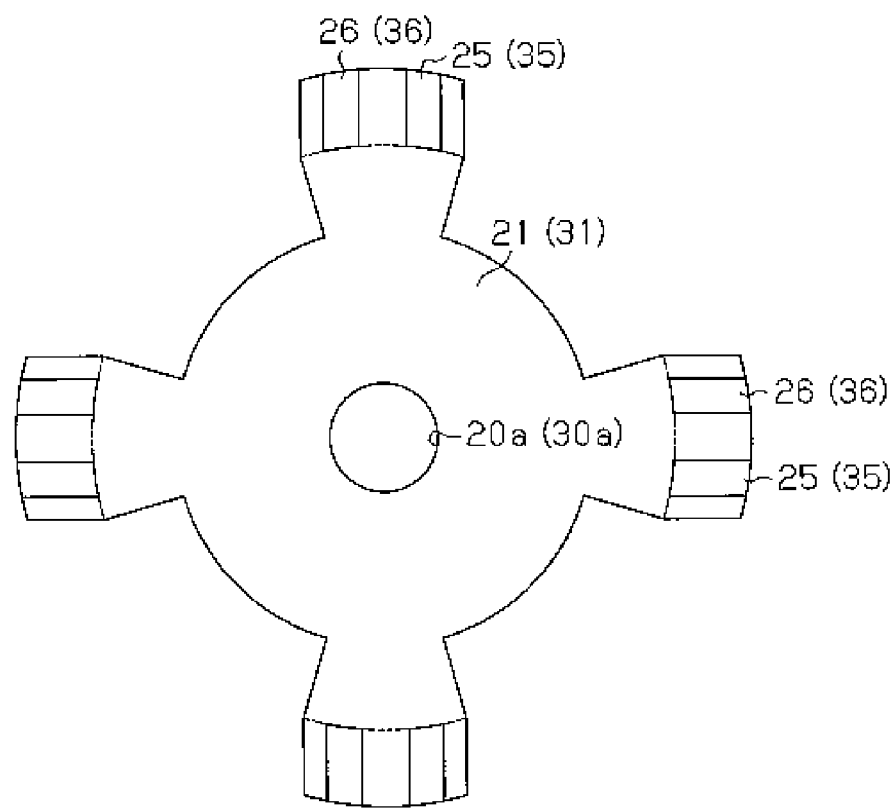
FIG. 13A is a diagram showing a method for forming the rotor of FIG. 9 before the formation of claw magnetic pole portions.

Firstly, the first and second rotor cores 20, 30 are punched out of an electromagnetic steel plate of a soft magnetic material. More specifically, as shown in FIG. 13A, the insertion holes 20a, 30a, the first and second core bases 21, 31, and portions extending in the radial direction from the first and second core bases 21, 31 are formed by punching. After the punching, one side surfaces of the portions extending in the radial direction from the first and second core bases 21, 31 are pressed by a pressing machine and the like (plastically deformed), to form the first auxiliary grooves 25, 35 and the second auxiliary grooves 26, 36.

Figure 13B:
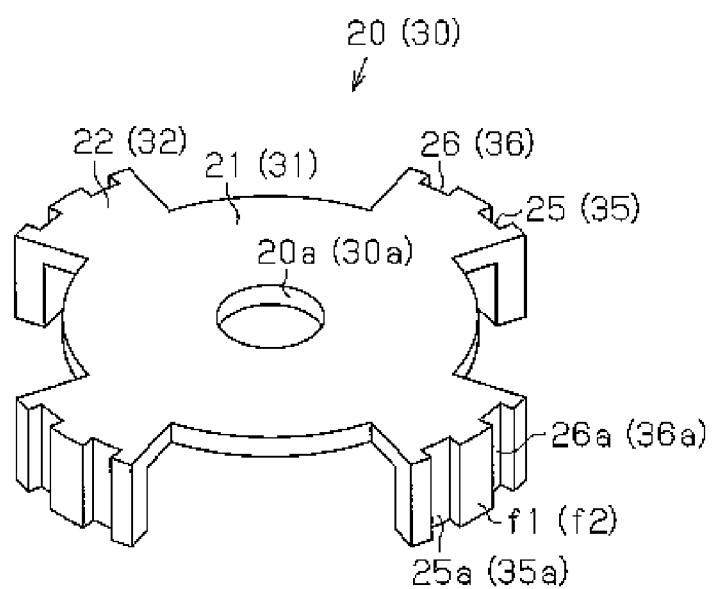
FIG. 13B is a diagram of after the formation of the claw magnetic pole portions.

Further, of thus formed the first auxiliary grooves 25, and the second auxiliary grooves 26, 36, the portions extending in the radial direction are bended in the axial direction with respect to portions shown by two-dot chain lines in FIG. 13A. Thus, the first and second rotor cores 20, 30 having the first and second claw magnetic pole portions 22, 32 with the first auxiliary grooves 25, 35 and the second auxiliary grooves 26, 36 are formed as shown in FIG. 13B.

Next, the operation of the second embodiment will be described.

In the rotor 4, on the radially outer surface f1 of each of the first claw magnetic pole portions 22, the first auxiliary groove 25 and the second auxiliary groove 26 are formed along the axial direction, and on the radially outer surface f2 of each of the second claw magnetic pole portions 32, the first auxiliary groove 35 and the second auxiliary groove 36 are formed along the axial direction. Thus, the cross-sectional shapes in a direction orthogonal to the axial direction of the radially outer surfaces f1 of the first claw magnetic pole portions 22 and the radially outer surfaces f2 of the second claw magnetic pole portions 32, as a whole, do not become concentric circle shapes with the axis O of the rotation shaft 3 as the center.

Thus, in the same manner as the first embodiment, the aforementioned change in the magnetic field based on the first auxiliary grooves 25, 35 and the second auxiliary grooves 26, 36 becomes very large compared to one before the formation of the first auxiliary grooves 25, 35 and the second auxiliary grooves 26, 36, and the retaining force (detent torque) becomes large.

Moreover, the first auxiliary groove 25 and the second auxiliary groove 26, which are formed on the radially outer surface f1 of the first claw magnetic pole portion 22, are formed at the axially symmetric positions with the center line L1 as the axis, and the angle formed by the first auxiliary groove 25 (first line L1a) and the second auxiliary groove 26 (second line L1b) matches the cycle φ (=15 degrees) of the cogging torque.

In the same manner, the first auxiliary groove 35 and the second auxiliary groove 36, which are formed on the radially outer surface f2 of each of the second claw magnetic pole portions 32, are formed at the axially symmetric positions with the center line L2 as the axis, and the angle formed by the first auxiliary groove 35 (first line L2a) and the second auxiliary groove 36 (second line L2b) matches the cycle φ (=15 degrees) of the cogging torque.

Figure 14:
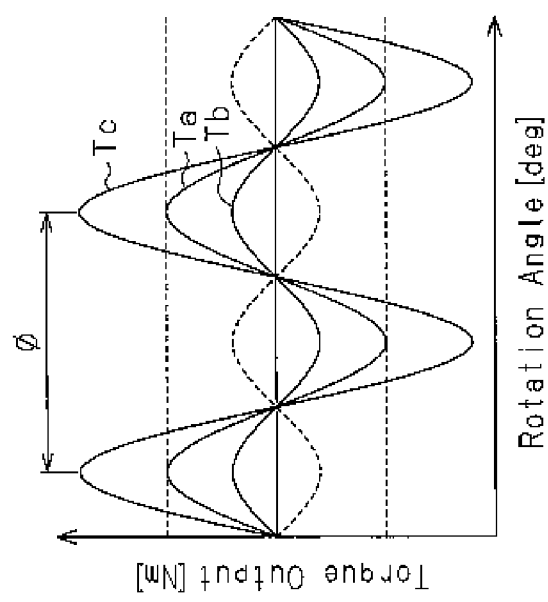
FIG. 14 is a diagram showing the relationship of detent torque.

That is, as shown in FIG. 14, original detent torque Ta before the groove formation, specifically, before the formation of the first auxiliary grooves 25, 35 and the second auxiliary grooves 26, 36, and auxiliary groove detent torque Tb come to be of an identical phase. Thus, the detent torque Ta before the groove formation and the auxiliary groove detent torque Tb are superimposed, whereby the total detent torque Tc as shown in FIG. 14 can be derived to its maximum.

The second embodiment has the following advantages in addition to advantage (1) of the first embodiment.

(4) According to the present embodiment, since the radially outer surfaces f1, f2 of the first and second claw magnetic pole portions 22, 32 have the first auxiliary grooves 25, 35 and the second auxiliary grooves 26, 36 positioned at the symmetric positions on both sides in the circumferential direction with the center lines L1, L2 as the axes, the detent torque can be increased, and the retaining force of the brushless motor M in a stationary state can be increased.

(5) According to the present embodiment, since the first auxiliary grooves 25, 35 and the second auxiliary grooves 26, 36 are formed at the positions where the angles θ1, θ2 that the above grooves form respectively with the center lines L1, L2 become half cycle (=φ/2=7.5 degrees) of the cycle (angle φ) of the cogging torque, the largest the total detent torque Tc can be generated.

Further, in the brushless motor M capable of forward and backward rotation, since the first auxiliary grooves 25, 35 and the second auxiliary grooves 26, 36 are formed at the axially symmetric positions, there is no cyclic fluctuation in the cogging toque to be generated between the cases of rotating forward and the case of rotating backward.

(6) According to the present embodiment, the electromagnetic steel plate formed of the soft magnetic material is processed by punching, and the first and second rotor cores 20, 30 having the insertion holes 20a, 30a, the first and second core bases 21, 31, and the portions extending in the radial direction from the first and second core bases 21, 31 are formed by the punching. Further, by bending the portions extending in the radial direction in the axial direction, the first and second rotor cores 20, 30 including the first and second claw magnetic pole portions 22, 32 are formed.

Here, before the bending, the first auxiliary grooves 25, 35 and the second auxiliary grooves 26, 36 are formed by pressing one side surfaces of the portions extending in the radial direction from the first and second core bases 21, 31 by the pressing machine and the like.

Accordingly, the first and second rotor cores 20, 30 can be manufactured by three steps of the punching processing, the pressing processing, and the bending processing, achieving a low manufacturing cost of the first and second rotor cores 20, 30.

The second embodiment may be modified as follows.

Figure 15A:
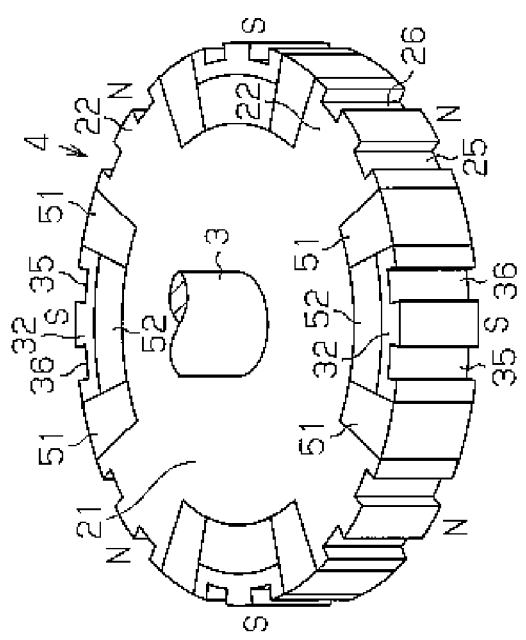
FIG. 15A is a perspective view of a rotor showing another example of the second embodiment as viewed from a first rotor core side.
Figure 15B:
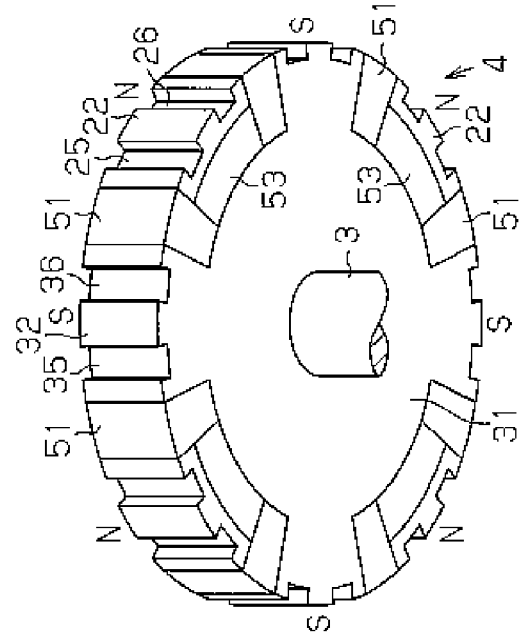
FIG. 15B is a perspective view of the rotor of FIG. 15A as viewed from a second rotor core side.

As shown in FIGS. 15A and 15B, in the rotor 4 shown in the second embodiment, similar to the rotor 4 shown in FIGS. 7A and 7B, interpolar auxiliary magnets 51 may be arranged between the first claw magnetic pole portions 22 and the second claw magnetic pole portions 32, and backside auxiliary magnets 52, 53 may be respectively arranged at the radially inner sides of the first and second claw magnetic pole portions 22, 32. End surfaces of the interpolar auxiliary magnets 51 on the radially outer side become substantially flushed with the radially outer surfaces f1, f2 of the first claw magnetic pole portions 22 and the second claw magnetic pole portions 32, and the bottom surfaces 35a, 36a of the first auxiliary grooves 35 and the second auxiliary grooves 36 are arranged on the radially inner side than the end surfaces of the interpolar auxiliary magnets 51 on the radially outer side.

Thus, like the rotor 4 shown in FIG. 7, the detent torque can further be increased.

In the present embodiment, the first lines L1a, L2a and the second lines L1b, L2b that determine the circumferential middle positions of the first auxiliary grooves 25, 35 and the second auxiliary grooves 26, 36 are determined based on the cycle of the cogging torque (angle φ). Alternatively, positions deviated from the first lines L1a, L2a and the second lines L1b, L2b may be set as the middle positions of the first auxiliary grooves 25, 35 and the second auxiliary grooves 26, 36. In this case, although the detent torque becomes small, a magnitude of the detent torque can be adjusted.

Further, the positions deviated from the first lines L1a, L2a and the second lines L1b, L2b may be positions that are symmetrically apart from the first lines L1a, L2a and the second lines L1b, L2b on both sides in the circumferential direction. In this case also, the magnitude of the detent torque can be adjusted.

In the second to fourth embodiments, the first auxiliary grooves 25, 35 and the second auxiliary grooves 26, 36 of the first and second rotor cores 20, 30 are formed by being elastically deformed (pressed). Alternatively, a material of the portions where the grooves are to be formed may be changed. Here, changing the material means, for example, forming the first and second rotor cores 20, 30 by a composite magnetic material, and irradiating laser to the portions where the grooves are to be formed so that only connecting portions of the composite magnetic material are demagnetized to increase magnetic resistance thereof. Thus, similar advantages as the auxiliary grooves can be achieved.

Third Embodiment

Next, a third embodiment of the present invention will be described with reference to FIG. 16 and FIG. 17.

In the present embodiment, there is a difference only in configurations of first auxiliary grooves 25, 35 and second auxiliary grooves 26, 36 formed on radially outer surfaces f1, f2 of the first and second claw magnetic pole portions 22, 32 shown in the second embodiment. Accordingly, the difference will be described.

Figure 16:
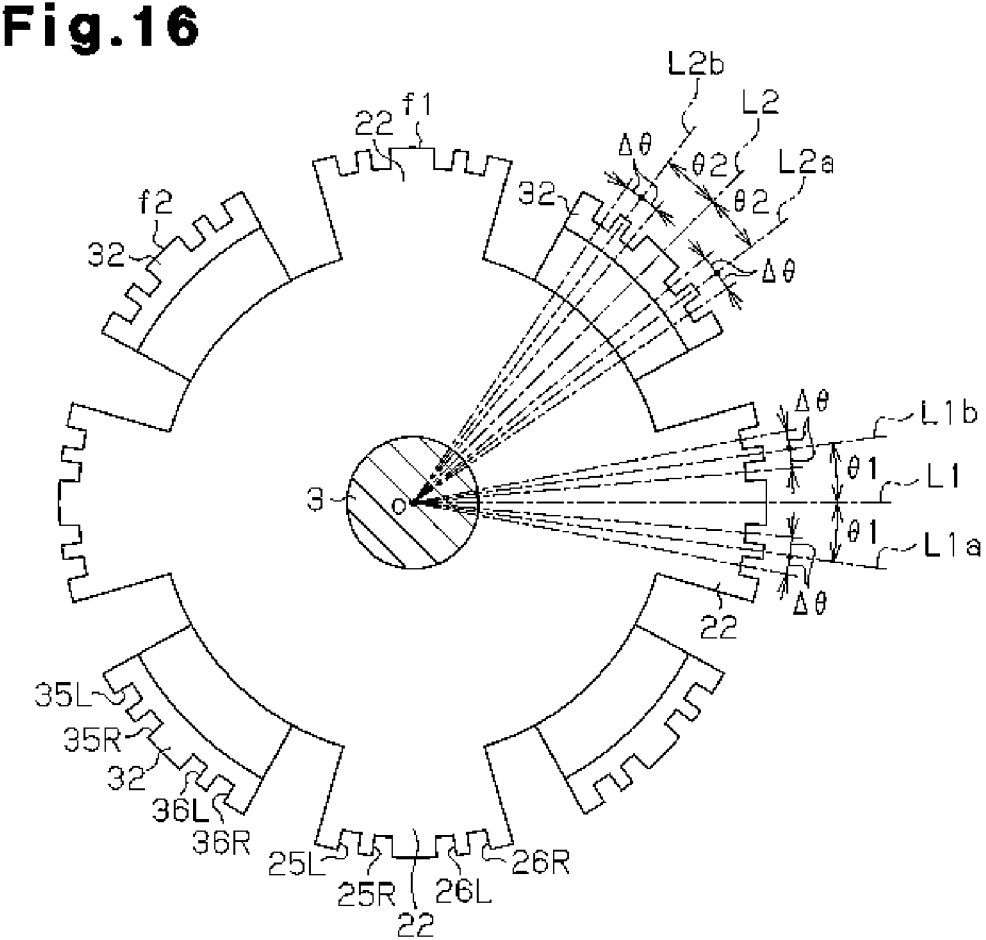
FIG. 16 is a front view of a rotor according to a third embodiment of the present invention as viewed in the axial direction.

As shown in FIG. 16, on a radially outer surface f1 of each of the first claw magnetic pole portions 22 of the first rotor core 20, a first left-side auxiliary groove 25L and a first right-side auxiliary groove 25R are formed on both sides in a circumferential direction with a first line L1a as an axis of axial symmetry, and a second left-side auxiliary groove 26L and a second right-side auxiliary groove 26R are formed on both sides in the circumferential direction with a second line L1b as an axis of axial symmetry.

Accordingly, four auxiliary grooves 25L, 25R, 26L, 26R are formed on each radially outer surface f1.

More specifically, the first left-side auxiliary groove 25L and the first right-side auxiliary groove 25R of the first claw magnetic pole portion 22 have a constant width with straight lines respectively extending from an axis O to be apart from the first line L1a as the center line by an identical predetermined angle Δθ to both sides in the circumferential direction as middle positions in the circumferential direction. The first left-side auxiliary groove 25L and the first right-side auxiliary groove 25R are grooves that are arranged respectively in an axial direction.

Further, in FIG. 16, the groove of the first line L1a on a clockwise side is referred to as the first left-side auxiliary groove 25L, and on the contrary, the groove of the first line L1a on a counterclockwise side is referred to as the first right-side auxiliary groove 25R.

Here, the offset angle Δθ is set such that the following relationship is satisfied.

$$(1/4+n)\cdot\phi < \Delta\theta < (3/4+n)\cdot\phi$$

Here, since n=0,
(15/4) degrees<Δθ<(45/4) degrees, that is,
3.75 degrees<Δθ<11.25 degrees
is obtained. Further, the straight lines extending from the axis O are set within this range.

In the same manner, the second left-side auxiliary groove 26L and the second right-side auxiliary groove 26R of the first claw magnetic pole portion 22 have a constant width with straight lines respectively extending from the axis O to be apart from the second line L1b as the center line by the aforementioned offset angle Δθ to both sides in the circumferential direction as middle positions in the circumferential direction. The second left-side auxiliary groove 26L and the second right-side auxiliary groove 26R are arranged respectively in the axial direction.

Further, in FIG. 16, the groove of the second line L1b on the clockwise side is referred to as the second left-side auxiliary groove 26L, and on the contrary, the groove of the second line L1b on the counterclockwise side is referred to as the second right-side auxiliary groove 26R.

On the other hand, as shown in FIG. 16, on a radially outer surface f2 of each of the second claw magnetic pole portions 32 of the second rotor core 30, a first left-side auxiliary groove 35L and a first right-side auxiliary groove 35R are formed on both sides in the circumferential direction with a first line L2a as an axis of axial symmetry, and a second left-side auxiliary groove 36L and a second right-side auxiliary groove 36R are formed on both sides in the circumferential direction with a second line L2b as an axis of axial symmetry.

Accordingly, four auxiliary grooves 35L, 35R, 36L, 36R are formed on each radially outer surface f2.

The first left-side auxiliary groove 35L and the first right-side auxiliary groove 35R of the second claw magnetic pole portion 32 have a constant width with straight lines respectively extending from the axis O to be apart from the first line L2a as the center line by the aforementioned offset angle Δθ to both sides in the circumferential direction as middle positions in the circumferential direction. The first left-side auxiliary groove 35L and the first right-side auxiliary groove 35R are arranged respectively in the axial direction.

Further, in FIG. 16, the groove of the first line L2a on the clockwise side is referred to as the first left-side auxiliary groove 35L, and on the contrary, the groove of the first line L2a on the counterclockwise side is referred to as the first right-side auxiliary groove 35R.

In the same manner, the second left-side auxiliary groove 36L and the second right-side auxiliary groove 36R of the second claw magnetic pole portion 32 have a constant width with straight lines respectively extending from the axis O to be apart from the second line L2b as the center line by the aforementioned offset angle Δθ to both sides in the circumferential direction as middle positions in the circumferential direction. The second left-side auxiliary groove 36L and the second right-side auxiliary groove 36R are arranged respectively in the axial direction.

Further, in FIG. 16, the groove of the second line L2b on the clockwise side is referred to as the second left-side auxiliary groove 36L, and on the contrary, the groove of the second line L2b on the counterclockwise side is referred to as the second right-side auxiliary groove 36R.

Further, it is apparent that the first and second rotor cores 20, 30 of the present embodiment can be manufactured by the manufacturing method described in the second embodiment.

Next, the operation of the third embodiment will be described.

In a rotor 4, the first left-side and right-side auxiliary grooves 25L, 25R and the second left-side and right-side auxiliary grooves 26L, 26R are formed on the radially outer surface f1 of each of the first claw magnetic pole portions 22 to extend in the axial direction. Moreover, the first left-side and right-side auxiliary grooves 35L, 35R and the second left-side and right-side auxiliary grooves 36L, 36R are formed on the radially outer surface f2 of each of the second claw magnetic pole portions 32 to extend in the axial direction. Thus, the radially outer surfaces f1 of the first claw magnetic pole portions 22 and the radially outer surfaces f2 of the second claw magnetic pole portions 32, as a whole, do not have a cross-sectional shape in a direction orthogonal to the axial direction that becomes a concentric circle shape with the axis O of a rotation shaft 3 as a center.

Thus, like the second embodiment, compared to the case before forming the first left-side auxiliary grooves 25L, 35L and the second right-side auxiliary grooves 26R, 36R, a change in magnetic field becomes very large, and retaining force (detent torque) becomes large.

Further, the first left-side and right-side auxiliary grooves 25L, 25R and the second left-side and right-side auxiliary grooves 26L, 26R, which are formed on the radially outer surface f1 of the first claw magnetic pole portion 22, are formed at axially symmetric positions with the center line L1 as an axis. Further, the first left-side and right-side auxiliary grooves 25L, 25R are formed at axially symmetric positions with the first line L1a as an axis, and the second left-side and right-side auxiliary grooves 26L, 26R are formed at axially symmetric positions with the second line L1b as an axis.

In the same manner, the first left-side and right-side auxiliary grooves 35L, 35R and the second left-side and right-side auxiliary grooves 36L, 36R, which are formed on the radially outer surface f2 of the second claw magnetic pole portion 32, are formed at axially symmetric positions with the center line L2 as an axis. Further, the first left-side and right-side auxiliary grooves 35L, 35R are formed at axially symmetric positions with the first line L2a as an axis, and the second left-side and right-side auxiliary grooves 36L, 36R are formed at axially symmetric positions with the second line L2b as an axis.

Accordingly, a cycle of detent torque Tb due to the four auxiliary grooves 25L, 25R, 26L, 26R formed on the radially outer surface f1 and the four auxiliary grooves 35L, 35R, 36L, 36R formed on the radially outer surface f2 matches the cycle of the cogging torque.

Thus, the total detent torque Tc of a large magnitude can be drawn, like the second embodiment.

Figure 17:
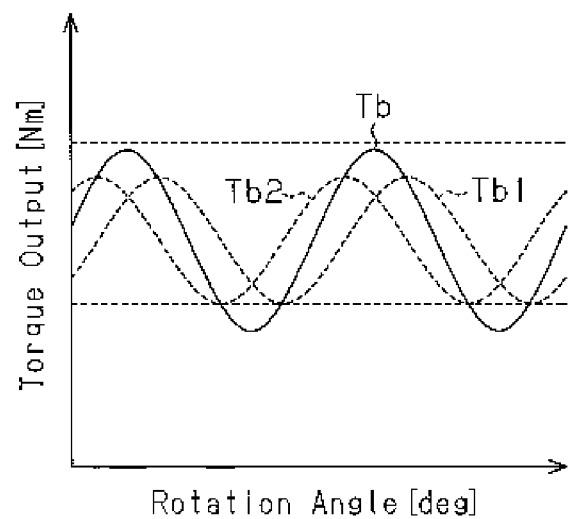
FIG. 17 is a diagram showing the relationship of each detent torque in the third embodiment.
Figure 18:
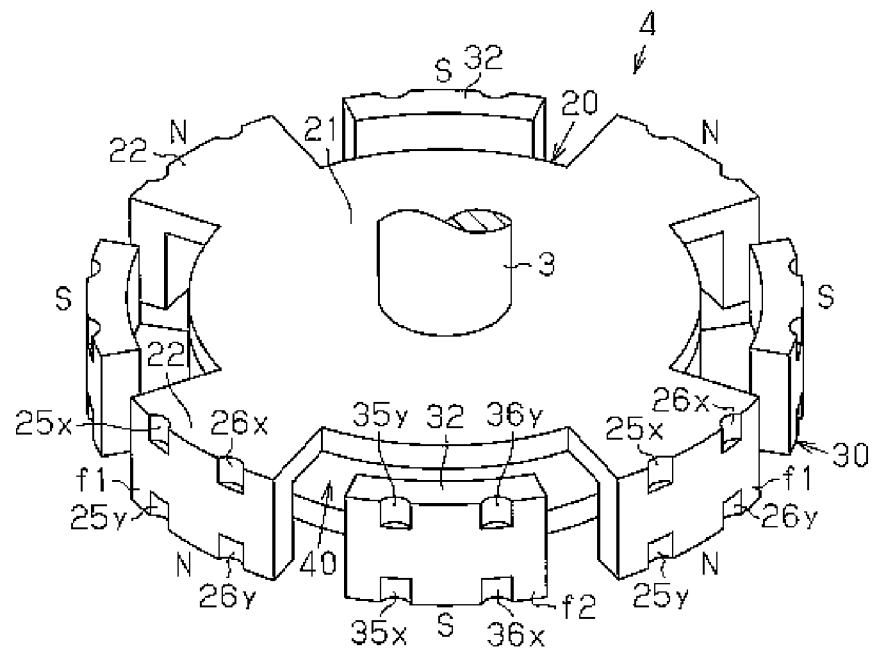
FIG. 18 is a perspective view of a rotor according to a fourth embodiment as viewed in the axial direction.
Figure 19:
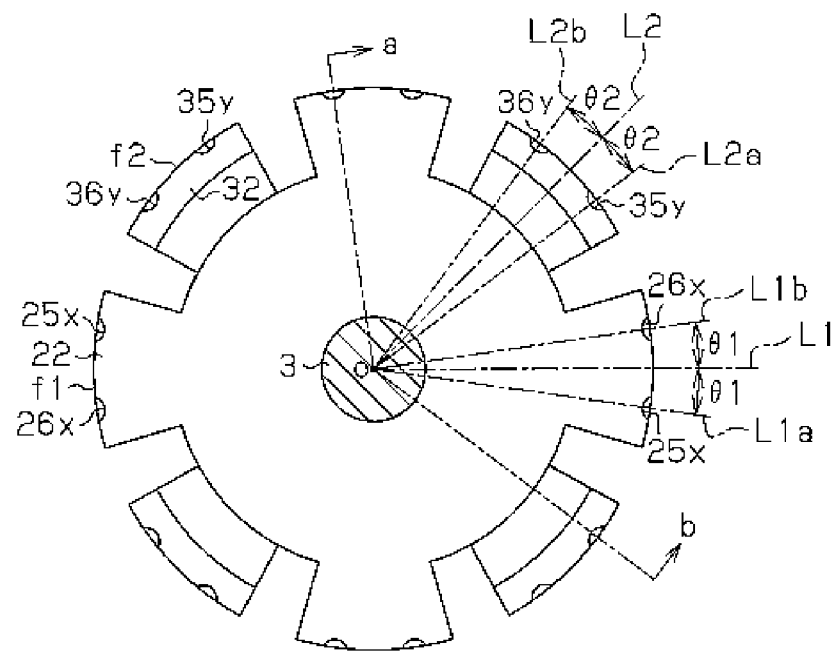
FIG. 19 is a front view of the rotor of FIG. 18 as viewed in the axial direction.

When only the first left-side auxiliary groove 25L and the second left-side auxiliary groove 26L are formed on the radially outer surface f1 of the first claw magnetic pole portion 22, and only the first left-side auxiliary groove 35L and the second left-side auxiliary groove 36L are formed on the radially outer surface f2 of the second claw magnetic pole portion 32, detent torque Tb1 shown in FIG. 17 is exhibited.

That is, the detent torque Tb1 in this case becomes smaller than the detent torque Tb when the four auxiliary grooves 25L, 25R, 26L, 26R are formed on the radially outer surface f1 and the four auxiliary grooves 35L, 35R, 36L, 36R are formed on the radially outer surface f2.

In contrast, when only the first right-side auxiliary groove 25R and the second right-side auxiliary groove 26R are formed on the radially outer surface f1 of the first claw magnetic pole portion 22, and only the first right-side auxiliary groove 35R and the second right-side auxiliary groove 36R are formed on the radially outer surface f2 of the second claw magnetic pole portion 32, detent torque Tb2 shown in FIG. 17 is exhibited.

That is, the detent torque Tb2 in this case becomes smaller than the detent torque Tb when the four auxiliary grooves 25L, 25R, 26L, 26R are formed on the radially outer surface f1 and the four auxiliary grooves 35L, 35R, 36L, 36R are formed on the radially outer surface f2.

Thus, although the increase of the detent torque is achieved by the groove formation, it is small in magnitude. Accordingly, in a case where the magnitude of the detent torque is to be adjusted, the adjustment can be performed by omitting those of the auxiliary grooves on either one side.

Thus, the third embodiment has the same advantages as the second embodiment.

Fourth Embodiment

Next, a fourth embodiment of the present invention will be described with reference to FIG. 18 to FIG. 21.

In the present embodiment, there is a difference in configurations of first auxiliary grooves 25, 35 and second auxiliary grooves 26, 36 formed on radially outer surfaces f1, f2 of the first and second claw magnetic pole portions 22, 32 shown in the second embodiment. Accordingly, the difference will be described.

Figure 20:
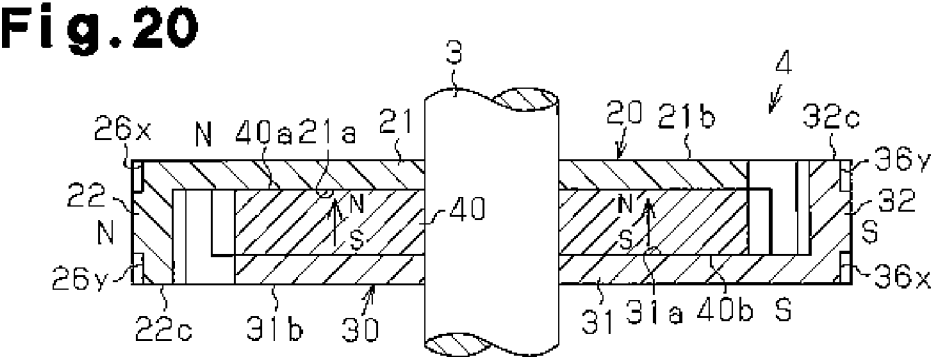
FIG. 20 is a combined cross-sectional view taken along line a-o-b in FIG. 19.
Figure 21:
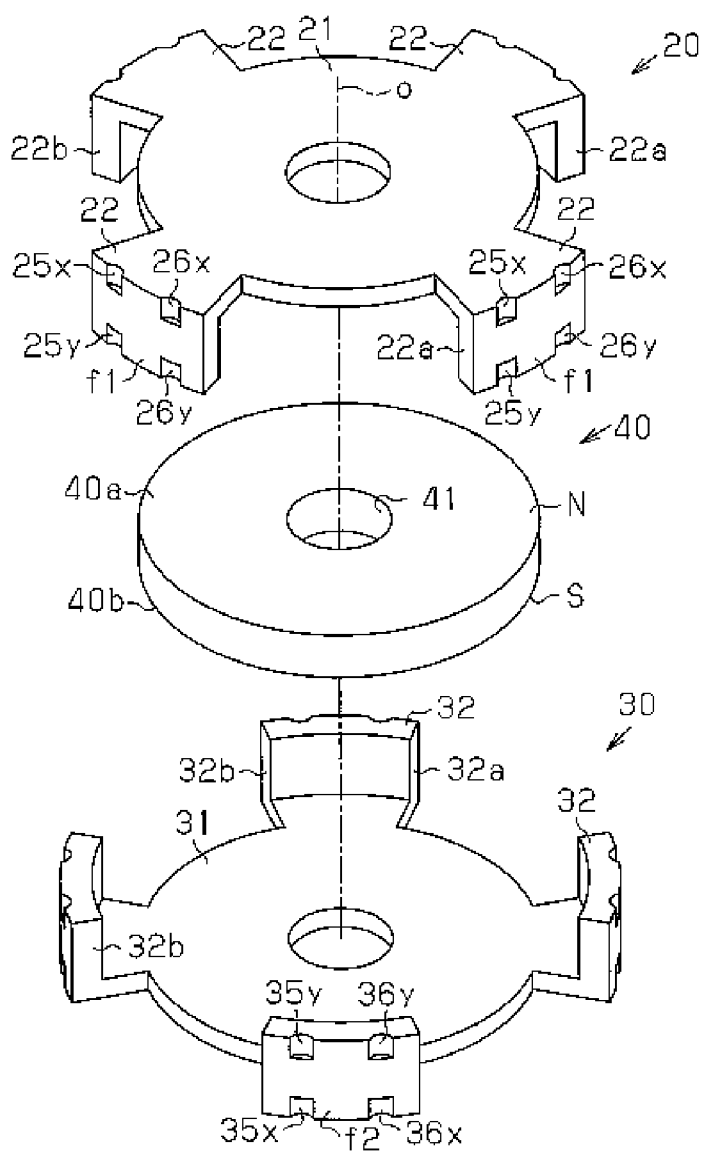
FIG. 21 is an exploded perspective view of the rotor of FIG. 18.

As shown in FIG. 18 to FIG. 21, the rotor 4 arranged at the inner side of the stator 2 includes first and second rotor cores 20, 30, and an annular magnet 40 (refer to FIG. 20 and FIG. 21).

(First Rotor Core 20)

As shown in FIG. 21, the first rotor core 20 includes a first core base 21 formed in a substantially disk shape, and four first claw magnetic pole portions 22 aligned at equal intervals at an outer circumferential portion of the first core base 21. Each of the first claw magnetic pole portions 22 is formed to protrude to a radially outer side and extend in the axial direction.

Further, an angle of each first claw magnetic pole portion 22 in the circumferential direction, that is, an angle between the two circumferential end surfaces 22a, 22b is set to be smaller than an angle of a gap between adjacent ones of the first claw magnetic pole portions 22 in the circumferential direction.

Further, the radially outer surface f1 of the first claw magnetic pole portion 22 has an arcuate surface having a cross-sectional shape in a direction orthogonal to the axial direction is concentric with a circle of which center is the axis O of the rotation shaft 3.

In the present embodiment, the radially outer surface f1 includes a pair of first auxiliary grooves $25x$, $25y$ positioned at both end portions in an axial direction of the first claw magnetic pole portion 22 that is identical to an axial direction of the first auxiliary groove 25 formed in the second embodiment. In the same manner, the radially outer surface f1 includes a pair of second auxiliary grooves $26x$, $26y$ positioned at both end portions in the axial direction of the first claw magnetic pole portion 22 that is identical to an axial direction of the second auxiliary groove 26 formed in the second embodiment.

That is, the pair of first auxiliary grooves $25x$, $25y$ is formed apart without being communicated with one another in the axial direction, and the pair of second auxiliary grooves $26x$, $26y$ is formed apart without being communicated with one another in the axial direction.

Further, groove surfaces of the first auxiliary grooves 25x, 25y and the second auxiliary grooves 26x, 26y are arcuate surfaces of which a cross-sectional shape in a direction orthogonal to the axial direction becomes arc.

Accordingly, the radially outer surface f1 of the first claw magnetic pole portion 22 having the first auxiliary grooves 25x, 25y and the second auxiliary grooves 26x, 26y has a cross-sectional shape in a direction orthogonal to the axial direction at a central section in the axial direction, of a concentric circle shape having the axis O of the rotation shaft 3 as a center. However, the radially outer surface f1 as a whole does not become such concentric circle shape.

(Second Rotor Core 30)

As shown in FIG. 21, the second rotor core 30 has an identical shape as the first rotor core 20. The second rotor core 30 includes a substantially disk-shaped second core base 31, and four second claw magnetic pole portions 32 arranged at equal intervals at an outer circumferential portion of the second core base 31. The second claw magnetic pole portions 32 are formed to protrude to the radially outer side and extend in the axial direction.

End surfaces 32a, 32b of each second claw magnetic pole portion 32 in the circumferential direction are flat surfaces that extend in the radial direction. Further, an angle of each second claw magnetic pole portion 32 in the circumferential direction, that is, an angle between the two end surfaces 32a, 32b in the circumferential direction is set to be smaller than an angle of a gap between adjacent ones of the second claw magnetic pole portions 32 in the circumferential direction.

Further, the radially outer surface f2 of the second claw magnetic pole portion 32 has an arcuate surface having a cross-sectional shape in a direction orthogonal to the axial direction is concentric with a circle of which center is the axis O of the rotation shaft 3.

In the present embodiment, the radially outer surface f2 includes a pair of first auxiliary grooves 35x, 35y positioned at both end portions in the axial direction of the second claw magnetic pole portion 32 that is identical to an axial direction of the first auxiliary groove 35 formed in the second embodiment. In the same manner, the radially outer surface f2 includes a pair of second auxiliary grooves 36x, 36y positioned at both end portions in the axial direction of the second claw magnetic pole portion 32 that is identical to an axial direction of the second auxiliary groove 36 formed in the second embodiment.

That is, the pair of first auxiliary grooves 35x, 35y is formed apart without being communicated with one another in the axial direction, and the pair of second auxiliary grooves 36x, 36y is formed apart without being communicated with one another in the axial direction.

Further, groove surfaces of the first auxiliary grooves 35x, 35y and the second auxiliary grooves 36x, 36y are arcuate surfaces of which a cross-sectional shape in a direction orthogonal to the axial direction becomes arc.

Accordingly, the radially outer surface f2 of the second claw magnetic pole portion 32 having the first auxiliary grooves 35x, 35y and the second auxiliary grooves 36x, 36y has the cross-sectional shape in a direction orthogonal to the axial direction at a central section in the axial direction, of a concentric circle shape having the axis O of the rotation shaft 3 as a center. However, the radially outer surface f2 as a whole does not become such concentric circle shape.

Further, like the second embodiment, in the second rotor core 30, each of the second claw magnetic pole portions 32 is arranged between the respectively corresponding ones of the first claw magnetic pole portions 22. Further, like the second embodiment, the second rotor core 30 is assembled to the first rotor core 20 such that an annular magnet 40 (refer to FIG. 20) is arranged (sandwiched) between the first core base 21 and the second core base 31 in the axial direction.

Further, it is apparent that the first and second rotor cores 20, 30 of the present embodiment can be manufactured by the manufacturing method described in the second embodiment.

Next, the operation of the present embodiment will be described.

In the rotor 4, the radially outer surface f1 of the first claw magnetic pole portion 22 includes the pair of first auxiliary grooves 25x, 25y positioned at the both end portions in the axial direction of the first claw magnetic pole portion 22, and includes the pair of second auxiliary grooves 26x, 26y positioned at the both end portions in the axial direction of the first claw magnetic pole portion 22.

Further, in the rotor 4, the radially outer surface f2 of the second claw magnetic pole portion 32 includes the pair of first auxiliary grooves 35x, 35y positioned at the both end portions in the axial direction of the second claw magnetic pole portion 32, and includes the pair of second auxiliary grooves 36x, 36y positioned at the both end portions in the axial direction of the second claw magnetic pole portion 32.

Thus, the radially outer surface f1 of the first claw magnetic pole portion 22 has the cross-sectional shape in a direction orthogonal to the axial direction, at the central section in the axial direction, of the concentric circle shape having the axis O of the rotation shaft 3 as the center. However, the radially outer surface f1 as a whole does not become such concentric circle shape. In the same manner, the radially outer surface f2 of the second claw magnetic pole portion 32 has the cross-sectional shape in a direction orthogonal to the axial direction, at the central section in the axial direction, of the concentric circle shape having the axis O of the rotation shaft 3 as the center. However, the radially outer surface f2 as a whole does not become such concentric circle shape.

Thus, like the second embodiment, a change in magnetic field as aforementioned based on the first auxiliary grooves 25x, 25y, 35x, 35y and the second auxiliary grooves 26x, 26y, 36x, 36y becomes very large compared to the case before the formation of the first auxiliary grooves 25x, 25y, 35x, 35y and the second auxiliary grooves 26x, 26y, 36x, 36y, and the retaining force (detent torque) becomes large.

Moreover, the pair of first auxiliary grooves 25x, 25y and the pair of second auxiliary grooves 26x, 26y, which are formed on the radially outer surface f1 of the first claw magnetic pole portion 22, are formed at the axially symmetric positions with the center line L1 as the axis, and the angles formed by the pair of first auxiliary grooves 25x, 25y (first line L1a) and the pair of second auxiliary grooves 26x, 26y (second line L1b) conform to the cycle $\phi$ (=15 degrees) of the cogging torque.

In the same manner, the pair of first auxiliary grooves 35x, 35y and the pair of second auxiliary grooves 36x, 36y, which are formed on the radially outer surface f2 of the second claw magnetic pole portion 32, are formed at the axially symmetric positions with the center line L2 as the axis, and the angles formed by the pair of first auxiliary grooves 35x, 35y (first line L2a) and the pair of second auxiliary grooves 36x, 36y (second line L2b) conform to the cycle $\phi$ (=15 degrees) of the cogging torque.

Accordingly, like the second embodiment, auxiliary groove detent torque (corresponding to the auxiliary groove detent torque Tb in FIG. 14) is superimposed on detent torque before the groove formation (corresponding to the detent torque Ta before the groove formation in FIG. 14), and the total detent torque (corresponding to the total detent torque Tc in FIG. 14) can be drawn to its maximum.

Further, lengths in the axial direction of the pair of first auxiliary grooves 25x, 25y and the pair of second auxiliary grooves 26x, 26y respectively formed at the both end portions in the axial direction of the first claw magnetic pole portion 22 can suitably be changed. In the same manner, lengths in the axial direction of the pair of first auxiliary grooves 35x, 35y and the pair of second auxiliary grooves 36x, 36y respectively formed at the both end portions in the axial direction of the second claw magnetic pole portion 32 can suitably be changed. By suitably changing these lengths in the axial direction, a magnitude of the detent torque can be adjusted.

The fourth embodiment has the following advantages in addition to advantage (1) of the first embodiment.

(7) According to the present embodiment, the radially outer surfaces f1, f2 of the first and second claw magnetic pole portions 22, 32 include the pairs of first auxiliary grooves 25x, 25y and 35x, 35y and the pairs of second auxiliary grooves 26x, 26y and 36x, 36y positioned at the symmetric positions on both sides in the circumferential direction with the center lines L1, L2 as the axes. Thus, the detent torque can be increased, and the retaining force of the brushless motor M in a stationary state can be increased.

(8) According to the present embodiment, since the pairs of first auxiliary grooves 25x, 25y and 35x, 35y and the pairs of second auxiliary grooves 26x, 26y and 36x, 36y are formed at the positions where the angles θ1, θ2 that the grooves form respectively with the center lines L1, L2 become half cycle (=φ/2=7.5 degrees) of the cycle (angle φ) of the cogging torque, the total detent torque of a large magnitude can be generated.

Further, in the brushless motor M that is capable of forward and backward rotation, since the pairs of first auxiliary grooves 25x, 25y and 35x, 35y and the pairs of second auxiliary grooves 26x, 26y and 36x, 36y are formed at the axially symmetric positions, there is no cyclic fluctuation in the cogging toque to be generated between in the case of rotating forward and in the case of rotating backward.

(9) According to the present embodiment, the pair of first auxiliary grooves 25x, 25y and the pair of second auxiliary grooves 26x, 26y are respectively formed at the both end portions in the axial direction of the first claw magnetic pole portion 22. In the same manner, the pair of first auxiliary grooves 35x, 35y and the pair of second auxiliary grooves 36x, 36y are respectively formed at the both end portions in the axial direction of the second claw magnetic pole portion 32.

Accordingly, the lengths of these pairs of first auxiliary grooves 25x, 25y and 35x, 35y and pairs of second auxiliary grooves 26x, 26y and 36x, 36y in the axial direction can suitably be changed, and the magnitude of the detent torque can be adjusted by suitably changing these lengths in the axial direction.

(10) According to the present embodiment, the first auxiliary grooves 25x, 25y, 35x, 35y and the pairs of second auxiliary grooves 26x, 26y and 36x, 36y are respectively formed in a limited range, namely in the both end portions in the axial direction of the first and second claw magnetic pole portions 22, 32. Accordingly, a dimensional change caused upon forming the first auxiliary grooves 25x, 25y, 35x, 35y and the pairs of second auxiliary grooves 26x, 26y and 36x, 36y by elastic deformation (pressing) can be made small.

The fourth embodiment may be modified as follows.

The pairs of first auxiliary grooves 25x, 25y and 35x, 35y and the pairs of second auxiliary grooves 26x, 26y and 36x, 36y of the fourth embodiment may be adapted to the third embodiment. That is, the pairs of first auxiliary grooves 25x, 25y and 35x, 35y and the pairs of second auxiliary grooves 26x, 26y and 36x, 36y may respectively be formed on the same axial direction as the four auxiliary grooves 25L, 25R, 26L, 26R on the radially outer surface f1 and the four auxiliary grooves 35L, 35R, 36L, 36R on the radially outer surface f2 in the third embodiment.

Figure 22:
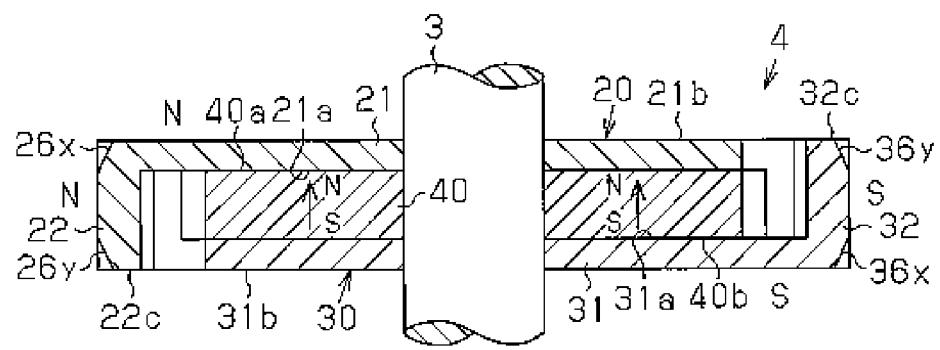
FIG. 22 is a cross-sectional view of a rotor showing another example of the fourth embodiment.

As shown in FIG. 22, the pairs of first auxiliary grooves 25x, 25y and 35x, 35y and the pairs of second auxiliary grooves 26x, 26y and 36x, 36y may be formed such that their depth in the radial direction becomes deeper toward the end portion in the axial direction. Thus, a finer adjustment in the magnitude of the detent torque can be achieved.

Further, in the fourth embodiment, although the cross-section in a direction orthogonal to the axial direction of the pairs of first auxiliary grooves 25x, 25y, 35x, 35y and the pairs of second auxiliary grooves 26x, 26y, 36x, 36y is arc, it may be U-shaped.

Figure 23:
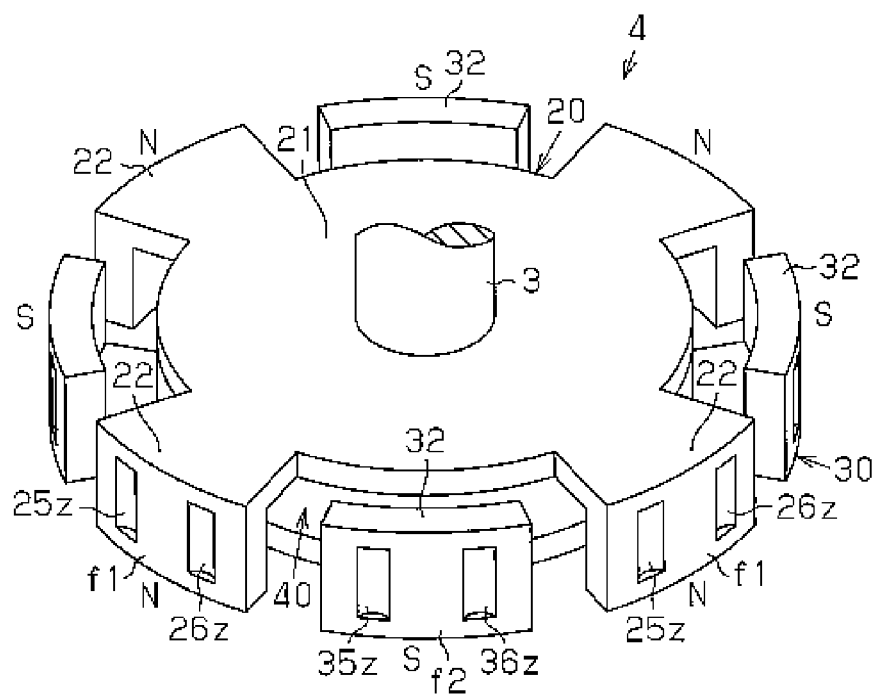
FIG. 23 is a perspective view of a rotor showing another example of the fourth embodiment as viewed in the axial direction.

As shown in FIG. 23, the radially outer surface f1 of the first claw magnetic pole portion 22 may include a first auxiliary groove 25z positioned at a central section in the axial direction, the axial direction being identical to the pair of first auxiliary grooves 25x, 25y, and a second auxiliary groove 26z positioned at a central section in the axial direction, the axial direction being identical to the pair of second auxiliary grooves 26x, 26y.

In the same manner, the radially outer surface f2 of the second claw magnetic pole portion 32 may include a first auxiliary groove 35z positioned at a central section in the axial direction, the axial direction being identical to the pair of first auxiliary grooves 35x, 35y, and a second auxiliary groove 36z positioned at a central section in the axial direction, the axial direction being identical to the pair of second auxiliary grooves 36x, 36y.

Thus, the radially outer surface f1 of the first claw magnetic pole portion 22 having the first auxiliary groove 25z and the second auxiliary groove 26z has the cross-sectional shape in a direction orthogonal to the axial direction at the both end portions in the axial direction, of a concentric circle shape having the axis O of the rotation shaft 3 as a center, however, the radially outer surface f1 as a whole does not become such concentric circle shape.

In the same manner, the radially outer surface f2 of the second claw magnetic pole portion 32 having the first auxiliary groove 35z and the second auxiliary groove 36z has the cross-sectional shape in a direction orthogonal to the axial direction at the both end portions in the axial direction, of a concentric circle shape having the axis O of the rotation shaft 3 as a center. However, the radially outer surface f2 as a whole does not become such concentric circle shape.

This obtains the same advantages as the fourth embodiment.

The first auxiliary grooves 25z, 35z and the second auxiliary grooves 26z, 36z shown in FIG. 23 may be implemented as another example of the third embodiment.

Fifth Embodiment

Next, a fifth embodiment of the present invention will be described with reference to FIG. 24 to FIG. 29.

The present embodiment has characteristics in the radially outer surfaces f1, f2 of the first and second claw magnetic pole portions 22, 32 shown in the first embodiment. Accordingly, the characteristic portions will be described in detail, and portions corresponding with the first embodiment will not be described in detail for the sake of convenience.

Figure 24:
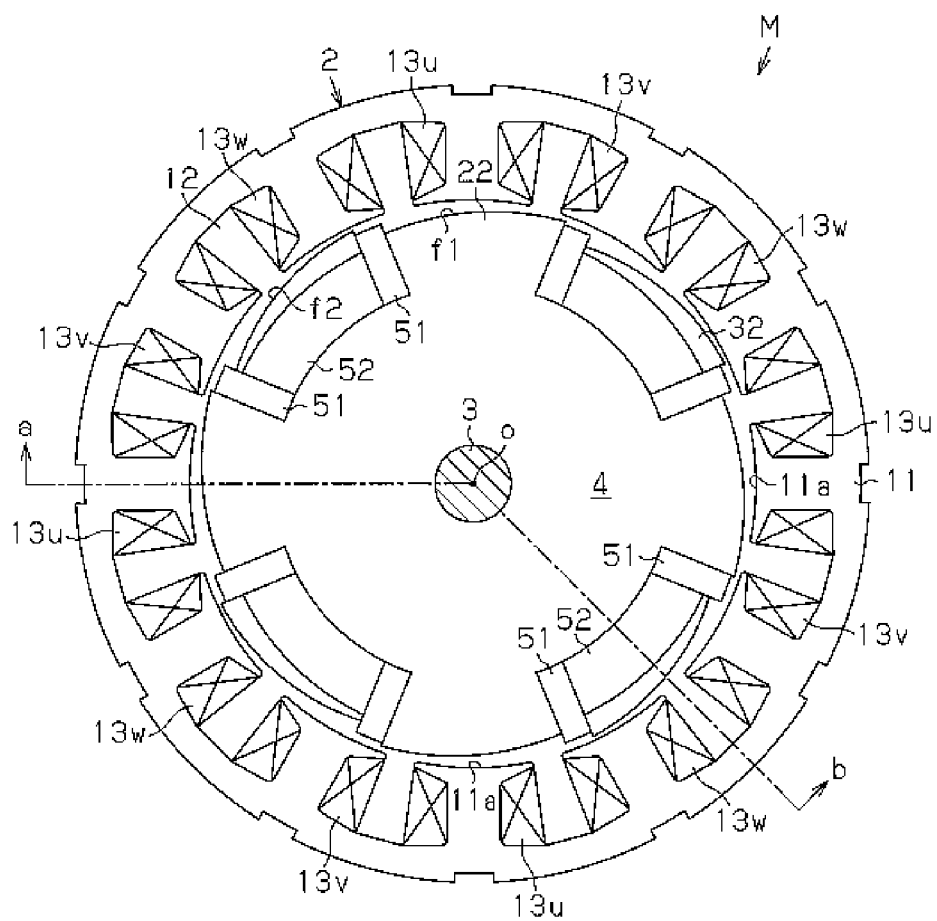
FIG. 24 is a cross-sectional view of a brushless motor according to a fifth embodiment of the present invention as viewed in the axial direction.

As shown in FIG. 24, a brushless motor M of the present embodiment has a stator 2, and a rotor 4 that is fixed to and rotates integrally with a rotation shaft 3 is arranged at an inner side of the stator 2.

The stator 2 includes a stator core 10, and twelve teeth 11 extend from the stator core 10. Each of the teeth 11 is a T-shaped tooth, and an inner circumferential surface 11a thereof in a radial direction is an arcuate surface obtained by extending an arc of a concentric circle with a center at an axis O of the rotation shaft 3, in the axial direction. Further, three-phase coils are wound on the twelve teeth 11 by concentrated winding, specifically, a U-phase coil 13u, a V-phase coil 13v, and a W-phase coil 13w are wound in this order on each of the twelve teeth 11 in a circumferential direction.

Further, a rotating magnetic field is formed in the stator 2 by applying a three-phase power voltage to these phase coils 13u, 13v, 13w thus wound.

Figure 26:
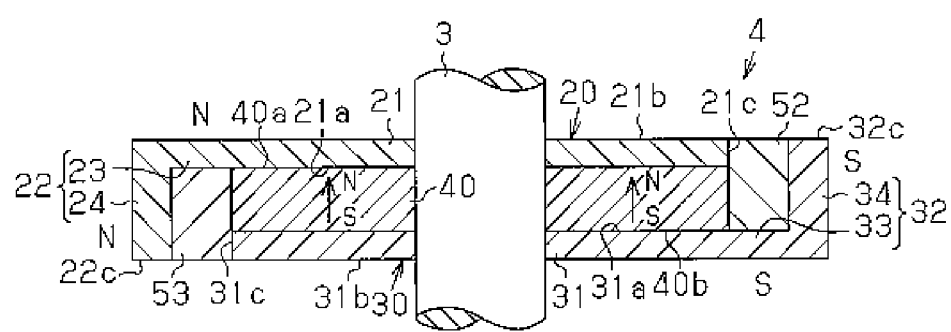
FIG. 26 is a combined cross-sectional view taken along line a-o-b in FIG. 24.
Figure 27:
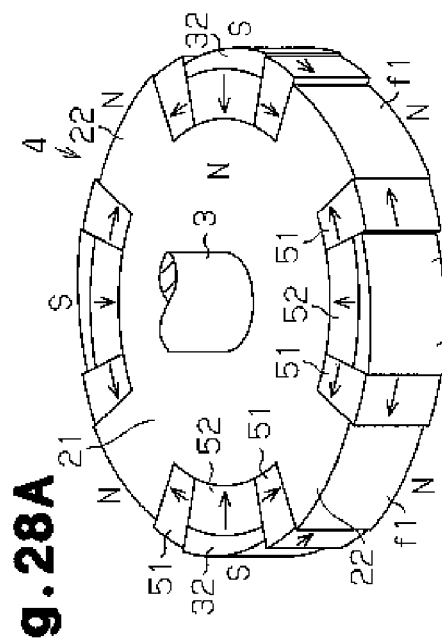
FIG. 27 is an exploded perspective view showing the rotor of FIG. 24 without interpolar auxiliary magnets and backside auxiliary magnets.

As shown inn FIG. 26 to FIG. 28, the rotor 4 arranged on the inside of the stator 2 includes first and second rotor cores 20, 30, an annular magnet 40, interpolar auxiliary magnets 51, and backside auxiliary magnets 52, 53.

(First Rotor Core 20)

As shown in FIG. 27, the first rotor core 20 includes a first core base 21 formed in a substantially disk shape, and four first claw magnetic pole portions 22 arranged at equal intervals on an outer circumferential portion of the first core base 21. Each of the first claw magnetic pole portions 22 is formed to protrude to a radially outer side and extend in the axial direction. Here, in each of the first claw magnetic pole portions 22, a portion protruded to a radially outer side from an outer circumferential surface 21c of the first core base 21 is referred to as a first base portion 23, and a distal end portion bent in an axial direction is referred to as a first magnetic pole portion 24.

Both end surfaces 22a, 22b in a circumferential direction of the first claw magnetic pole portion 22 including the first base portion 23 and the first magnetic pole portion 24 are flat surfaces extending in the radial direction. Further, an angle of each first claw magnetic pole portion 22 in the circumferential direction, that is, an angle between the two circumferential end surfaces 22a, 22b is set to be smaller than an angle of a gap between adjacent ones of the first claw magnetic pole portions 22 in the circumferential direction.

Further, as shown in FIG. 27, a radially outer surface f1 of the first claw magnetic pole portion 22 (first magnetic pole portion 24) has a cross-sectional shape in a direction orthogonal to the axial direction that does not become a concentric circle shape with the axis O of the rotation shaft 3 as a center.

Figure 25:
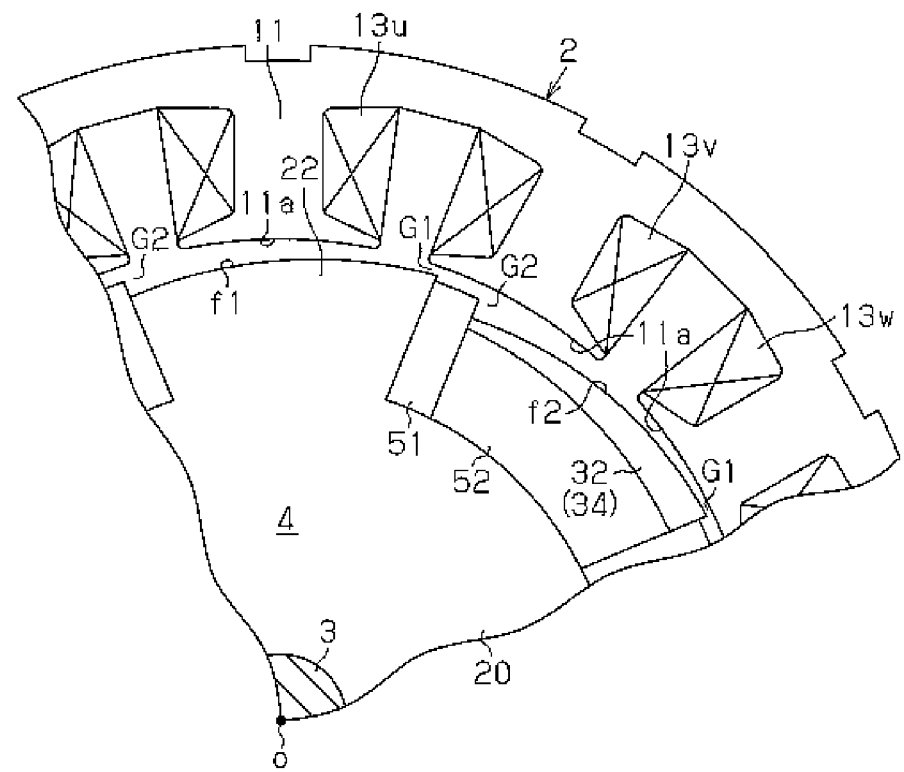
FIG. 25 is a front view of a main portion of the rotor of FIG. 24 as viewed in the axial direction.

More specifically, as shown in FIG. 25, a gap (air gap) between one end portion on a clockwise side of the radially outer surface f1 and a radially inner circumferential surface 11a of corresponding one of the teeth 11 is referred to as a first air gap G1. On the other hand, a gap (air gap) between the other end portion on a counterclockwise side of the radially outer surface f1 and the radially inner circumferential surface 11a of corresponding one of the teeth 11 is referred to as a second air gap G2. Further, the radially outer surface f1 of the first magnetic pole portion 24 makes the first air gap G1 to be narrower than the second air gap G2, and has an arcuate surface from one end portion on the clockwise side to the other end portion on the counterclockwise side.

That is, the radially outer surfaces f1 of the first magnetic pole portions 24 are formed such that the gaps (air gaps) between with the radially inner circumferential surfaces 11a of the teeth 11 become longer toward the counterclockwise side. Accordingly, the radially outer surfaces f1 do not become arcuate surfaces having the axis O of the rotation shaft 3 as the center.

Further, when the first air gap G1 is assumed as α mm and the second air gap G2 is assumed as β mm, $1.0 < \alpha/\beta \le 5.0$ is satisfied.

(Second Rotor Core 30)

As shown in FIG. 27, the second rotor core 30 has an identical shape as the first rotor core 20. The second rotor core 30 includes a second core base 31 formed in a substantially disk-shape, and four second claw magnetic pole portions 32 arranged at equal intervals on an outer circumferential portion of the second core base 31. The second claw magnetic pole portions 32 are formed to protrude to the radially outer side and extend in the axial direction. Here, in each of the second claw magnetic pole portion 32, a portion protruded to the radially outer side from an outer circumferential surface 31c of the second core base 31 is referred to as a second base portion 33, and a distal end portion bent in the axial direction is referred to as a second magnetic pole portion 34.

Both end surfaces 32a, 32b in the circumferential direction of each second claw magnetic pole portion 32 including the second base portion 33 and the second magnetic pole portion 34 are flat surfaces that extend in the radial direction. Further, an angle of each second claw magnetic pole portion 32 in the circumferential direction, that is, an angle between the two end surfaces 32a, 32b in the circumferential direction is set to be smaller than an angle of a gap between adjacent ones of the second claw magnetic pole portions 32 in the circumferential direction.

Further, as shown in FIG. 27, a radially outer surface f2 of the second claw magnetic pole portion 32 (second magnetic pole portion 34) has a cross-sectional shape in a direction orthogonal to the axial direction that does not become a concentric circle shape with the axis O of the rotation shaft 3 as a center.

More specifically, as shown in FIG. 25, a gap (air gap) between one end portion on the clockwise side of the radially outer surface f2 and the radially inner circumferential surface 11a of corresponding one of the teeth 11 is referred to as a first air gap G1, similar to the first magnetic pole portion 24. On the other hand, a gap (air gap) between the other end portion on the counterclockwise side of the radially outer surface f2 and the radially inner circumferential surface 11a of corresponding one of the teeth 11 is referred to as a second air gap G2, similar to the first magnetic pole portion 24. Further, the radially outer surface f2 of the second magnetic pole portion 34 makes the first air gap G1 to be narrower than the second air gap G2, and has an arcuate surface from the one end portion on the clockwise side to the other end portion on the counterclockwise side.

That is, the radially outer surfaces f2 of the second magnetic pole portions 34 are formed such that the gaps (air gaps) between with the radially inner circumferential surfaces 11a of the teeth 11 become longer toward the counterclockwise side. Accordingly, the radially outer surfaces f2 do not become arcuate surfaces having the axis O of the rotation shaft 3 as the center.

Further, when the first air gap G1 is assumed as α mm and the second air gap G2 is assumed as β mm, $1.0 < \alpha/\beta \le 5.0$ is satisfied, similar to the first magnetic pole portion 24.

Further, in the same manner as the first embodiment, in the second rotor core 30, each of the second claw magnetic pole portions 32 is arranged between respectively corresponding ones of the first claw magnetic pole portions 22. At this point, as shown in FIG. 20, in the same manner as the first embodiment, the second rotor core 30 is assembled to the first rotor core 20 such that an annular magnet 40 is arranged (sandwiched) between the first core base 21 and the second core base 31 in the axial direction.

Figure 28A:
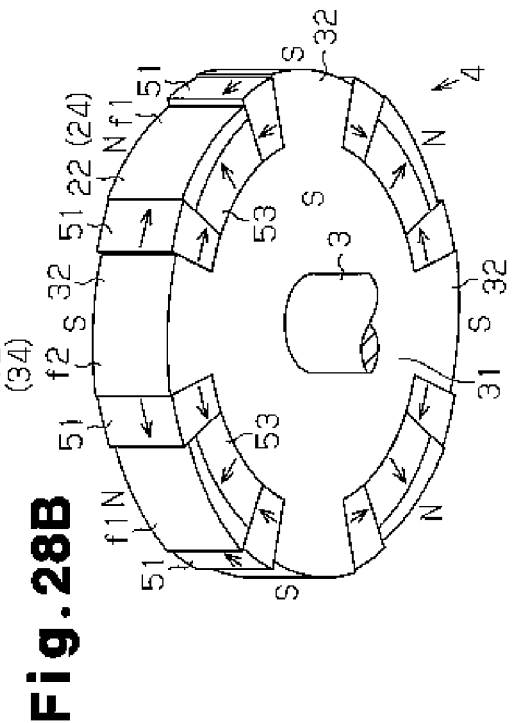
FIG. 28A is a perspective view of the rotor of FIG. 24 as viewed from a first rotor core side.
Figure 28B:
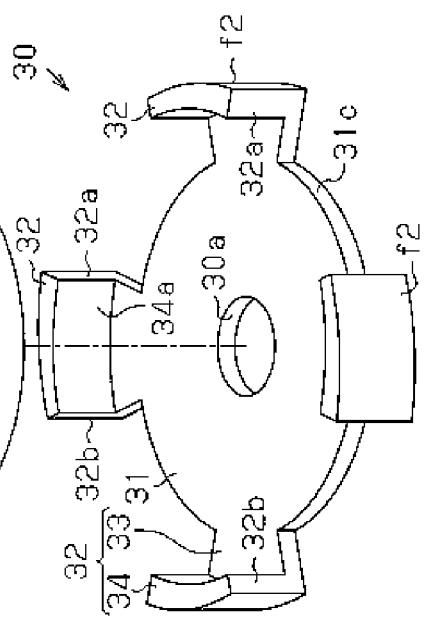
FIG. 28B is a perspective view of the rotor of FIG. 28A as viewed from a second rotor core side.

As shown in FIGS. 28A and 28B, in the rotor 4, the interpolar auxiliary magnets 51 are arranged between the first claw magnetic pole portions 22 and the second claw magnetic pole portions 32, and the backside auxiliary magnets 52, 53 are respectively arranged at the radially inner sides of the first and second magnetic pole portions 24, 34.

Here, a magnetizing direction of the interpolar auxiliary magnets 51 is magnetized such that a first claw magnetic pole portion 22 side becomes an N pole, and a second claw magnetic pole portion 32 side becomes an S pole. On the other hand, the backside auxiliary magnets 52 shown in FIG. 28A are magnetized such that portions on a first core base 21 side become the N poles, and portions on the second claw magnetic pole portion 32 side become the S poles. Further, the backside auxiliary magnets 53 shown in FIG. 28B are magnetized such that portions on a second core base 31 side become the S poles, and portions on the first claw magnetic pole portion 22 side become the N poles.

Next, the operation of the fifth embodiment will be described.

Now, in the brushless motor M that is rotating, when the application of the three-phase power voltage to the respective phase coils 13u, 13v, 13w is stopped, the rotating magnetic field disappears and the rotor 4 stops its rotation. Here, the rotor 4 stops at a rotation position where magnetic flux flowing into the teeth 11 of the stator core 10 from the first magnetic pole portions 24 of the first rotor core 20 and magnetic flux flowing from the teeth 11 of the stator core 10 into the second magnetic pole portions 34 of the second rotor core 30 respectively come to their respective most stabilized states.

That is, in this case, the radially outer surfaces f1 (radially outer surfaces f2) of one of the first and second magnetic pole portions 24, 34 are positioned to respectively oppose the radially inner circumferential surfaces 11a of the teeth 11. FIG. 24 shows a case where the radially outer surfaces f1 of the first claw magnetic pole portions 22 are positioned to respectively oppose the radially inner circumferential surfaces 11a of the teeth 11. In this case, since the brushless motor M is a motor having the rotor 4 with eight poles and the stator 2 with twelve slots, each of the radially outer surfaces f2 of the second claw magnetic pole portions 34 is located at a middle position between adjacent ones of the teeth 11.

Under this state, if the rotor 4 (rotation shaft 3) is rotated in the clockwise direction, each radially outer surface f1 of the first magnetic pole portions 24 rotates in the clockwise direction relative to the radially inner circumferential surface 11a of corresponding one of the teeth 11.

The radially outer surfaces f1, f2 of the first and second magnetic pole portions 24, 34 have the arcuate surfaces with which the gaps (air gaps) between with the radially inner circumferential surfaces 11a of the teeth 11 become longer toward the other end portion on the counterclockwise side. In other words, an outer diameter of each of the radially outer surfaces f1, f2 of the first claw magnetic pole portions 22 and the second claw magnetic pole portions 32 becomes continuously shorter toward a second end portion from a first end portion in the circumferential direction. Thus, the magnetic flux gradually decreases accompanying the rotation in the clockwise direction. Accordingly, since working to return to an original state of the magnetic flux, that is, the magnetic flux of a large magnitude is caused, retaining force (detent torque) relative to the rotation in the clockwise direction becomes large.

In contrast, if the rotor 4 (rotation shaft 3) is rotated in the counterclockwise direction, each of the radially outer surfaces f1 of the first magnetic pole portions 24 rotates in the counterclockwise direction relative to the radially inner circumferential surface 11a of the corresponding one of the teeth 11. Here, the magnetic flux gradually increases accompanying the rotation in the counterclockwise direction. Accordingly, since the magnetic flux comes to be larger than the original magnetic flux of a large magnitude, the retaining force (detent torque) relative to the rotation in the counterclockwise direction does not change.

Accordingly, the radially outer surfaces f1, f2 of the first and second magnetic pole portions 24, 34 are formed in arcuate surfaces of which the gaps (air gaps) between with the radially inner circumferential surfaces 11a of the teeth 11 become longer toward the other end portion on the counterclockwise side. As a result, with respect to the rotating direction of the rotor 4, the detent torque relative to the rotation in the clockwise direction becomes larger than the retaining force (detent torque) relative to the rotation in the counterclockwise direction.

Figure 29:
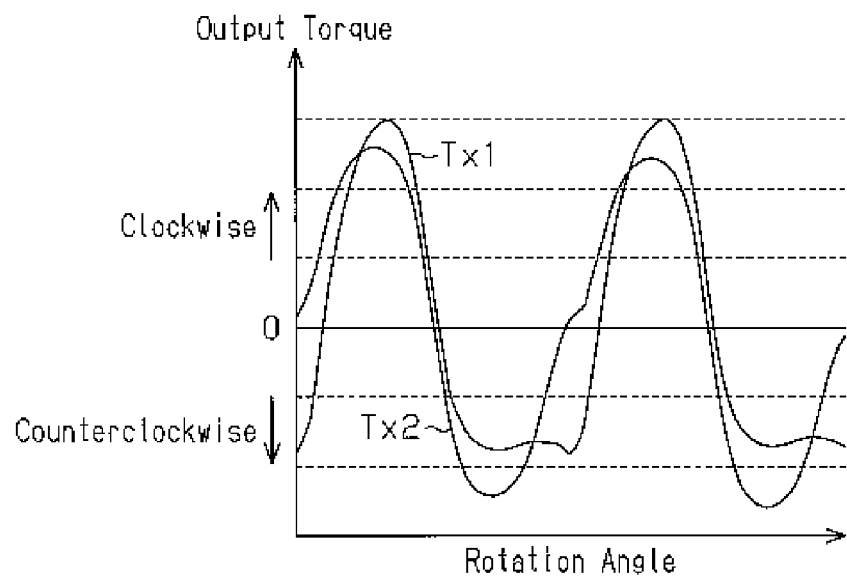
FIG. 29 is a diagram showing the relationship of detent torque in the fifth embodiment.

FIG. 29 is a graph showing an evaluation result of detent torque Tx1 when the radially outer surfaces f1, f2 of the first and second magnetic pole portions 24, 34 are formed in the arcuate surfaces of which air gaps between with the radially inner circumferential surfaces 11a of the teeth 11 become longer toward the other end portion in the counterclockwise side. The detent torque Tx1 obtained herein is detent torque when the first air gap G1 is assumed as $\alpha$ mm, the second air gap G2 is assumed as $\beta$ mm, and $(\alpha/\beta)=5.0$.

Further, detent torque Tx2 relative to a rotation angle shown in FIG. 29 shows detent torque in the case where the radially outer surfaces f1, f2 of the first and second magnetic pole portions 24, 34 are of the concentric circle shapes with the axis O of the rotation shaft 3 as the center. In other words, the detent torque Tx2 is detent torque when the first air gap G1 is assumed as $\alpha$ mm, the second air gap G2 is assumed as $\beta$ mm, and $(\alpha/\beta)=1.0$.

As is apparent from FIG. 29, relative to the detent torque Tx2 in the case where the radially outer surfaces f1, f2 are of the concentric circle shapes with the axis O of the rotation shaft 3 as the center, it can be understood that the detent torque Tx1 of the present embodiment exhibits large retaining force (detent torque) in the clockwise direction. In contrast, in the counterclockwise direction, relative to the detent torque Tx2, it can be understood that the detent torque Tx1 of the present embodiment exhibits small retaining force (detent torque).

That is, when setting the first air gap G1 as $\alpha$ mm, and the second air gap G2 as $\beta$ mm with the first air gap G1 and the second air gap G2 in a range of $1.0<(\alpha/\beta)\leq 5.0$, the detent torque relative to the rotation in the clockwise direction can be increased to be greater than the detent torque relative to the rotation in the counterclockwise direction, without significantly reducing output.

Further, as is apparent from the detent torque Tx1 in FIG. 29, since the radially outer surfaces f1, f2 of the first and second magnetic pole portions 24, 34 are formed of the circular arcuate surfaces, that is, by smooth curved lines, it can be understood that the retaining force (detent torque) in the clockwise direction changes smoothly relative to the rotation angle.

The fifth embodiment has the following advantages in addition to advantage (1) of the first embodiment.

(11) According to the present embodiment, the radially outer surfaces f1, f2 of the first and second magnetic pole portions 24, 34 are formed in the arcuate surfaces of which the gaps (air gaps) between with the radially inner circumferential surfaces 11a of the teeth 11 become longer toward the other end portion on the counterclockwise side. Accordingly, in the rotating direction of the rotor 4, the retaining force relative to the rotation in the clockwise direction can be increased to be greater than the retaining force (detent torque) relative to the rotation in the counterclockwise direction.

Moreover, since the radially outer surfaces f1, f2 of the first and second magnetic pole portions 24, 34 are formed in the arcuate surfaces, that is, in the curved shapes, the retaining force (detent torque) relative to the rotation in the clockwise direction can smoothly be changed relative to the rotation angle.

(12) According to the present embodiment, when the first air gap G1 is assumed as α mm, and the second air gap G2 is assumed as β mm, the first air gap G1 and the second air gap G2 are set in the range of 1.0<(α/β)≤5.0. Accordingly, the detent torque relative to the rotation in the clockwise direction can be increased to be greater than the detent torque relative to the rotation in the counterclockwise direction, without significantly reducing the output.

(13) According to the present embodiment, since the auxiliary magnets 51, 52, 53 are provided in the rotor 4, the magnetic flux generated between the first and second claw magnetic pole portions 22, 32 and the teeth 11 of the stator core 10 becomes large, and a change in magnetic field can further be enlarged, whereby the retaining force (detent torque) can further be increased.

In addition, the fifth embodiment may be modified as follows.

In the present embodiment, the radially outer surfaces f1, f2 of the first and second magnetic pole portions 24, 34 are formed in the arcuate surfaces of which the air gaps between with the radially inner circumferential surfaces 11a of the teeth 11 become longer toward the other end portion on the counterclockwise side.

On the contrary to this, it may be configured that arcuate surfaces of which the air gaps between with the radially inner circumferential surfaces 11a of the teeth 11 become longer toward the one end portion on the clockwise side in the radially outer surfaces f1, f2.

In this case, in the rotating direction of the rotor 4, the retaining force relative to the rotation in the counterclockwise direction can be increased to be greater than the retaining force (detent torque) relative to the rotation in the clockwise direction.

In the present embodiment, the cross-sectional shapes in a direction orthogonal to the axial direction of the radially outer surfaces f1, f2 are formed in the arcuate surfaces of which the air gaps between with the radially inner circumferential surfaces 11a of the teeth 11 become longer toward the other end portion on the counterclockwise side, that is, in nonlinear arcuate surfaces. Alternatively, the cross-sectional shapes in a direction orthogonal to the axial direction of the radially outer surfaces f1, f2 may be formed in cross-sectional shapes obtained by connecting the both end portions in the circumferential direction by a straight line (linearly), and by flat surfaces of which air gaps between with the radially inner circumferential surfaces 11a of the teeth 11 become longer toward the other end portion on the counterclockwise side.

In the present embodiment, the interpolar auxiliary magnets 51 are arranged between the first claw magnetic pole portions 22 and the second claw magnetic pole portions 32, and the backside auxiliary magnets 52, 53 are respectively arranged at the radially inner sides of the first and second claw magnetic pole portions 22, 32. However, these interventions of magnets may be omitted.

In the present embodiment, the radially outer surfaces f1, f2 of the first and second magnetic pole portions 24, 34 are formed in the arcuate surfaces of which the air gaps between with the radially inner circumferential surfaces 11a of the teeth 11 become longer toward the end portion on the counterclockwise side. Alternatively, the radially outer surfaces f1, f2 may be of step-shaped surfaces.

Figure 30:
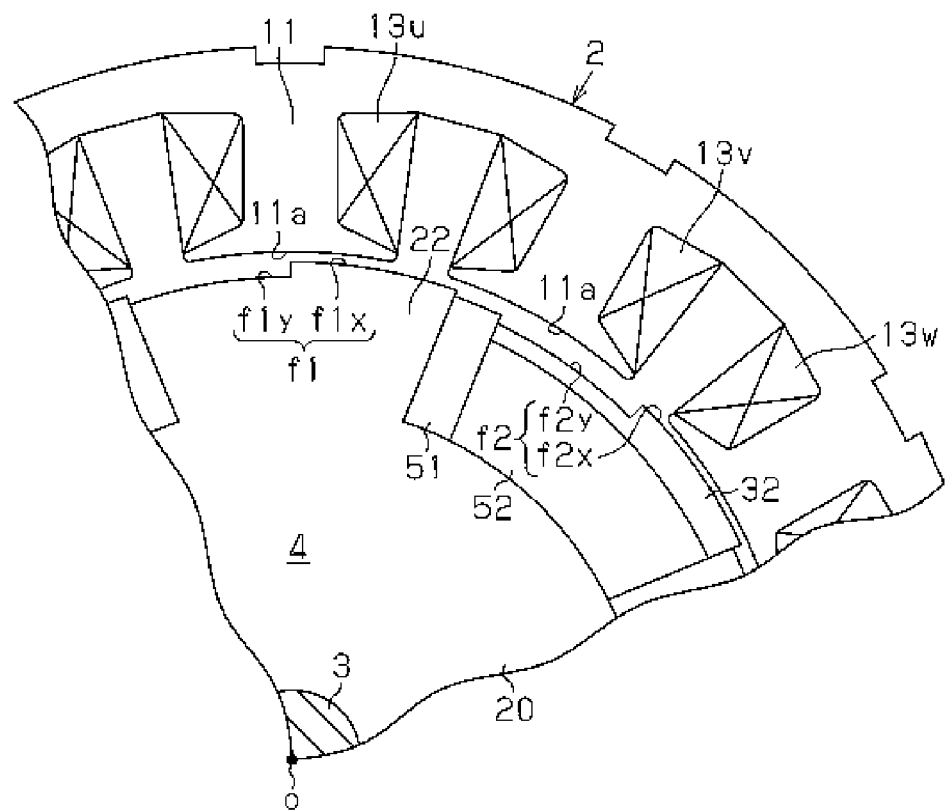
FIG. 30 is a front view of a main portion of a rotor showing another example of the fifth embodiment as viewed in the axial direction.

For example, as shown in FIG. 30, in the radially outer surface f1 of the first magnetic pole portion 24, a straight line that passes through a middle position in the circumferential direction of the first claw magnetic pole portion 22 from the axis O of the rotation shaft 3 is referred to as a center line L1. Further, the radially outer surface f1 includes a first arcuate surface f1x on the clockwise side and a second arcuate surface f1y on the counterclockwise side with the center line L1 as a boundary. The first arcuate surfaces f1x and the second arcuate surfaces f1y are two concentric circles having steps and with the axis O of the rotation shaft 3 as centers. That is, an outer diameter of the second arcuate surfaces f1y is shorter than an outer diameter of the first arcuate surfaces f1x. In other words, the radially outer surface f1 has an outer diameter that becomes shorter step by step from the one end portion to the other end portion in the circumferential direction.

Further, an air gap between the first arcuate surface f1x on the clockwise side and the radially inner circumferential surface 11a of corresponding one of the teeth 11 becomes smaller than an air gap between the second arcuate surface f1y on the clockwise side and the radially inner circumferential surface 11a of corresponding one of the teeth 11.

In the same manner, in the radially outer surface f2 of the second claw magnetic pole portion 32, a straight line that passes through a middle position in the circumferential direction of the second claw magnetic pole portion 32 from the axis O of the rotation shaft 3 is referred to as a center line L2. Further, the radially outer surface f2 includes a first arcuate surface f2x on the clockwise side and a second arcuate surface f2y on the counterclockwise side, with the center line L2 as a boundary. The first arcuate surfaces f2x and the second arcuate surfaces f2y are two concentric circles having steps and with the axis O of the rotation shaft 3 as centers. That is, an outer diameter of the second arcuate surfaces f2y is shorter than an outer diameter of the first arcuate surfaces f2x. In other words, the radially outer surface f2 has an outer diameter that becomes shorter step by step from the one end portion to the other end portion in the circumferential direction.

Further, an air gap between the first arcuate surface f2x on the clockwise side and the radially inner circumferential surface 11a of a tooth 11 becomes smaller than an air gap between the second arcuate surface f2y on the clockwise side and the radially inner circumferential surface 11a of the tooth 11.

In such a configuration also, in the rotating direction of the rotor 4, the retaining force relative to the rotation in the clockwise direction can be increased to be greater than the retaining force (detent torque) relative to the rotation in the counterclockwise direction.

Sixth Embodiment

Next, a sixth embodiment of the present invention will be described with reference to FIG. 31 to FIG. 35.

In the second embodiment, the first auxiliary grooves 25, 35 and the second auxiliary grooves 26, 36 are respectively formed on the radially outer surfaces f1, f2 of the first and second claw magnetic pole portions 22, 32. The present embodiment has characteristics in that portions corresponding to the first auxiliary grooves 25, 35 and the second auxiliary grooves 26, 36 are formed by separate members.

Accordingly, in the present embodiment, a rotor 4 that has the characteristic portion will be described in detail, and detailed descriptions of common portions with the second embodiment will be omitted for the sake of convenience of description.

Figure 31:
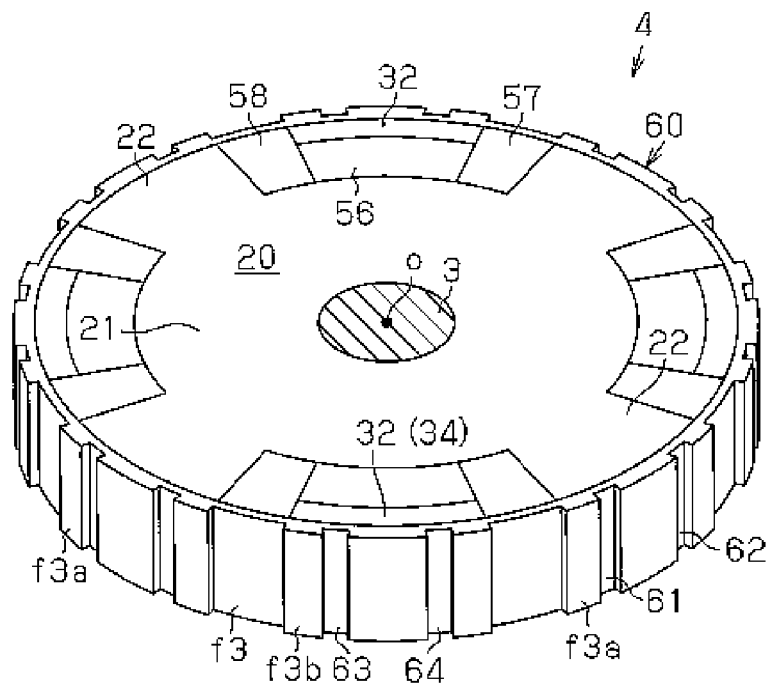
FIG. 31 is a perspective view of a rotor according to a sixth embodiment of the present invention as viewed in the axial direction.
Figure 33:
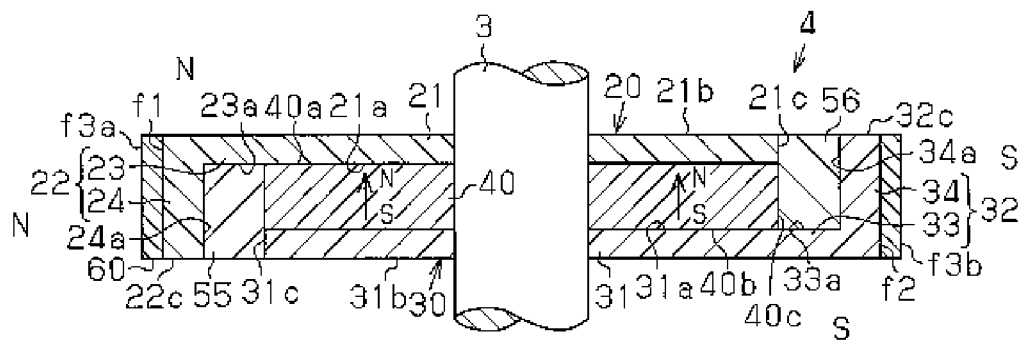
FIG. 33 is a combined cross-sectional view taken along line a-o-b in FIG. 32.

As shown in FIG. 31 and FIG. 33, the rotor 4 arranged at an inner side of a stator 2 (refer to FIG. 8 of the second embodiment) includes first and second rotor cores 20, 30, an annular magnet 40, first and second backside auxiliary magnets 55, 56, and first and second interpolar auxiliary magnets 57, 58. Further, as shown in FIG. 31, a retaining force formation member 60 is attached to an outer circumferential surface of the rotor 4 in a radial direction.

(First Rotor Core 20)

Figure 35:
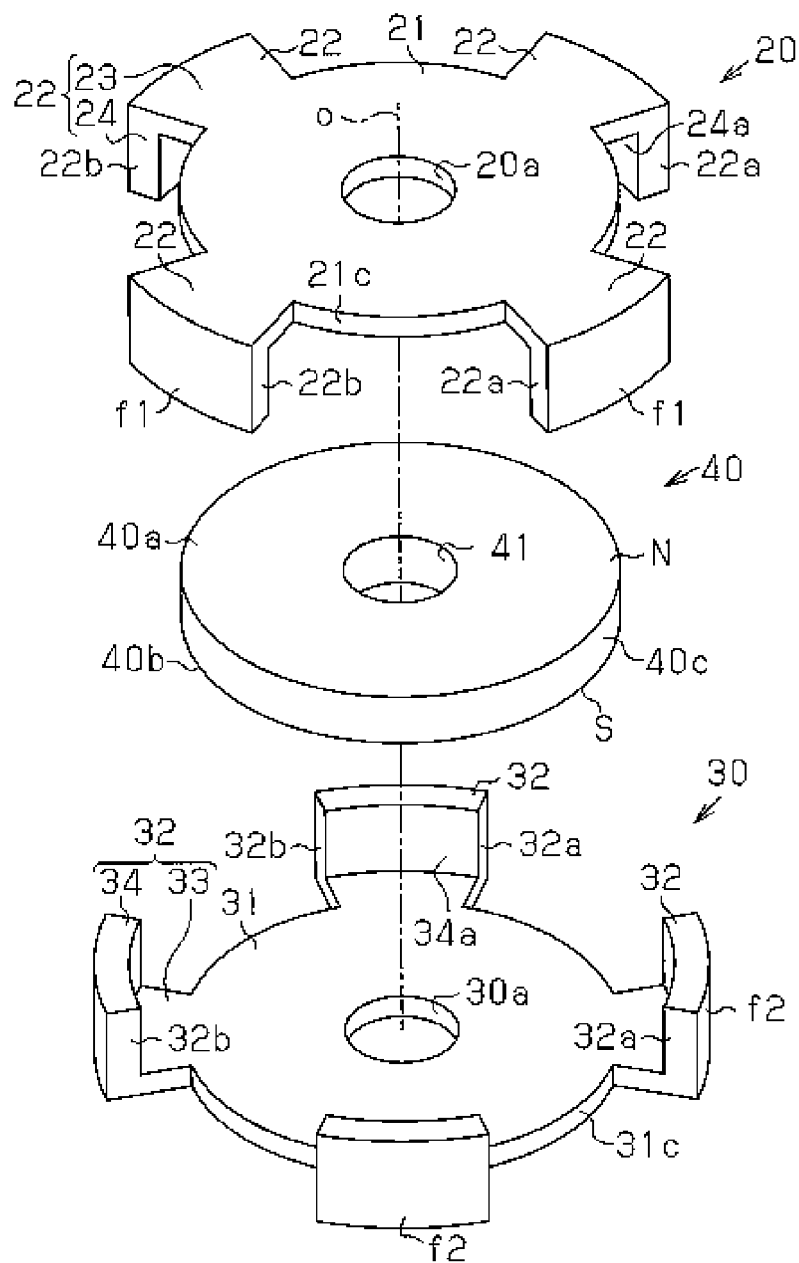
FIG. 35 is an exploded perspective view showing the rotor of FIG. 34 without interpolar auxiliary magnets, backside auxiliary magnets, and the retaining force formation member.

As shown in FIG. 35, the first rotor core 20 includes a first core base 21 formed in a substantially disk shape and having an insertion hole 20a into which the rotation shaft 3 is inserted and fixed, and a plurality (four in the present embodiment) of first claw magnetic pole portions 22 arranged at equal intervals at an outer circumferential portion of the first core base 21. Each of the first claw magnetic pole portions 22 is formed to protrude to a radially outer side and extend in the axial direction. Here, in each of the first claw magnetic pole portions 22, a portion protruded to a radially outer side from an outer circumferential surface 21c of the first core base 21 is referred to as a first base portion 23, and a distal end portion bent in an axial direction is referred to as a first magnetic pole portion 24.

Both end surfaces 22a, 22b in a circumferential direction of the first claw magnetic pole portion 22, which includes the first base portion 23 and the first magnetic pole portion 24, are flat surfaces extending in the radial direction. Further, an angle of each first claw magnetic pole portion 22 in the circumferential direction, that is, an angle between the two circumferential end surfaces 22a, 22b is set to be smaller than an angle of a gap between adjacent ones of first claw magnetic pole portions 22 in the circumferential direction.

Further, as shown in FIG. 35, a radially outer surface f1 of the first claw magnetic pole portion 22 has an arcuate surface of a cross-sectional shape in a direction orthogonal to the axial direction that becomes a concentric circle shape with an axis O of a rotation shaft 3 as a center. That is, the first and second auxiliary grooves 25, 26 are not formed on the radially outer surface f1 of the present embodiment, unlikely to the second embodiment, and the radially outer surface f1 is a concentric circle-shaped arcuate surface with the axis O of the rotation shaft 3 as a center.

(Second Rotor Core 30)

As shown in FIG. 35, the second rotor core 30 has an identical shape as the first rotor core 20. The second rotor core 30 includes a substantially disk-shaped second core base 31 having an insertion hole 30a into which the rotation shaft 3 is inserted and fixed, and four second claw magnetic pole portions 32 arranged at equal intervals on an outer circumferential portion of the second core base 31. The second claw magnetic pole portions 32 are formed to protrude to the radially outer side and extend in the axial direction. Here, in each of the second claw magnetic pole portion 32, a portion protruded to the radially outer side from an outer circumferential surface 31c of the second core base 31 is referred to as a second base portion 33, and a distal end portion bent in the axial direction is referred to as a second magnetic pole portion 34.

End surfaces 32a, 32b in the circumferential direction of each second claw magnetic pole portion 32, which includes the second base portion 33 and second magnetic pole portion 34, are flat surfaces that extend in the radial direction. Further, an angle of each second claw magnetic pole portion 32 in the circumferential direction, that is, an angle between the two end surfaces 32a, 32b in the circumferential direction is set to be smaller than an angle of a gap between adjacent ones of the second claw magnetic pole portions 32 in the circumferential direction.

Further, a radially outer surface f2 of the second claw magnetic pole portion 32 has an arcuate surface of a cross-sectional shape in a direction orthogonal to the axial direction is concentric with a circle of which center is the axis O of the rotation shaft 3. That is, the first and second auxiliary grooves 35, 36 are not formed on the radially outer surface f2 of the present embodiment, unlikely to the second embodiment, and the radially outer surface f2 is a concentric circle-shaped arcuate surface with the axis O of the rotation shaft 3 as a center.

Further, like the second embodiment, in the second rotor core 30, each of the second claw magnetic pole portions 32 is arranged between the corresponding ones of the first claw magnetic pole portions 22. At this point, like the second embodiment, the second rotor core 30 is assembled to the first rotor core 20 such that the annular magnet 40 (refer to FIG. 33) is arranged (sandwiched) between the first core base 21 and the second core base 31 in the axial direction.

(Annular Magnet 40)

As shown in FIG. 33 and FIG. 35, the annular magnet 40 sandwiched between the first rotor core 20 and the second rotor core 30 is a disk-shaped permanent magnet formed by a neodymium magnet.

As shown in FIG. 35, the annular magnet 40 has an insertion hole 41 at its center position, into which the rotation shaft 3 is inserted. Further, a side surface 40a of the annular magnet 40 on one side contacts the opposed surface 21a of the first core base 21, and a side surface 40b of the annular magnet 40 on one side contacts the opposed surface 31a of the second core base 31, respectively, and the annular magnet 40 is sandwiched and fixed between the first rotor core 20 and the second rotor core 30.

An outer diameter of the annular magnet 40 is set to conform to an outer diameter of the first and second core bases 21, 31, and a thickness thereof is set to a predetermined thickness.

That is, as shown in FIG. 33, when the annular magnet 40 is arranged between the first rotor core 20 and the second rotor core 30, a distal end surface 22c of each first magnetic pole portion 24 and a counter-opposed surface 31b of the second core base 31 are flush with each other. In the same manner, a distal end surface 32c of each of the second magnetic pole portions 34 and a counter-opposed surface 21b of the first core base 21 are flush with each other. Further, an outer circumferential surface 40c of the annular magnet 40 is flush with outer circumferential surfaces 21c, 31c of the first and second core bases 21, 31.

As shown in FIG. 33, the annular magnet 40 is magnetized in the axial direction so that a portion on a first rotor core 20 side becomes an N pole (first magnetic pole), and a portion on a second rotor core 30 side becomes an S pole (second magnetic pole). Accordingly, the first claw magnetic pole portions 22 of the first rotor core 20 function as N poles (first magnetic poles), and the second claw magnetic pole portions 32 of the second rotor core 30 function as S poles (second magnetic poles) due to the annular magnet 40.

Accordingly, the rotor 4 of the present embodiment is a so-called Lundell type rotor using the annular magnet 40. In the rotor 4, the first claw magnetic pole portions 22 as the N poles and the second claw magnetic pole portions 32 as the S poles are alternately arranged in the circumferential direction, and the number of magnetic poles becomes eight poles.

(First and Second Backside Auxiliary Magnets 55, 56)

As shown in FIG. 33, the first backside auxiliary magnets 55 are arranged on back surfaces 24a of the first magnetic pole portions 24 (radially inner surfaces), specifically, in spaces defined by the outer circumferential surface 31c of the second core base 31, the outer circumferential surface 40c of the annular magnet 40, and a surface 23a of the first base portion 23 on the second rotor core 30 side.

Each of the first backside auxiliary magnets 55 has a substantially rectangular parallelepiped shape of which cross-section in a direction orthogonal to the axial direction is a sector shape, and, in order to reduce leaking magnetic flux at that portion, it is magnetized in the radial direction such that a portion thereof contact with the back surface 24a of the first magnetic pole portion 24 becomes the N pole same as the first claw magnetic pole portions 22, and a portion contact with the second core base 31 becomes the S pole same as the second core base 31.

As shown in FIG. 33, the second backside auxiliary magnets 56 are arranged on back surfaces 34a of the second magnetic pole portions 34 (radially inner surfaces), specifically, in spaces defined by the outer circumferential surface 21c of the first core base 21, the outer circumferential surface 40c of the annular magnet 40, and a surface 33a of the second base portion 33 on the first rotor core 20 side.

Each of the second backside auxiliary magnets 56 has a substantially rectangular parallelepiped shape of which cross-section in a direction orthogonal to the axial direction is a sector shape, and, in order to reduce leaking magnetic flux at that portion, it is magnetized in the radial direction such that a portion thereof contact with the back surface 34a of the second magnetic pole portion 34 becomes the S pole same as the second claw magnetic pole portions 32, and a portion contact with the first core base 21 becomes the N pole same as the first core base 21.

(First and Second Interpolar Auxiliary Magnets 57, 58)

Figure 34:
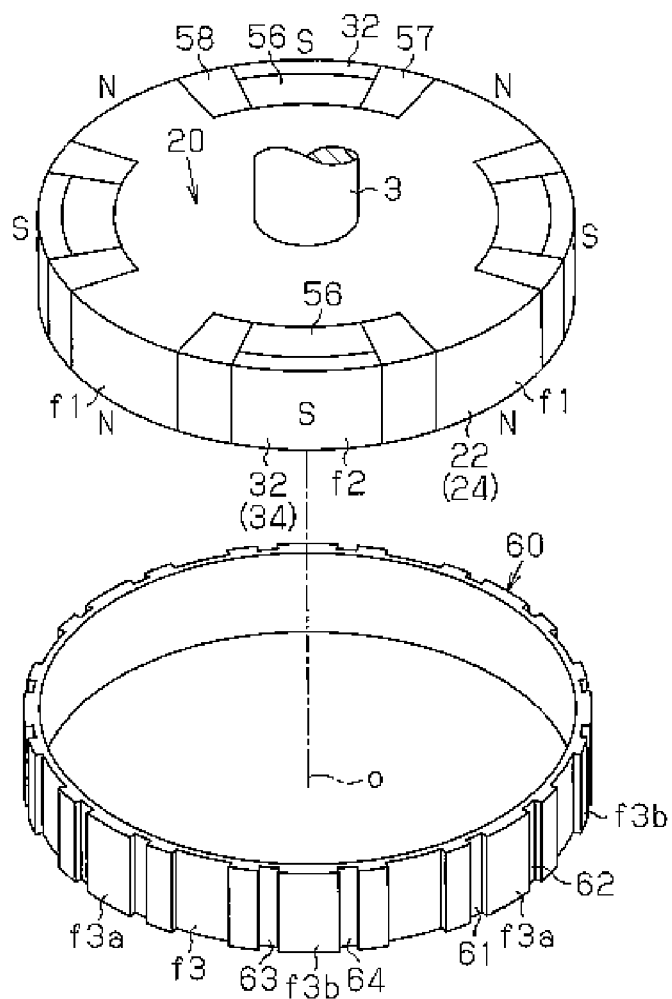
FIG. 34 is an exploded perspective view of the rotor illustrating a retaining force formation member of FIG. 31.

As shown in FIG. 34, the first and second interpolar auxiliary magnets 57, 58 are respectively arranged between the first claw magnetic pole portions 22 with the first backside auxiliary magnets 55 and the second claw magnetic pole portions 32 with the second backside auxiliary magnets 56, in the circumferential direction.

More specifically, each of the first interpolar auxiliary magnets 57 is arranged between a flat surface formed by one circumferential end surface 22a of the first claw magnetic pole portion 22 and a circumferential end surface of the first backside auxiliary magnet 55, and a flat surface formed by the other circumferential end surface 32b of the second claw magnetic pole portion 32 and a circumferential end surface of the second backside auxiliary magnet 56.

In the same manner, each of the second interpolar auxiliary magnets 58 is arranged between a flat surface formed by the other circumferential end surface 22b of the first claw magnetic pole portion 22 and a circumferential end surface of the first backside auxiliary magnet 55, and a flat surface formed by one circumferential end surface 32a of the second claw magnetic pole portion 32 and a circumferential end surface of the second backside auxiliary magnet 56.

Further, the first and second interpolar auxiliary magnets 57, 58 are magnetized in the circumferential direction so as to be of the same polarities respectively as the first and second claw magnetic pole portions 22, 32 (portion on the first claw magnetic pole portion 22 side becomes the N pole, and portion on the second claw magnetic pole portion 32 side becomes the S pole).

(Retaining Force Formation Member 60)

The retaining force formation member 60 is attached to the radially outer surface of the rotor 4.

As shown in FIG. 31 to FIG. 34, the retaining force formation member 60 in the present embodiment is formed of an electromagnetic steel plate configured of a soft magnetic material. Further, the retaining force formation member 60 may be formed of a composite magnetic material. The retaining force formation member 60 is formed in a cylindrical shape, and a radially inner surface thereof is attached under pressure to the radially outer surface of the rotor 4 with the first and second rotor cores 20, 30, the annular magnet 40, the first and second backside auxiliary magnets 55, 56, and the first and second interpolar auxiliary magnets 57, 58 assembled. Further, the retaining force formation member 60 is integrally fixed to the rotor 4, and is not displaced relative to the rotor 4. In addition, the cylindrical-shaped retaining force formation member 60 has its axial length matched with the axial length of the rotor 4.

Further, a radially outer surface f3 of the retaining force formation member 60 has an arcuate surface of a cross-sectional shape in a direction orthogonal to the axial direction is concentric with a circle of which center is the axis O of the rotation shaft 3. Further, in the radially outer surface f3, each regional surface opposing the radially outer surface f1 of the first magnetic pole portion 24 is a first large diameter-side surface f3a having a large diameter. In each of the first large diameter-side surfaces f3a, two grooves, namely, a first groove 61 and a second groove 62, are arranged.

Figure 32:
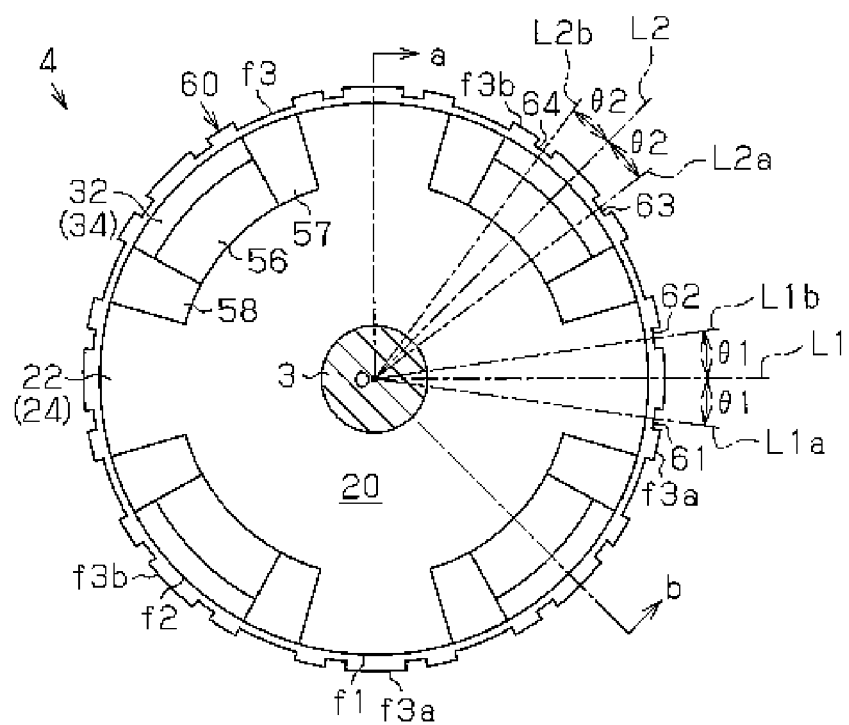
FIG. 32 is a front view of the rotor of FIG. 31 as viewed in the axial direction.

More specifically, as shown in FIG. 32, in each of the first large diameter-side surfaces f3a, a straight line that passes through a middle p in the circumferential direction of the first claw magnetic pole portion 22 from the axis O of the rotation shaft 3 is referred to as a center line L1. With the center line L1 as a reference, straight lines that extend from the axis O to be apart in both a clockwise side and a counterclockwise side by an angle θ1 are respectively referred to as a first line L1a and a second line L1b.

Here, the angle θ1 is calculated based on a cycle of cogging torque (angle φ) by using the following calculation formula.

$$\theta 1 = (\tfrac{1}{2} + n) \cdot \phi$$

Here, n is an integer, and in the present embodiment, n=0.

Generally, the cycle φ of the cogging torque is a value obtained by dividing 360 degrees by the least common multiple of the number of magnetic poles of the rotor 4 and the number of slots of the stator 2.

In the present embodiment, since the number of magnetic poles of the rotor 4 is eight and the number of slots of the stator 2 is twelve, the least common multiple becomes twenty four. Further, the cycle φ of the cogging torque becomes 15 (=360/24) degrees.

Accordingly, the angle θ1 becomes 7.5 (=15/2) degrees.

Further, in each of the first large diameter-side surfaces f3a, the first line L1a and the second line L1b displaced from the center line L1 as the center in the clockwise direction and in the counterclockwise direction respectively by 7.5 degrees are specified. Further, grooves with a constant width are arranged in the axial direction respectively with the first line L1a and the second line L1b as middle positions in the circumferential direction.

Further, the groove that has the first line L1a as the circumferential middle position is referred to as the first groove 61, and on the contrary, the groove that has the second line L1b as the circumferential middle position is referred to as the second groove 62. Accordingly, an angle that the first groove 61 and the second groove 62 form with the axis O of the rotation shaft 3 as the center matches a cycle φ of cogging torque (=15 degrees).

That is, an angle formed by the center line L1 and the first line L1a and an angle formed by the center line L1 and the second line L1b both become half cycle of the cycle φ of the cogging torque (=7.5 degrees), and therefore, the first groove 61 and the second groove 62 are formed at symmetric positions with the center line L1 as a symmetrical axis.

Further, since each of the first large diameter-side surfaces f3a includes the arranged first and second grooves 61, 62, a cross-sectional shape in a direction orthogonal to the axial direction as a whole does not become a concentric arc shape having the axis O of the rotation shaft 3 as a center.

On the other hand, in the radially outer surface f3 of the retaining force formation member 60, each regional surface opposing the radially outer surface f2 of the second magnetic pole portion 34 is a second large diameter-side surface f3b having a large outer diameter in the same shape as the first large diameter-side surface f3a. In each of the second large diameter-side surfaces f3b, two grooves, namely, a first groove 63 and a second groove 64, are arranged.

More specifically, as shown in FIG. 32, in each of the second large diameter-side surfaces f3b, a straight line that passes through a middle position in the circumferential direction of the second claw magnetic pole portion 32 from the axis O of the rotation shaft 3 is referred to as a center line L2. With the center line L2 as a reference, straight lines that extend from the axis O to be apart respectively in the clockwise side and the counterclockwise side by an angle $\theta 2$ are respectively referred to as a first line L2a and a second line L2b.

Here, the angle $\theta 2$ was calculated based on a cycle of cogging torque (angle $\phi$) by using the following calculation formula.

$$\theta 2 = (\tfrac{1}{2} + n) \cdot \phi$$

Here, n is an integer, and in the present embodiment, n=0.

Generally, the cycle $\phi$ of the cogging torque is a value obtained by dividing 360 degrees by the least common multiple of the number of magnetic poles of the rotor 4 and the number of slots of the stator 2.

In the present embodiment, since the number of magnetic poles of the rotor 4 is eight and the number of slots of the stator 2 is twelve, the least common multiple becomes twenty four. Further, the cycle $\phi$ of the cogging torque becomes 15 (=360/24) degrees.

Accordingly, the angle $\theta 2$ becomes 7.5 (=15/2) degrees.

Further, in each of the second large diameter-side surfaces f3b, the first line L2a and the second line L2b displaced from the center line L1 as the center in the clockwise direction respectively in the counterclockwise direction by 7.5 degrees are specified. Further, grooves having a constant width are arranged in the axial direction respectively with the first line L2a and the second line L2b as middle positions in the circumferential direction.

Further, the groove that has the first line L2a as the circumferential middle position is referred to as the first groove 63, and on the contrary, the groove that has the second line L2b as the circumferential middle position is referred to as the second groove 64. Accordingly, an angle that the first groove 63 and the second groove 64 form with the axis O of the rotation shaft 3 as the center matches the cycle $\phi$ of the cogging torque (=15 degrees).

That is, an angle formed by the center line L2 and the first line L2a and an angle formed by the center line L2 and the second line L2b both become half cycle of the cycle $\phi$ of the cogging torque (=7.5 degrees), and therefore, the first groove 63 and the second groove 64 are formed at symmetric positions with the center line L1 as a symmetrical axis.

Further, since each of the second large diameter-side surfaces f3b includes the arranged first and second grooves 63, 64, a cross-sectional shape in a direction orthogonal to the axial direction as a whole does not become a concentric arc shape having the axis O of the rotation shaft 3 as a center.

Further, in the radially outer surface f3 of the retaining force formation member 60, portions of the radially outer surface f3 between the alternately formed first and second large diameter-side surfaces f3a, f3b have increased magnetic resistance by being demagnetized by laser irradiation. Thus, leakage of magnetic flux from the portion of the first large diameter-side surface f3a to the portion of the second large diameter-side surface f3b in the retaining force formation member 60 is prevented.

Next, the operation of the sixth embodiment will be described.

The first and second large diameter-side surfaces f3a, f3b are formed on the radially outer surface f3 of the retaining force formation member 60 attached to the outer circumferential surface of the rotor 4, and the first grooves 61, 63 and the second grooves 62, 64 are formed on the first and second large diameter-side surfaces f3a, f3b. Thus, the radially outer surface f3 of the retaining force formation member 60 as a whole does not have a cross-sectional shape in a direction orthogonal to the axial direction is concentric with a circle of which center is the axis O of the rotation shaft 3.

Thus, like the second embodiment, a change in magnetic field based on the first grooves 61, 63 and the second grooves 62, 64 formed on the first and second large diameter-side surfaces f3a, f3b becomes very large, and retaining force (detent torque) becomes large.

Moreover, the first groove 61 and the second groove 62, which are formed on the first large diameter-side surface f3a, are formed at the axially symmetric positions with the center line L1 as the axis, and are formed such that the angle formed by the first groove 61 (first line L1a) and the second groove 62 (second line L1b) matches the cycle $\phi$ (=15 degrees) of the cogging torque.

In the same manner, the first groove 63 and the second groove 64, which are formed on the second large diameter-side surface f3b, are formed at the axially symmetric positions with the center line L2 as the axis, and are formed such that the angle formed by the first groove 63 (first line L2a) and the second groove 64 (second line L2b) matches the cycle $\phi$ (=15 degrees) of the cogging torque.

Accordingly, the total detent torque Tc shown in the second embodiment can be driven at its maximum.

The sixth embodiment has the following advantages in addition to advantage (1) of the first embodiment.

(14) According to the present embodiment, the retaining force formation member 60 is attached to the radially outer surface of the rotor 4. Further, the first and second large diameter-side surfaces f3a, f3b are formed on the radially outer surface f3 of the retaining force formation member 60, and the first grooves 61, 63 and the second grooves 62, 64 are formed at the symmetric positions on both sides in the circumferential direction with the center lines L1, L2 as the axes on the first and second large diameter-side surfaces f3a, f3b. As a result, simply by fitting the retaining force formation member 60 onto the rotor 4, gaps between the regional surfaces and the stator 2 respectively fluctuate when the rotor 4 rotates. Accordingly, the change in the magnetic field is generated at a large degree accompanying the fluctuation, resulting in a load upon the rotation. Thus, the detent torque can be increased, and the retaining force of the brushless motor M in a stationary state can be increased.

(15) According to the present embodiment, since the first grooves 61, 63 and the second grooves 62, 64 are formed at the positions where the angles $\theta 1$, $\theta 2$ that the grooves form respectively with the center lines L1, L2 become half cycle (=φ/2=7.5 degrees) of the cycle (angle φ) of the cogging torque, the largest the total detent torque Tc can be generated.

Further, in the brushless motor M capable of forward and backward rotation, since the first grooves 61, 63 and the second grooves 62, 64 are formed at the axially symmetric positions, there is no cyclic fluctuation in the cogging toque generated in both cases of rotating forward and rotating backward.

(16) According to the present embodiment, by attaching the retaining force formation member 60 on the radially outer surface of the rotor 4, the retaining force formation member 60 covers the radially outer surfaces of the first and second interpolar auxiliary magnets 57, 58. Accordingly, the retaining force formation member 60 is pressed against the radially outer surfaces of the first and second interpolar auxiliary magnets 57, 58. Therefore, even when centrifugal force by the rotation upon the rotor 4 rotating is applied to the first and second interpolar auxiliary magnets 57, 58, there is no risk of the first and second interpolar auxiliary magnets 57, 58 popping out of the first and second rotor cores 20, 30.

(17) According to the present embodiment, with a simple assembly of the retaining force formation member 60 onto a well-known rotor 4, the detent torque can be increased, and the retaining force of the brushless motor M in a stationary state can be increased.

In addition, in order to adjust a magnitude of the detent torque, sizes and the like of the first grooves 61, 63 and the second grooves 62, 64 formed on the first and second large diameter-side surfaces f3a, f3b simply need to be adjusted. That is, the detent torque can be set variously by changing a design of only the retaining force formation member 60.

In addition, the sixth embodiment may be modified as follows.

In the present embodiment, the first and second large diameter-side surfaces f3a, f3b are formed on the radially outer surface f3, and the first grooves 61, 63 and the second grooves 62, 64 are formed on the first and second large diameter-side surfaces f3a, f3b. As an alternative to the first grooves 61, 63 and the second grooves 62, 64, protrusions (projections) may be formed to extend in the axial direction on the first and second large diameter-side surfaces f3a, f3b at the positions where the first grooves 61, 63 and the second grooves 62, 64 are to be formed. Thus, advantages similar to the above embodiment can be achieved.

In the present embodiment, each of the first and second large diameter-side surfaces f3a, f3b may be modified by changing their shapes into the shapes shown in the first to fifth embodiments. Thus, advantages similar to the respective first to fifth embodiments can be achieved.

Figure 36:
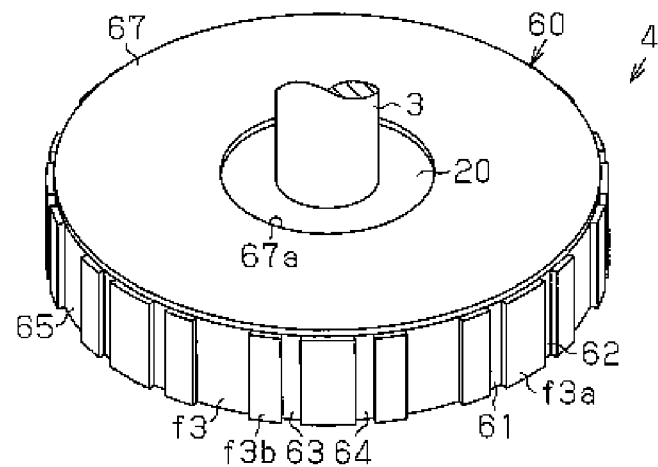
FIG. 36 is a perspective view of a rotor showing another example of the sixth embodiment as viewed in the axial direction.
Figure 37:
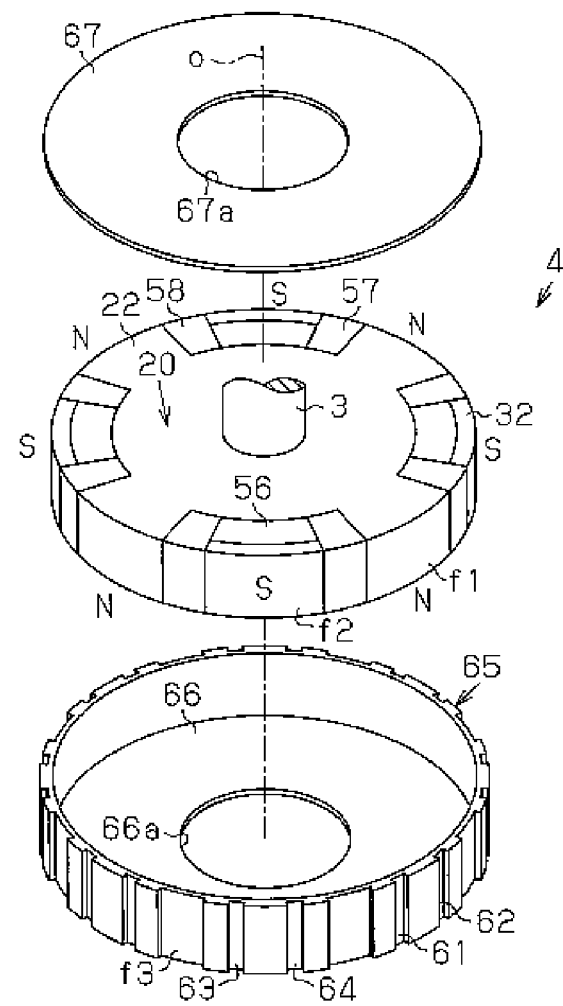
FIG. 37 is an exploded perspective view of the rotor illustrating a retaining force formation member of FIG. 36.

In the present embodiment, the retaining force formation member 60 has the cylindrical shape. As an alternative to this, as shown in FIG. 36 and FIG. 37, a bottomed cylinder 65 may be used which is obtained by closing one of openings of the retaining force formation member 60. That is, an insertion hole 66a, through which the rotation shaft 3 is inserted, is formed on a bottom wall 66 of the bottomed cylinder 65. Further, the rotor 4 is housed in an inner surface of the bottomed cylinder 65. Here, the radially inner surface of the rotor 4 is attached under pressure to a radially inner surface of the bottomed cylinder 65. As a result, the bottomed cylinder 65 is integrally fixed to the rotor 4.

Further, a radially outer surface f3 of the bottomed cylinder 65 includes first and second large diameter-side surfaces f3a, f3b positioned at respective regional surfaces that respectively oppose the radially outer surfaces f1, f2 of the first and second magnetic pole portions 24, 34, and the first grooves 61, 63 and the second grooves 62, 64 are formed respectively on the first and second large diameter-side surfaces f3a, f3b.

Thus, the detent torque can be increased, and the retaining force of the brushless motor M in a stationary state can be increased.

Further, the other of the openings of the bottomed cylinder 65 that houses the rotor 4 is closed by a cover plate 67 with an insertion hole 67a at its center. The cover plate 67 is adhered and fixed to the rotor 4 by an adhesive.

Thus, the radially outer surfaces of the first and second interpolar auxiliary magnets 57, 58 are pressed by the radially inner surface of the bottomed cylinder 65. Therefore, even when centrifugal force by the rotation is applied to the first and second interpolar auxiliary magnets 57, 58, there is no risk of the first and second interpolar auxiliary magnets 57, 58 popping out of the first and second rotor cores 20, 30.

Moreover, since both surfaces of the rotor 4 in the axial direction are covered by the cover plate 67 and the bottom wall 66 of the bottomed cylinder 65, the first and second interpolar auxiliary magnets 57, 58 as well as the first and second backside auxiliary magnets 55, 56 are not damaged and a broken piece therefrom does not pop out in the axial direction.

As for the portions where the first grooves 61, 63 and the second grooves 62, 64 are formed on the first and second large diameter-side surfaces f3a, f3b of the retaining force formation member 60 in the sixth embodiment, a material of those portions may be changed, Like the modification of the second embodiment.

Seventh Embodiment

Next, a seventh embodiment of the present invention will be described with reference to FIG. 38 to FIG. 40.

The present embodiment differs from the sixth embodiment in the portion corresponding to the retaining force formation member 60 and has characteristics in this portion.

Accordingly, in the present embodiment, a retaining force formation member 60 that has a different configuration will be described in detail and portions that are the same as the sixth embodiment will not be described in detail for the sake of convenience.

Figure 38:
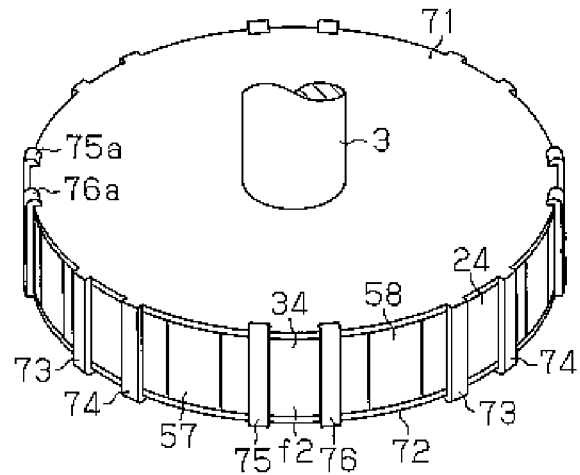
FIG. 38 is a perspective view of a rotor according to a seventh embodiment of the present invention as viewed in the axial direction.
Figure 39:
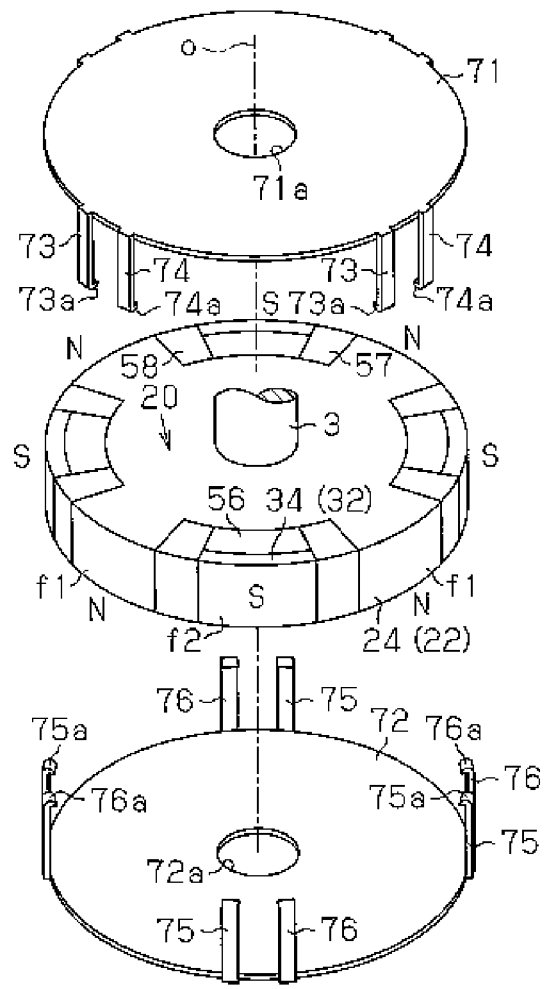
FIG. 39 is an exploded perspective view of the rotor illustrating a retaining force formation member of FIG. 38.

As shown in FIG. 38 and FIG. 39, a retaining force formation member 60 is attached to a rotor 4.

The retaining force formation member 60 includes a first plate 71 arranged on a first rotor core 20 and a second plate 72 arranged on a second rotor core 30. The first and second plates 71, 72 in the present embodiment are formed of an electromagnetic steel plate configured of a soft magnetic material. Further, the first and second plates 71, 72 may be formed by a composite magnetic material.

(First Plate 71)

The first plate 71 is formed in a disk plate shape, and has an insertion hole 71a at its central section, into which the rotation shaft 3 is inserted. An outer diameter of the first plate 71 is identical to outer diameters of radially outer surfaces f1, f2 of first and second magnetic pole portions 24, 34.

Further, a pair of first and second retaining force formation bars 73, 74 is provided along the radially outer surface f1 on an outer circumferential portion of the first plate 71 at positions corresponding to the radially outer surface f1 of each of the first magnetic pole portions 24. The first and second retaining force formation bars 73, 74 are respectively formed to extend toward the second plate 72 arranged on the second rotor core 30.

Press-fit hooks 73a, 74a are respectively provided at distal end portions of the first and second retaining force formation bars 73, 74. Further, as shown in FIG. 38, the first plate 71 is connected to the second plate 72 by press-fitting each of the press-fit hooks 73a, 74a for engagement with an outer circumferential portion of the second plate 72.

(Second Plate 72)

The second plate 72 is formed in a disk plate shape, and has an insertion hole 72a at its central section, into which the rotation shaft 3 is inserted. An outer diameter of the second plate 72 is identical to the outer diameters of the radially outer surfaces f1, f2 of the first and second magnetic pole portions 24, 34.

Further, a pair of first and second retaining force formation bars 75, 76 is provided along the radially outer surface f2 on an outer circumferential portion of the second plate 72 at positions corresponding to the radially outer surface f2 of each of the second magnetic pole portions 34. The first and second retaining force formation bars 75, 76 are respectively formed to extend toward the first plate 71 arranged on the first rotor core 20.

Press-fit hooks 75a, 76a are respectively provided at distal end portions of the first and second retaining force formation bars 75, 76. Further, as shown in FIG. 38, the second plate 72 is connected to the first plate 71 by press-fitting each of the press-fit hooks 75a, 76a for engagement with an outer circumferential portion of the first plate 71.

That is, the first plate 71 and the second plate 72 sandwich the rotor 4, and rotate integrally with the rotor 4.

Next, arranged positions of the first and second retaining force formation bars 73, 74 provided on the first plate 71 on the radially outer surfaces f1 of the first magnetic pole portions 24 will be described.

Figure 40:
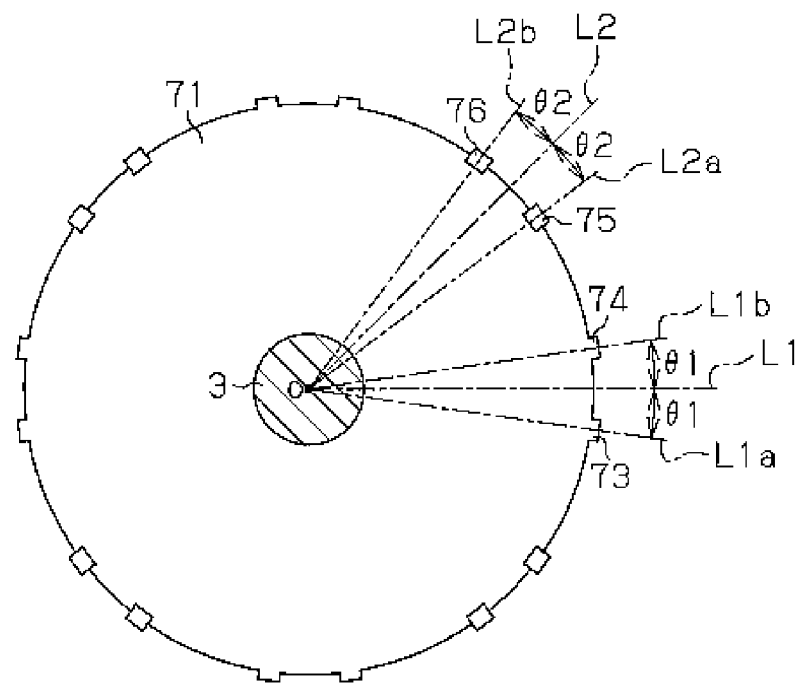
FIG. 40 is a front view of the rotor of FIG. 38 as viewed in the axial direction.

As shown in FIG. 40, in each of the radially outer surfaces f1, a straight line that passes through a middle position in the circumferential direction of a first claw magnetic pole portion 22 from an axis O of the rotation shaft 3 is referred to as a center line L1. With the center line L1 as a reference, straight lines that extend from a center axis to be apart in both a clockwise side and a counterclockwise side by an angle θ1 are respectively referred to as a first line L1a and a second line L1b.

Here, the angle θ1 is calculated based on a cycle of cogging torque (angle φ) by using the following calculation formula.

$$\theta1=(\tfrac{1}{2}+n)\cdot\phi$$

Here, n is an integer, and in the present embodiment, n=0.

Generally, the cycle φ of the cogging torque is a value obtained by dividing 360 degrees by the least common multiple of the number of magnetic poles of the rotor 4 and the number of slots of the stator 2.

In the present embodiment, since the number of magnetic poles of the rotor 4 is eight and the number of slots of the stator 2 is twelve, the least common multiple becomes twenty four. Further, the cycle φ of the cogging torque becomes 15 (=360/24) degrees.

Accordingly, the angle θ1 becomes 7.5 (=15/2) degrees.

Here, in each of the radially outer surfaces f1, the first line L1a and the second line L1b that are displaced with the center line L1 as the center in the clockwise direction and in the counterclockwise direction respectively by 7.5 degrees are specified. Further, the first and second retaining force formation bars 73, 74 provided on the first plate 71 are arranged on the radially outer surface f1 and in the axial direction that orthogonally intersect with the first line L1a and the second line L1b. Accordingly, an angle that the first retaining force formation bar 73 and the second retaining force formation bar 74 form with the axis O of the rotation shaft 3 as the center matches the cycle φ of the cogging torque (=15 degrees).

That is, an angle formed by the center line L1 and the first line L1a and an angle formed by the center line L1 and the second line L1b both become half cycle of the cycle φ of the cogging torque (=7.5 degrees), and therefore, the first retaining force formation bar 73 and the second retaining force formation bar 74 are formed at symmetric positions with the straight line in the axial direction that orthogonally intersects with the center line L1 as a symmetrical axis.

Next, arranged positions of the first and second retaining force formation bars 75, 76 provided on the second plate 72 on the radially outer surfaces f2 of the second magnetic pole portions 34 will be described.

As shown in FIG. 40, in each of the radially outer surfaces f2, a straight line that passes through a middle position in the circumferential direction of a second claw magnetic pole portion 32 from the axis O of the rotation shaft 3 is referred to as a center line L2. With the center line L2 as a reference, straight lines that extend from the center axis to be apart in the clockwise side and the counterclockwise side by an angle θ2 are respectively referred to as a first line L2a and a second line L2b.

Here, the angle θ2 is calculated based on a cycle of cogging torque (angle φ) by using the following calculation formula.

$$\theta2=(\tfrac{1}{2}+n)\cdot\phi$$

Here, n is an integer, and in the present embodiment, n=0.

Generally, the cycle φ of the cogging torque is a value obtained by dividing 360 degrees by the least common multiple of the number of magnetic poles of the rotor 4 and the number of slots of the stator 2.

In the present embodiment, since the number of magnetic poles of the rotor 4 is eight and the number of slots of the stator 2 is twelve, the least common multiple becomes twenty four. Further, the cycle φ of the cogging torque becomes 15 (=360/24) degrees.

Accordingly, the angle θ2 becomes 7.5 (=15/2) degrees.

Here, in each of the radially outer surfaces f2, the first line L2a and the second line L2b that are displaced with the center line L2 as the center in the clockwise direction and in the counterclockwise direction respectively by 7.5 degrees are specified. Further, the first and second retaining force formation bars 75, 76 provided on the second plate 72 are arranged on the radially outer surface f2 and in the axial direction that orthogonally intersect with the first line L2a and the second line L2b. Accordingly, an angle that the first retaining force formation bar 75 and the second retaining force formation bar 76 form with the axis O of the rotation shaft 3 as the center matches the cycle φ of the cogging torque (=15 degrees).

That is, an angle formed by the center line L2 and the first line L2a and an angle formed by the center line L2 and the second line L2b both become half cycle of the cycle φ of the cogging torque (=7.5 degrees), and therefore, the first retaining force formation bar 75 and the second retaining force formation bar 76 are formed at symmetric positions with the straight line in the axial direction that orthogonally intersects with the center line L2 as a symmetrical axis.

Next, the operation of the seventh embodiment will be described.

The first plate 71 and the second plate 72 are connected to one another via the first retaining force formation bars 73, 75 and the second retaining force formation bars 74, 76 with the rotor 4 sandwiched between. Further, the first and second retaining force formation bars 73, 74 of the first plate 71 are arranged on the radially outer surface f1 of each of the first magnetic pole portions 24, and the first and second retaining force formation bars 75, 76 of the second plate 72 are arranged on the radially outer surface f2 of each of the second magnetic pole portions 34.

Thus, each of the radially outer surfaces f1, f2 have cross-sectional shapes in a direction orthogonal to the axial direction that do not apparently become concentric circle shapes with the axis O of the rotation shaft 3 as centers due to the first retaining force formation bars 73, 75 and the second retaining force formation bars 74, 76.

Thus, a change in magnetic field as described above based on the first retaining force formation bars 73, 75 and the second retaining force formation bars 74, 76 arranged on each of the radially outer surfaces f1, f2 becomes very large, and retaining force (detent torque) becomes large.

Moreover, the first and second retaining force formation bars 73, 74 of the first plate 71 are formed at the axially symmetric positions with the center line L1 as the axis, and are formed such that the angle that the first retaining force formation bar 73 and the second retaining force formation bar 74 form matches the cycle φ of the cogging torque (=15 degrees).

In the same manner, the first and second retaining force formation bars 75, 76 of the second plate 72 are formed at the axially symmetric positions with the center line L2 as the axis, and are formed such that the angle that the first retaining force formation bar 75 and the second retaining force formation bar 76 form matches the cycle φ of the cogging torque (=15 degrees).

Accordingly, the total detent torque Tc can be derived at its maximum, like the second embodiment.

The seventh embodiment has the following advantages in addition to advantage (1) of the first embodiment.

(18) According to the present embodiment, the first and second retaining force formation bars 73, 74 of the first plate 71 are arranged on the radially outer surface f1 of each of the first magnetic pole portions 24, and the first and second retaining force formation bars 75, 76 of the second plate 72 are arranged on the radially outer surface f2 of each of the second magnetic pole portions 34. Thus, when the rotor 4 rotates, gaps between the radially outer surfaces f1, f2 and a stator 2 apparently fluctuate. Thus, the change in the magnetic field is generated significantly accompanying the fluctuation, and becomes a load upon the rotation. Thus, the detent torque is increased, and the retaining force can be increased.

Further, the first and second retaining force formation bars 73, 74 arranged on the radially outer surface f1 of each of the first magnetic pole portions 24 are made to be of an identical polarity as the first magnetic pole portions 24 (N poles), and the first and second retaining force formation bars 75, 76 arranged on the radially outer surface f2 of each of the second magnetic pole portions 34 are made to be of an identical polarity as the second magnetic pole portions 34 (S poles). Accordingly, since the first and second retaining force formation bars 73, 74 on the radially outer surfaces f1 and the first and second retaining force formation bars 75, 76 on the radially outer surfaces f2 are arranged apart, short circuiting magnetic flux can be reduced. According to this, the increase in the detent torque can be achieved, and output can also be maintained.

Moreover, the first and second retaining force formation bars 73, 74 of the first plate 71 are arranged at the symmetric positions on both sides in the circumferential direction with the center line L1 as the axis, and the first and second retaining force formation bars 75, 76 of the second plate 72 are arranged at the symmetric positions on both sides in the circumferential direction with the center line L2 as the axis.

As a result, the detent torque can be increased, and the retaining force of the brushless motor M in a stationary state can be increased.

(19) According to the present embodiment, since the first retaining force formation bars 73, 75 and the second retaining force formation bars 74, 76 are respectively formed at the positions where the angles θ1, θ2 defined by these bars and center lines L1, L2 become half cycle of the cycle of the cogging torque (angle φ) (=φ/2=7.5 degrees), the largest the total detent torque Tc can be generated.

Moreover, since the first retaining force formation bars 73, 75 and the second retaining force formation bars 74, 76 are formed at the axially symmetric positions, in the brushless motor M capable of forward and backward rotation, there is no cyclic fluctuation in the cogging toque generated in both the case of rotating forward and the case of rotating backward.

(20) According to the present embodiment, since both outer surfaces of the rotor 4 in the axial direction are covered by the first and second plates 71, 72, the first and second interpolar auxiliary magnets 57, 58, and the first and second backside auxiliary magnets 55, 56 are not damaged, and a broken piece therefrom does not pop out in the axial direction.

(21) According to the present embodiment, with a simple assembly of the first plate 71 and the second plate 72 onto a conventional rotor 4, the detent torque can be increased, and the retaining force of the brushless motor M in a stationary state can be increased.

Moreover, with respect to the conventional rotor 4, in order to adjust a magnitude of the detent torque, sizes, positions and the like of the first retaining force formation bars 73, 75 and the second retaining force formation bars 74, 76 formed on the first and second plates 71, 72 simply need to be adjusted. That is, the detent torque can be set variously by changing a design of only the first and second plates 71, 72.

(22) According to the present embodiment, since the first plate 71 and the second plate 72 are formed in the same shape and of the same material, the assembly of the first plate 71 and the second plate 72 becomes easy, and the number of components can be reduced.

The seventh embodiment may be modified as follows.

Figure 41:
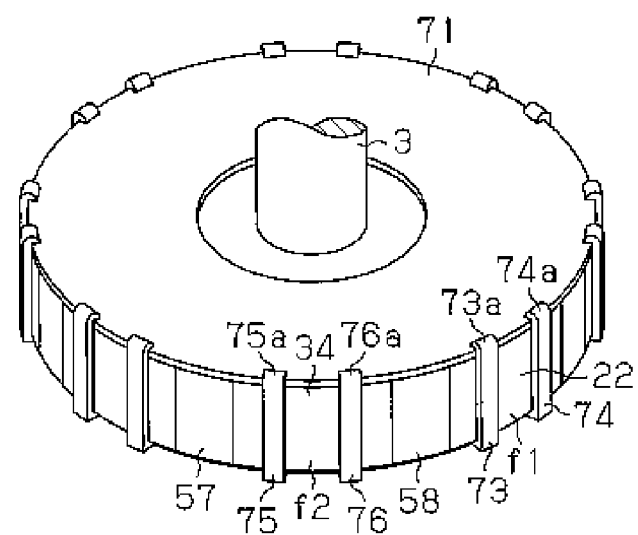
FIG. 41 is a perspective view of a rotor showing another example of the seventh embodiment as viewed in the axial direction.
Figure 42:
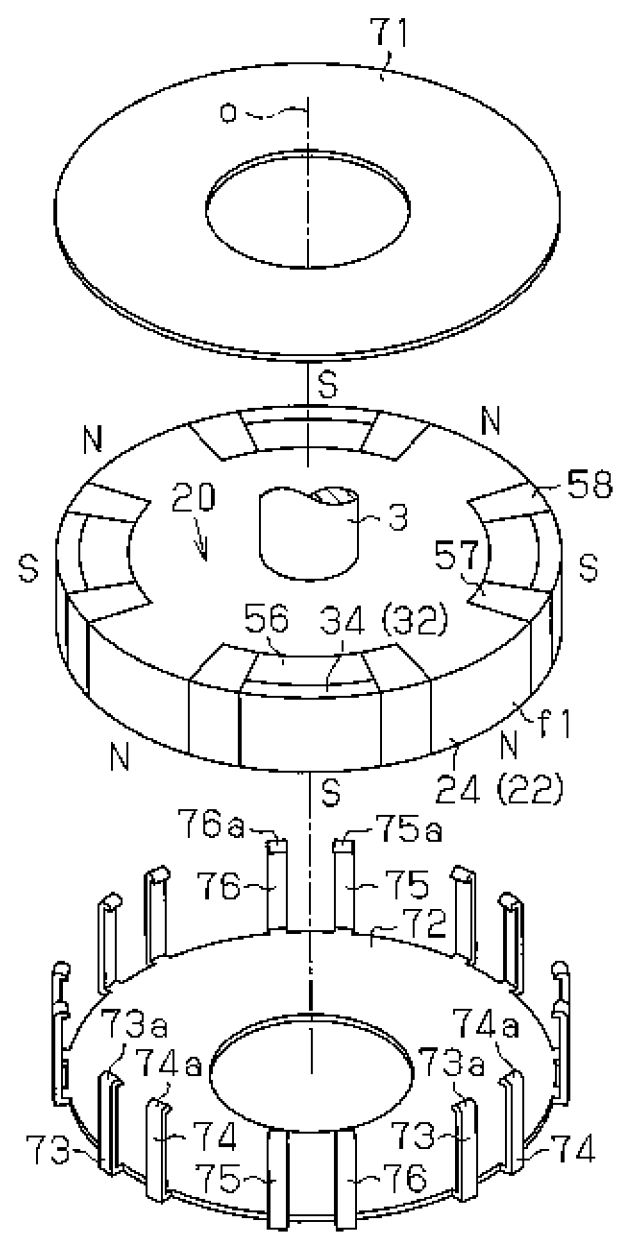
FIG. 42 is an exploded perspective view of the rotor illustrating a retaining force formation member of FIG. 41.

In the present embodiment, the first and second retaining force formation bars 73, 74 are provided on the first plate 71, and the first and second retaining force formation bars 75, 76 are provided on the second plate 72. As an alternative to this, as shown in FIG. 41 and FIG. 42, for example, the first and second retaining force formation bars 73, 74 may be omitted from the first plate 71. Then, the omitted first and second retaining force formation bars 73, 74 of the first plate 71 may be provided also in the second plate 72.

In the present embodiment, each of the radially outer surfaces f1, f2 are arranged with two retaining force formation bars, namely the first retaining force formation bars 73, 75 and the second retaining force formation bars 74, 76. However, the number is not limited to two, and one or three or more of the retaining force formation bars may be arranged.

Like the modifications of the second and fifth embodiments, a material of the first and second retaining force formation bars 73, 74 in the seventh embodiment may be changed.

In the first to seventh embodiments, the brushless motor M is of eight poles and twelve slots. This may be a brushless motor of two-pole and three-slot type, for example, a brushless motor of ten poles and fifteen slots.

Eighth Embodiment

An eighth embodiment of the present invention will now be described with reference to FIG. 43 to FIG. 49.

Figure 43:
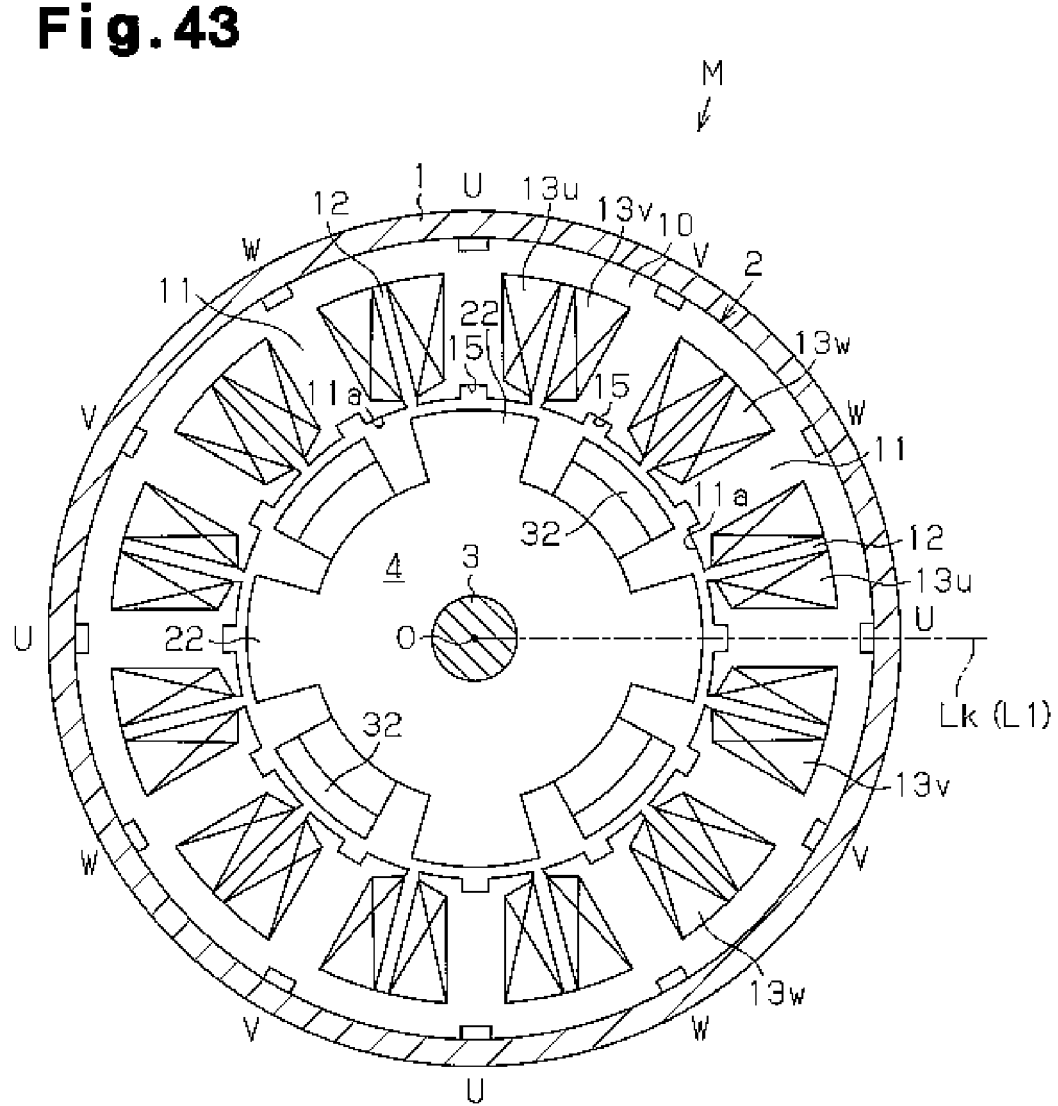
FIG. 43 is a cross-sectional view of a brushless motor according to an eighth embodiment of the present invention as viewed in the axial direction.
Figure 45A:
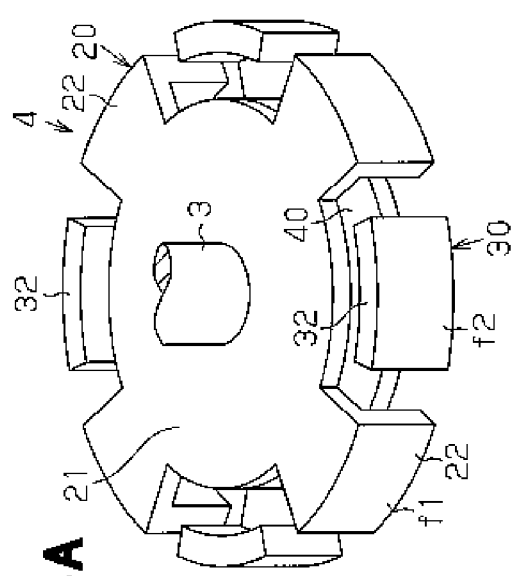
FIG. 45A is a perspective view of the rotor of FIG. 43 as viewed from a first rotor core side.
Figure 45B:
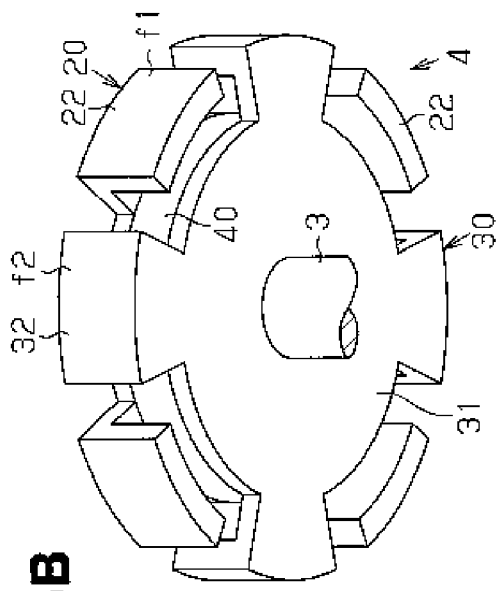
FIG. 45B is a perspective view of the rotor of FIG. 43 as viewed from a second rotor core side.

As shown in FIG. 43, a brushless motor M has a stator 2 fixed to an inner surface of a motor housing 1, and a so-called Lundell type rotor 4 that is fixed to a rotation shaft 3 and rotates integrally with the rotation shaft 3 is arranged inside the stator 2. The rotation shaft 3 is a magnetized stainless shaft, and is rotatably supported relative to the motor housing 1 by bearings provided in the motor housing 1 (not shown).

(Stator 2)

The stator 2 includes a cylindrical stator core 10, and an outer circumferential surface of the stator core 10 is fixed to an inner circumferential surface of the motor housing 1. A plurality of teeth 11 is arranged in a circumferential direction at equal intervals at an inner side of the stator core 10. The teeth 11 are extended toward a radially inner side and to extend in an axial direction. Each of the teeth 11 is T-shaped, and an inner circumferential surface 11a thereof in a radial direction is an arcuate surface that is obtained by extending an arc of a concentric circle with an axis O of the rotation shaft 3 as a center, in the axial direction.

A slot 12 is formed between adjacent ones of the teeth 11. In the present embodiment, the number of the teeth 11 is twelve, and the number of the slots 12 is twelve identical to the number of the teeth 11. Three-phase coils are wound on the twelve teeth 11 by concentrated winding, specifically, a U-phase coil 13u, a V-phase coil 13v, and a W-phase coil 13w are wound in this order on each of the teeth 11 in the circumferential direction.

Further, a rotating magnetic field is formed in the stator 2 by applying a three-phase power source voltage to the respective phase coils 13u, 13v, 13w thus wound, and thereby the rotor 4 arranged at the inner side of the stator 2 and fixed to the rotation shaft 3 is caused to rotate forward (clockwise direction in FIG. 43) and backward (counterclockwise direction in FIG. 43).

Figure 44:
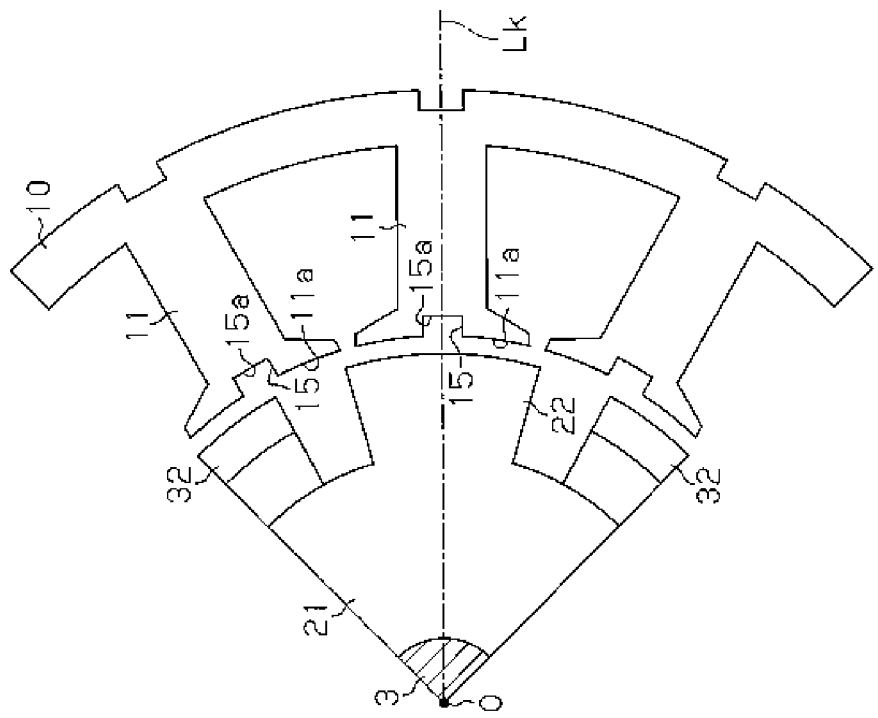
FIG. 44 is an enlarged front view of a main portion as viewed in the axial direction illustrating a teeth structure of a stator of FIG. 43.

As shown in FIG. 43, the inner circumferential surface 11a of each tooth 11 includes a teeth-side auxiliary groove 15. More specifically, as shown in FIG. 44, on the inner circumferential surface 11a of each of the teeth 11, a straight line that passes through a middle position in the circumferential direction of each of the teeth 11 from the axis O of the rotation shaft 3 is referred to as a center line Lk. With the center line Lk as a center, the teeth-side auxiliary groove 15 having a U-shaped cross-section is arranged in the axial direction. The teeth-side auxiliary groove 15 has its cross-sectional shape of a U-shape in a direction orthogonal to the axial direction. A bottom surface 15a of each teeth-side auxiliary groove 15 is a flat surface, and is formed at a right angle to side surfaces that extend in the radially inner side from both sides of the teeth-side auxiliary groove 15.

As a result, the inner circumferential surfaces 11a including the bottom surfaces 15a of the teeth-side auxiliary grooves 15 as a whole do not have a cross-sectional shape in a direction orthogonal to the axial direction that is concentric with a circle of which center is the axis O of the rotation shaft 3.

(Rotor 4)

As shown in FIG. 45A to FIG. 47, the Lundell type rotor 4 arranged at the inner side of the stator 2 is a rotor having the number of magnetic poles of eight, and includes first and second rotor cores 20, 30, and a field magnet 40.

(First Rotor Core 20)

Figure 48:
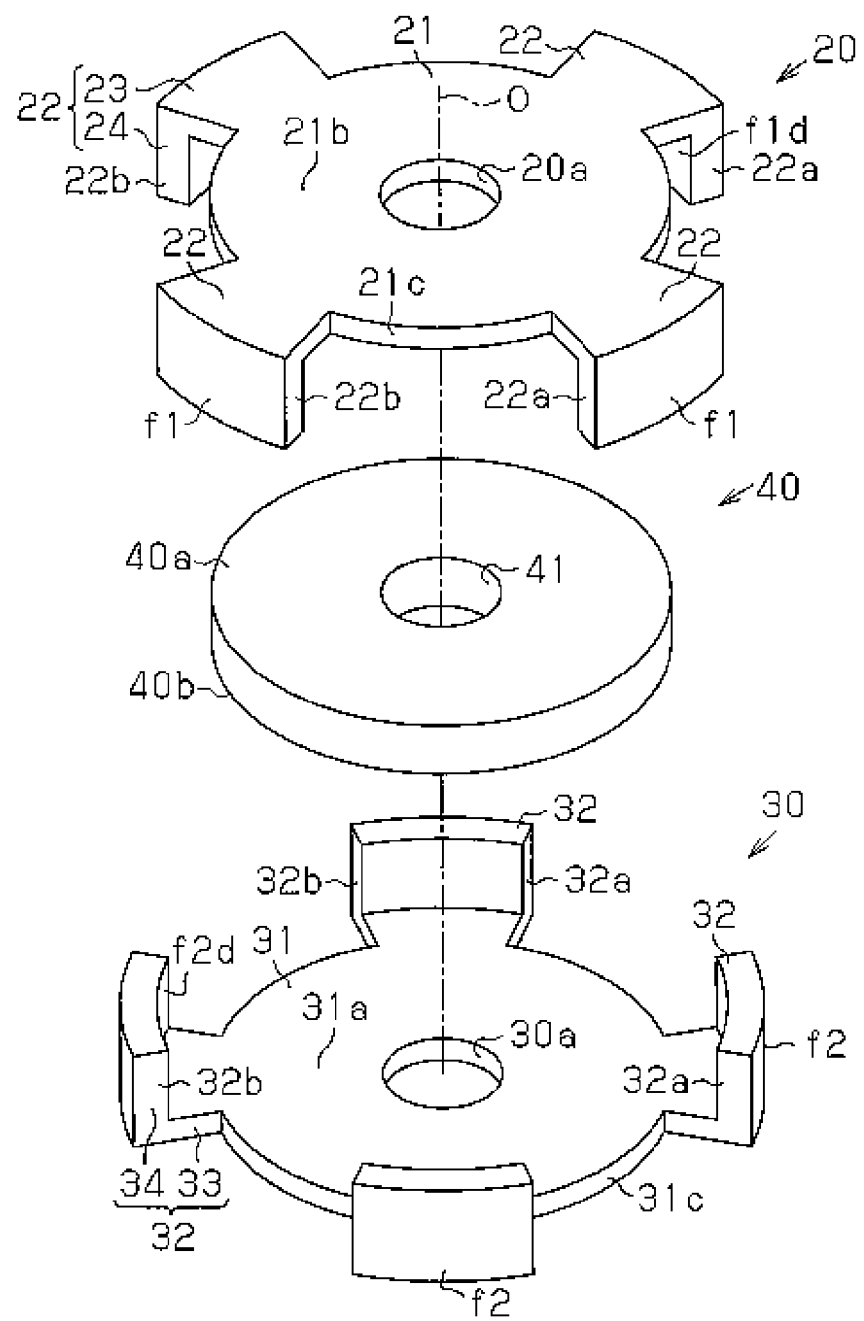
FIG. 48 is an exploded perspective view of the rotor of FIG. 45A.

As shown in FIG. 48, the first rotor core 20 is formed of an electromagnetic steel plate configured of a soft magnetic material, and includes a disk-shaped first core base 21 on which an insertion hole 20a for inserting and adhering the rotation shaft 3 is formed. A plurality (four in the present embodiment) of first claw magnetic poles 22 is formed at equal intervals on an outer circumferential surface 21c of the first core base 21. Each of the first claw magnetic poles 22 is formed to protrude to a radially outer side and extend in the axial direction. Here, in each first claw magnetic pole 22, a portion protruded to the radially outer side from the outer circumferential surface 21c of the first core base 21 is referred to as a first base portion 23, and a distal end portion bent in the axial direction is referred to as a first magnetic pole portion 24.

Both end surfaces 22a, 22b in the circumferential direction of each first claw magnetic pole 22 including the first base portion 23 and the first magnetic pole portion 24 are flat surfaces that extend in a radial direction. Further, an angle of each first claw magnetic pole 22 in the circumferential direction, that is, an angle between the two circumferential end surfaces 22a, 22b is set to be smaller than an angle of a gap between adjacent ones of the first claw magnetic poles 22 in the circumferential direction.

Figure 46:
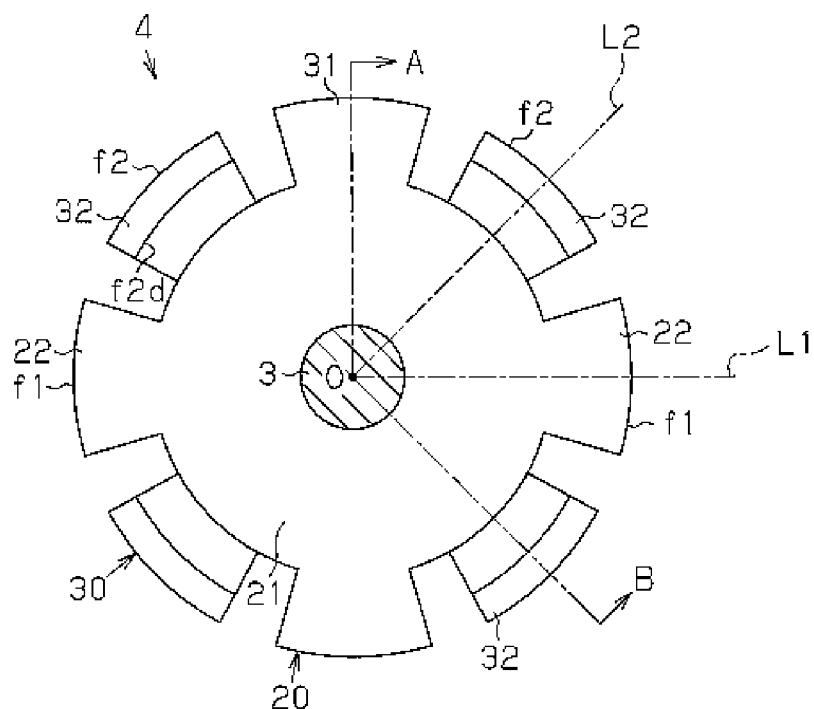
FIG. 46 is a front view of the rotor of FIG. 45A as viewed in the axial direction.

Further, as shown in FIG. 46, a radially outer surface f1 of each first magnetic pole portion 24 is an arcuate surface that is obtained by extending an arc of the concentric circle having the axis O of the rotation shaft 3 as the center in the axial direction. Further, a radially inner surface f1d of each first magnetic pole portion 24 is an arcuate surface that is obtained by extending an arc of the concentric circle having the axis O of the rotation shaft 3 as the center in the axial direction. Accordingly, a cross-sectional shape in a direction orthogonal to the axial direction of the first magnetic pole portion 24 becomes a sector shape.

(Second Rotor Core 30)

As shown in FIG. 48, the second rotor core 30 is of an identical material and has an identical shape as the first rotor core 20, and includes a disk-shaped second core base 31 on which an insertion hole 30a for inserting and adhering the rotation shaft 3 is formed. Four second claw magnetic poles 32 are arranged at equal intervals on an outer circumferential surface 31c of the second core base 31. Each of the second claw magnetic poles 32 is formed to protrude to the radially outer side and extend in the axial direction. Here, in each second claw magnetic pole 32, a portion protruded to the radially outer side from the outer circumferential surface 31c of the second core base 31 is referred to as a second base portion 33, and a distal end portion bent in the axial direction is referred to as a second magnetic pole portion 34.

Circumferential end surfaces 32a, 32b of each second claw magnetic pole 32 formed of the second base portion 33 and the second magnetic pole portion 34 are flat surfaces that extend in the radial direction. Further, an angle of each second claw magnetic pole 32 in the circumferential direction, that is, an angle between the two end surfaces 32a, 32b in the circumferential direction is set to be smaller than an angle of a gap between adjacent ones of the second claw magnetic poles 32 in the circumferential direction.

Further, as shown in FIG. 46, a radially outer surface f2 of each second magnetic pole portion 34 is an arcuate surface that is obtained by extending an arc of the concentric circle having the axis O of the rotation shaft 3 as the center in the axial direction. Further, a radially inner surface f2d of each second magnetic pole portion 34 is an arcuate surface that is obtained by extending an arc of the concentric circle having the axis O of the rotation shaft 3 as the center in the axial direction. Accordingly, a cross-sectional shape in a direction orthogonal to the axial direction of the second magnetic pole portion 34 becomes a sector shape.

Further, in the second rotor core 30, each of the second claw magnetic poles 32 is arranged between corresponding ones of the first claw magnetic poles 22. Here, the second rotor core 30 is assembled to the first rotor core 20 such that the field magnet 40 (refer to FIG. 47) is arranged (sandwiched) between the first core base 21 and the second core base 31 in the axial direction.

(Field Magnet 40)

Figure 47:
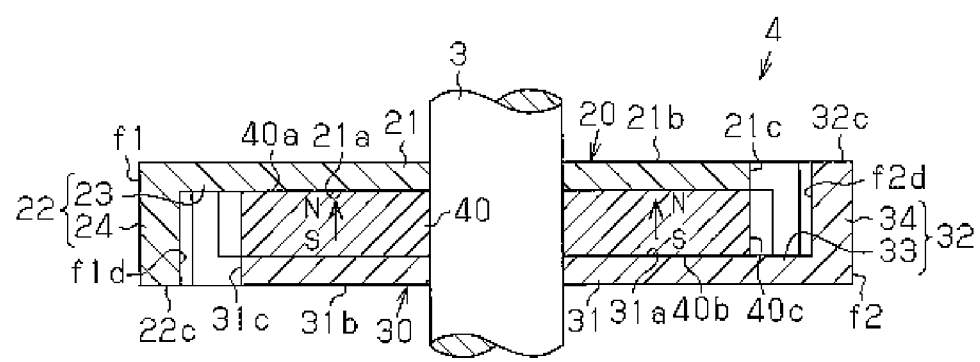
FIG. 47 is a combined cross-sectional view taken along line A-O-B in FIG. 46.

As shown in FIG. 47 and FIG. 48, the field magnet 40 sandwiched between the first rotor core 20 and the second rotor core 30 is a disk-shaped permanent magnet formed by a neodymium magnet.

As shown in FIG. 48, the field magnet 40 has an insertion hole 41 at its center position, into which the rotation shaft 3 is inserted. Further, a side surface 40*a* of the field magnet 40 on one side contacts the opposed surface 21*a* of the first core base 21, and a side surface 40*b* of the field magnet 40 on the other side contacts the opposed surface 31*a* of the second core base 31, and the field magnet 40 is sandwiched and fixed between the first rotor core 20 and the second rotor core 30.

An outer diameter of the field magnet 40 is set to conform to an outer diameter of the first and second core bases 21, 31, and a thickness thereof is set to a predetermined thickness.

That is, as shown in FIG. 47, when the field magnet 40 is arranged between the first rotor core 20 and the second rotor core 30, a distal end surface 22*c* of each first claw magnetic pole 22 (first magnetic pole portion 24) and a counter-opposed surface 31*b* of the second core base 31 are flush with each other. In the same manner, a distal end surface 32*c* of each second claw magnetic pole 32 (second magnetic pole portion 34) and a counter-opposed surface 21*b* of the first core base 21 are flush with each other. Further, an outer circumferential surface 40*c* of the field magnet 40 becomes flushed with the outer circumferential surfaces 21*c*, 31*c* of the first and second core bases 21, 31.

As shown in FIG. 47, the field magnet 40 is magnetized in the axial direction so that a portion on a first rotor core 20 side becomes an N pole (first magnetic pole), and a portion on a second rotor core 30 side becomes an S pole (second magnetic pole). Accordingly, the first claw magnetic poles 22 of the first rotor core 20 function as N poles (first magnetic poles), and the second claw magnetic poles 32 of the second rotor core 30 function as S poles (second magnetic poles) due to the field magnet 40.

Accordingly, the rotor 4 of the present embodiment is a so-called Lundell type rotor using the field magnet 40. Further, in the rotor 4, the first claw magnetic poles 22 as the N poles and the second claw magnetic poles 32 as the S poles are alternately arranged in the circumferential direction, and the number of magnetic poles becomes eight poles.

Further, since the number of the magnetic poles of the rotor 4 is eight, and the number of the teeth 11 (slots 12) of the stator 2 is twelve, the brushless motor M is a brushless motor having two N poles and three N slots (N being an integer) type.

Next, the operation of the eighth embodiment will be described.

Now, in the brushless motor M, when a three-phase power voltage is applied to respective phase coils 13*u*, 13*v*, 13*w* of the stator core 10 to form a rotating magnetic field in the stator 2, the rotor 4 fixed to the rotation shaft 3 and arranged at the inner side of the stator 2 rotates based on the rotating magnetic field.

Further, when the application of the three-phase power voltage to the respective phase coils 13*u*, 13*v*, 13*w* is stopped, the rotating magnetic field disappears and the rotor 4 stops its rotation. Here, the rotor 4 stops at a rotation position where magnetic flux flowing into the teeth 11 of the stator core 10 from the first magnetic pole portions 24 of the first rotor core 20 and magnetic flux flowing from the teeth 11 of the stator core 10 into the second magnetic pole portions 34 of the second rotor core 30 respectively come to be at most stabilized states.

This stopping position is where the radially outer surface f1 (radially outer surface f2) of one of the first and second magnetic pole portions 24, 34 faces the inner circumferential surface 11*a* of every two other ones of the teeth 11 positioned on the outer side. More specifically, the center line Lk intersecting the circumferential-direction middle position of the teeth-side auxiliary groove 15 of the every two other ones of the teeth 11 matches the center line L1 shown in FIG. 46, which passes the middle position in the circumferential direction of the first magnetic pole portion 24 from the axis O of the rotation shaft 3 (or, the center line L2 that passes through the middle position in the circumferential direction of the second magnetic pole portion 34 from the axis O of the rotation shaft 3 in the radially outer surface f2 of the second magnetic pole portion 34).

FIG. 43 shows a case in which the radially outer surface f1 of the first magnetic pole portion 24 faces the radially inner circumferential surface 11*a* of the corresponding opposing one of the teeth 11, and the center line L1 of the radially outer surface f1 of the first magnetic pole portion 24 matches the center line Lk of the radially inner circumferential surface 11*a* of the corresponding opposing one of the teeth 11.

Here, since the brushless motor M is a motor having eight poles in the rotor 4, and twelve slots in the stator 2, the center line L2 on the radially outer surface f2 of each second magnetic pole portion 34 is located at the middle position between adjacent ones of the teeth 11.

In this state, when the rotor 4 (rotation shaft 3) is rotated, the radially outer surface f1 of the first magnetic pole portion 24 moves in the circumferential direction relative to the radially inner circumferential surface 11*a* of the corresponding opposing one of the teeth 11.

Here, since the teeth-side auxiliary groove 15 is formed on the inner circumferential surface 11*a* of each of the teeth 11, as a whole, a cross-sectional shape in a direction orthogonal to the axial direction of the inner circumferential surfaces 11*a* of the teeth 11 does not become a concentric circle having the axis O of the rotation shaft 3 as a center. Thus, a change in the magnetic flux accompanying the movement becomes very large compared to inner circumferential surfaces of teeth that without the teeth-side auxiliary grooves 15 formed thereon, become a concentric circle having an axis of the rotation shaft 3 as a center.

Retaining force (detent torque) attempting to return to an original state of the magnetic flux being stabilized works to the contrary to the change in the magnetic field. As a result, in such a case, the retaining force (detent torque) becomes large since the change in the magnetic field is very large.

Figure 49:
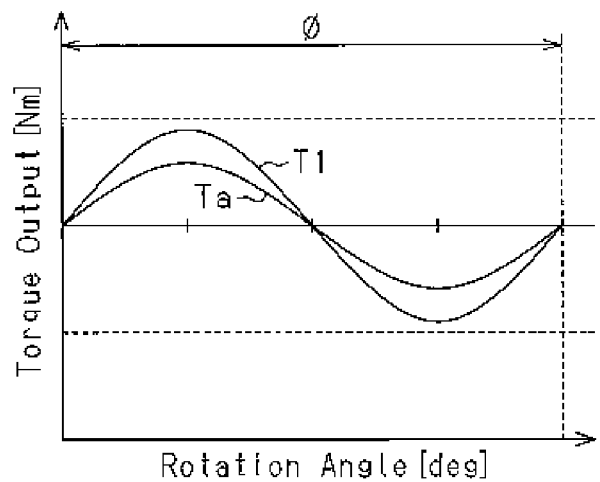
FIG. 49 is a diagram showing the relationship of detent torque.

FIG. 49 shows a comparison of detent torque Ta obtained by an experiment in the case without the teeth-side auxiliary grooves 15 on the inner circumferential surfaces 11*a* of the teeth 11 and detent torque T1 in the case with the teeth-side auxiliary grooves 15.

From FIG. 49, it can be understood that the detent torque T1 in the case with the teeth-side auxiliary grooves 15 becomes larger than the detent torque Ta in the case without the teeth-side auxiliary grooves 15.

Moreover, the teeth-side auxiliary grooves 15 are formed such that the center positions of the bottom surfaces 15*a* thereof are positioned on the center lines Lk. Accordingly, the rotor 4 has the same retaining force (detent torque) in both rotating direction of the rotor 4 (rotation shaft 3).

The eighth embodiment has the following advantages in addition to advantage (1) of the first embodiment.

(23) According to the present embodiment, since the teeth-side auxiliary groove 15 is formed on the inner circumferential surface 11a of each of the teeth 11, the cross-sectional shape in a direction orthogonal to the axial direction of the inner circumferential surfaces 11a of the teeth 11 does not become the concentric circle having the axis O of the rotation shaft 3 as the center. Thus, the detent torque can be increased, and the retaining force of the brushless motor M in a stationary state can be increased.

(24) According to the present embodiment, since the teeth-side auxiliary grooves 15 formed on the inner circumferential surfaces 11a of the teeth 11 have the shape with the center lines Lk of the inner circumferential surfaces 11a as the center, the same retaining force (detent torque) can be generated in both rotating direction of the rotor 4 (rotation shaft 3).

Ninth Embodiment

Next, a ninth embodiment of the present invention will be described with reference to FIG. 50 to FIG. 52.

Figure 50:
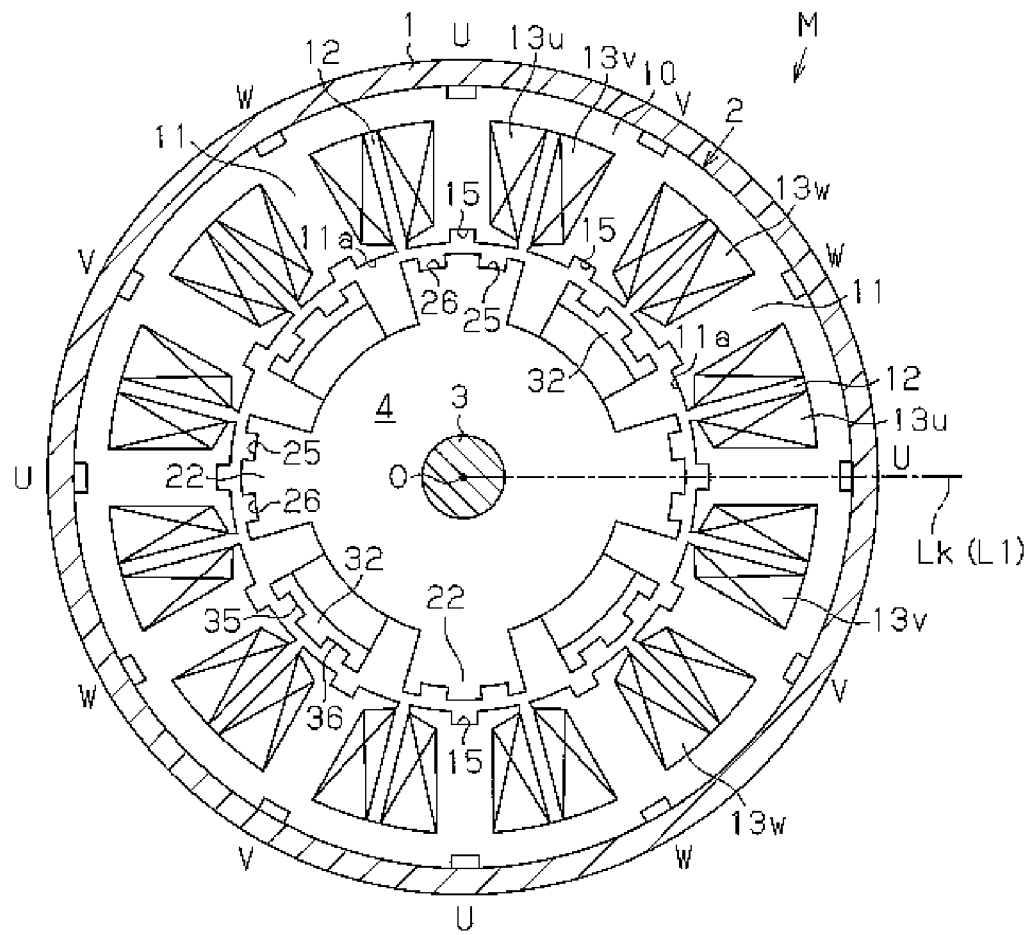
FIG. 50 is a cross-sectional view of a brushless motor according to a ninth embodiment of the present invention as viewed in an axial direction.

As shown in FIG. 50, a brushless motor M of the ninth embodiment is characteristic in forming auxiliary grooves on first and second claw magnetic poles 22, 32 of a rotor 4. Specifically, first and second auxiliary grooves 25, 26 as rotor-side auxiliary grooves are formed on an outer surface f1 of each first magnetic pole portion 24, and first and second auxiliary grooves 35, 36 as rotor-side auxiliary grooves are formed on an outer surface f2 of each second magnetic pole portion 34. Accordingly, this characteristic portion will be described in detail, and description of other configurations will be omitted for the sake of convenience.

(First Rotor Core 20)

Figure 51:
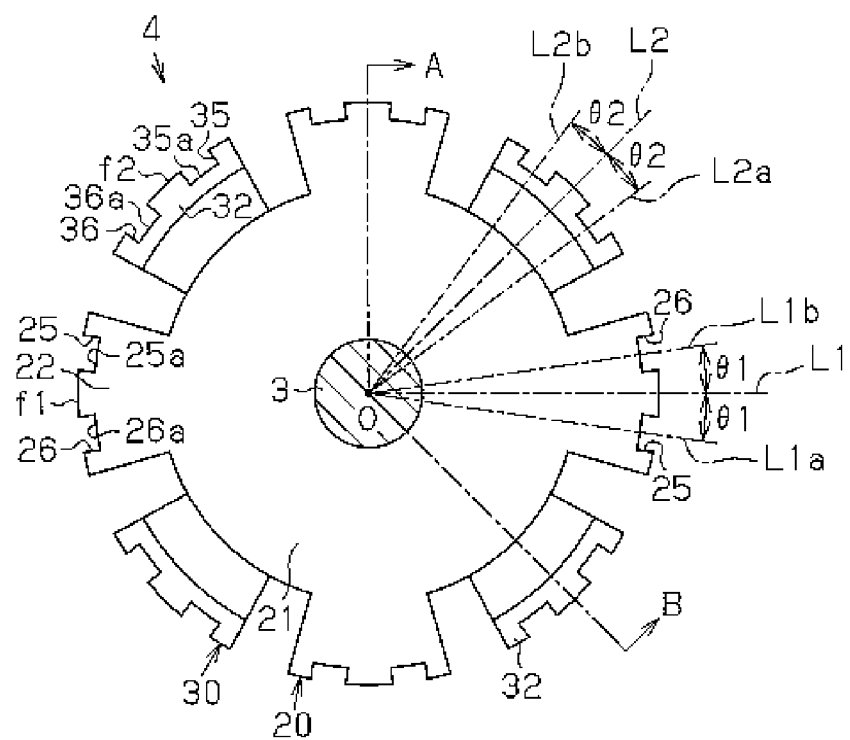
FIG. 51 is a front view of the rotor of FIG. 50 as viewed in the axial direction.

As shown in FIG. 51, the radially outer surfaces f1 of the first magnetic pole portions 24 of the first claw magnetic poles 22 have a cross-sectional shape in a direction orthogonal to the axial direction that includes an arcuate surface of a concentric circle having an axis O of a rotation shaft 3 as a center, and two grooves, namely, a first auxiliary groove 25 and a second auxiliary groove 26, are formed on each radially outer surface f1.

More specifically, as shown in FIG. 51, in the radially outer surface f1 of each first magnetic pole portion 24, a straight line that passes through a middle position in a circumferential direction of the first magnetic pole portion 24 from the axis O of the rotation shaft 3 is referred to as a center line L1. With the center line L1 as a reference, straight lines that extend from the axis O to be apart in a clockwise side and a counter-clockwise side by an angle θ1 are respectively referred to as a first line L1a and a second line L1b.

Here, the angle θ1 is calculated based on a cycle φ (angle φ) of cogging torque (detent torque) by using the following calculation formula.

$$\theta 1 = (\tfrac{1}{2} + n)\cdot \phi$$

Here, n is an integer, and in the present embodiment, n=0.

Generally, the cycle φ of the cogging torque is a value obtained by dividing 360 degrees by the least common multiple of the number of magnetic poles of the rotor 4 and the number of slots of the stator 2.

In this case, since the number of magnetic poles of the rotor 4 is eight and the number of slots of the stator 2 is twelve, the least common multiple becomes twenty four. Further, the cycle φ of the cogging torque becomes 15 (=360/24) degrees.

Accordingly, the angle θ1 becomes 7.5 (=15/2) degrees.

Further, in each of the radially outer surfaces f1, the first line L1a and the second line L1b respectively displaced with the center line L1 at the center in the clockwise direction and in the counterclockwise direction by 7.5 degrees are specified. Further, grooves having a constant width are arranged in the axial direction respectively with the first line L1a and the second line L1b as middle positions in the circumferential direction.

Further, the groove that has the first line L1a as the circumferential middle position is referred to as a first auxiliary groove 25, and the groove that has the second line L1b as the circumferential middle position is referred to as a second auxiliary groove 26. Accordingly, an angle that the first auxiliary groove 25 and the second auxiliary groove 26 form with the axis O of the rotation shaft 3 as the center matches the cycle φ of the cogging torque (=15 degrees).

That is, an angle formed by the center line L1 and the first line L1a and an angle formed by the center line L1 and the second line L1b both become half cycle of the cycle φ of the cogging torque (=7.5 degrees), and the first auxiliary groove 25 and the second auxiliary groove 26 are formed at symmetric positions with the center line L1 as a symmetrical axis.

The first and second auxiliary grooves 25, 26 have cross-sectional shapes of a U-shape in a direction orthogonal to the axial direction. Bottom surfaces 25a, 26a of the first and second auxiliary grooves 25, 26 are flat surfaces, and are formed at a right angle to side surfaces extending to a radially outer side from both sides of the first and second auxiliary grooves 25, 26.

Accordingly, since bottom surfaces 25a, 26a of the first and second auxiliary grooves 25, 26 have a planar shape, a cross-sectional shape in a direction orthogonal to the axial direction does not become a concentric arc having the axis O of the rotation shaft 3 as a center. As a result, the radially outer surfaces f1 including the bottom surfaces 25a, 26a of the first and second auxiliary grooves 25, 26 of the first magnetic pole portions 24 as a whole do not have a cross-sectional shape in a direction orthogonal to the axial direction that is concentric with a circle of which center is the axis O of the rotation shaft 3.

(Second Rotor Core 30)

As shown in FIG. 51, radially outer surfaces f2 of the second magnetic pole portions 34 of the second claw magnetic poles 32 have a cross-sectional shape in a direction orthogonal to the axial direction that includes an arcuate surface concentric to a circle of which center is the axis O of the rotation shaft 3, and two grooves, namely, a first auxiliary groove 35 and a second auxiliary groove 36, are formed on each radially outer surface f2.

More specifically, as shown in FIG. 51, in the radially outer surface f2 of the second magnetic pole portion 34, a straight line that passes through a middle position in the circumferential direction of the second magnetic pole portion 34 from the axis O of the rotation shaft 3 is referred to as a center line L2. With the center line L2 as a reference, straight lines that extend from the axis O to be apart in the clockwise side and the counterclockwise side by an angle θ2 are respectively referred to as a first line L2a and a second line L2b. Here, the angle θ2 is calculated based on the cycle φ of the cogging torque (detent torque) by using the following calculation formula, similar to the above.

$$\theta 2 = (\tfrac{1}{2} + n)\cdot \phi$$

Here, n is an integer, and in the present embodiment, n=0. In addition, the cycle φ of the cogging torque is 15 (=360/24) degrees, similar to the above.

Accordingly, the angle θ2 becomes 7.5 (=15/2) degrees, similar to the above θ1.

Further, in each of the radially outer surfaces f2, the first line L2a and the second line L2b displaced with the center line L2 as the center in the clockwise direction and in the counterclockwise direction respectively by 7.5 degrees are specified. Further, grooves having a constant width are arranged in the axial direction respectively with the first line L2a and the second line L2b as middle positions in the circumferential direction.

Further, the groove that has the first line L2a as the circumferential middle position is referred to as a first auxiliary groove 35, and on the contrary, the groove that has the second line L2b as the circumferential middle position is referred to as a second auxiliary groove 36. Accordingly, an angle that the first auxiliary groove 35 and the second auxiliary groove 36 form with the axis O of the rotation shaft 3 as the center matches the cycle φ of the cogging torque (=15 degrees).

That is, an angle formed by the center line L2 and the first line L2a and an angle formed by the center line L2 and the second line L2b both become half cycle of the cycle φ of the cogging torque (=7.5 degrees), and the first auxiliary groove 35 and the second auxiliary groove 36 are formed at symmetric positions with the center line L2 as a symmetrical axis.

The first and second auxiliary grooves 35, 36 have cross-sectional shapes of a U-shape in a direction orthogonal to the axial direction. Bottom surfaces 35a, 36a of the first and second auxiliary grooves 35, 36 are flat surfaces, and are formed at a right angle to side surfaces extending to the radially outer side from both sides of the first and second auxiliary grooves 35, 36.

Accordingly, since bottom surfaces 35a, 36a of the first and second auxiliary grooves 35, 36 have a planar shape, a cross-sectional shape in a direction orthogonal to the axial direction does not become a concentric arc having the axis O of the rotation shaft 3 as a center. As a result, the radially outer surfaces f2 including the bottom surfaces 35a, 36a of the first and second auxiliary grooves 35, 36 of the second magnetic pole portions 34 as a whole do not have a cross-sectional shape in a direction orthogonal to the axial direction that is concentric with a circle of which center is the axis O of the rotation shaft 3.

Further, in the second rotor core 30 has each of the second claw magnetic poles 32 arranged between respectively corresponding first claw magnetic poles 22. At this point, like the second embodiment, the second rotor core 30 is assembled to the first rotor core 20 such that the field magnet 40 is arranged (sandwiched) between the first core base 21 and the second core base 31 in the axial direction.

Next, the operation of the ninth embodiment will be described.

Now, in the brushless motor M, when a three-phase power voltage is applied to respective phase coils 13u, 13v, 13w of the stator core 10 to form a rotating magnetic field in the stator 2, the rotor 4 fixed to the rotation shaft 3 and arranged at the inner side of the stator 2 rotates based on the rotating magnetic field.

Further, when the application of the three-phase power voltage to the respective phase coils 13u, 13v, 13w is stopped, the rotating magnetic field disappears and the rotor 4 stops its rotation. Here, the rotor 4 stops at a rotation position where magnetic flux flowing into the teeth 11 of the stator core 10 from the first magnetic pole portions 24 of the first rotor core 20 and magnetic flux flowing from the teeth 11 of the stator core 10 into the second magnetic pole portions 34 of the second rotor core 30 respectively come to be at most stabilized states.

In the same manner as the eighth embodiment, at this stopping position, the radially outer surface f1 (radially outer surface f2) of one of the first and second magnetic pole portions 24, 34 faces the inner circumferential surface 11a of every two other ones of the teeth 11 positioned on the outer side.

In this state, when the rotor 4 (rotation shaft 3) is rotated, the radially outer surface f1 of the first magnetic pole portion 24 moves in the circumferential direction relative to the radially inner circumferential surface 11a of the corresponding opposing one of the teeth 11.

Here, since the teeth-side auxiliary grooves 15 are formed on the inner circumferential surfaces 11a of the teeth 11, retaining force (detent torque T1) is exerted in the same manner as the eighth embodiment.

In addition, since the first and second auxiliary grooves 25, 26 are formed on the radially outer surfaces f1 of the first magnetic pole portions 24, as a whole, the cross-sectional shape of the radially outer surfaces f1 of the first magnetic pole portions 24 in a direction orthogonal to the axial direction do not become the concentric circle with the axis O of the rotation shaft 3 as the center. In the same manner, since the first and second auxiliary grooves 35, 36 are formed on the radially outer surfaces f2 of the second magnetic pole portion 34, as a whole, the cross-sectional shape of the radially outer surfaces f2 of the second magnetic pole portion 34 in a direction orthogonal to the axial direction do not become the concentric circle with the axis O of the rotation shaft 3 as the center.

Thus, the change in the magnetic flux accompanying the movement becomes significantly large compared to the radially outer surfaces f1, f2 of the first and second magnetic pole portions 24, 34 of the eighth embodiment that become the concentric circles having the axis of the rotation shaft 3 as the centers. As a result, the change in the magnetic field becomes very large, and the retaining force (detent torque) becomes large.

Moreover, the first auxiliary grooves 25, 35 and the second auxiliary grooves 26, 36 are respectively formed at the symmetric positions with the center lines L1, L2 as symmetric axes. Accordingly, the rotor 4 has the same retaining force (detent torque) in both rotating directions of the rotor 4 (rotation shaft 3).

That is, the angle formed by the first auxiliary groove 25 (first line L1a) and the second auxiliary groove 26 (second line L1b) matches the cycle φ of the cogging torque (=15 degrees). In the same manner, the angle formed by the first auxiliary groove 35 (first line L2a) and the second auxiliary groove 36 (second line L2b) matches the cycle φ of the cogging torque (=15 degrees).

Accordingly, the retaining force (detent torque) in the case with the first auxiliary grooves 25, 35 and the second auxiliary grooves 26, 36 comes to be of the same phase as the retaining force (detent torque) in the case without the first auxiliary grooves 25, 35 and the second auxiliary grooves 26, 36.

As a result, the retaining force (detent torque T1) based on the teeth-side auxiliary grooves 15 formed on the inner circumferential surfaces 11a of the teeth 11 and the retaining force (detent torque Tb (refer to FIG. 52)) based on the first auxiliary grooves 25, 35 and the second auxiliary grooves 26, 36 formed on the radially outer surfaces f1, f2 are superposed. Thus, the retaining force (detent torque T2 (refer to FIG. 52)) becomes larger than the retaining force (detent torque T1) of the eighth embodiment.

Figure 52:
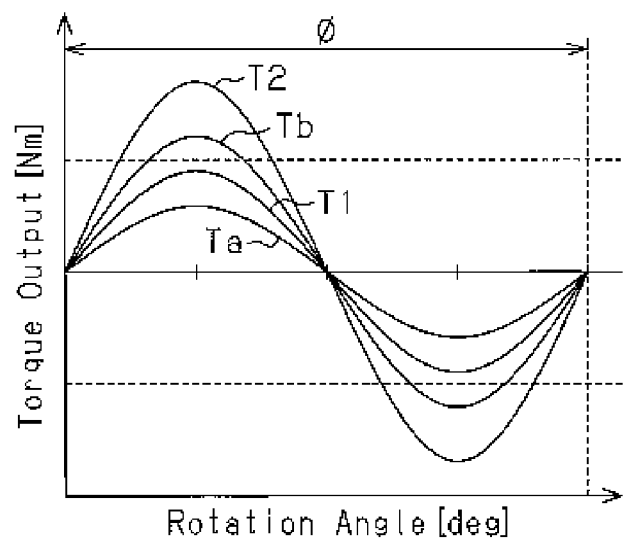
FIG. 52 is a diagram showing the relationship of detent torque.

FIG. 52 shows the detent torque T2 obtained by an experiment in the case where the brushless motor M includes the teeth-side auxiliary grooves 15, the first auxiliary grooves 25, 35, and the second auxiliary grooves 26, 36. Here, the detent torque Tb shown in FIG. 52 indicates detent torque that is generated when the teeth-side auxiliary grooves 15 to be formed on the inner circumferential surfaces 11*a* of the teeth 11 are not formed, and the first auxiliary grooves 25, 35 and the second auxiliary grooves 26, 36 are formed on the radially outer surfaces f1, f2.

Accordingly, as is apparent from FIG. 52, it can be understood that the detent torque T2 in the case of the auxiliary grooves being respectively formed on the inner circumferential surfaces 11*a* of the teeth 11 and the radially outer surfaces f1, f2 of the first and second magnetic pole portions 24, 34 is much larger compared to the detent torque Ta in the case without the auxiliary grooves on the inner circumferential surfaces 11*a* of the teeth 11 and the radially outer surfaces f1, f2 of the first and second magnetic pole portions 24, 34. Moreover, it can be understood that the detent torque T2 is larger than the detent torque T1 of the eighth embodiment.

The ninth embodiment has the following advantages in addition to the advantages of the eighth embodiment.

(25) According to the present embodiment, since the radially outer surfaces f1, f2 of the first and second claw magnetic pole portions 22, 32 have the first auxiliary grooves 25, 35 and the second auxiliary grooves 26, 36 at the symmetric positions on both sides in the circumferential direction with the center lines L1, L2 as the centers, the detent torque can be increased, and the retaining force of the brushless motor M in a stationary state can be increased.

(26) According to the ninth embodiment, since the first auxiliary grooves 25, 35 and the second auxiliary grooves 26, 36 are formed at the positions where the angles θ1, θ2 respectively formed between with the center lines L1, L2 become half the cycle (angle ϕf) of the cogging torque (=ϕ/2=7.5 degrees), the largest the total detent torque Tc can be generated.

Moreover, since the first auxiliary grooves 25, 35 and the second auxiliary grooves 26, 36 are formed at the axially symmetric positions, in the brushless motor M capable of rotating forward and backward, same retaining force (detent torque) can be generated in both rotating directions of the rotor 4 (rotation shaft 3).

The eighth and ninth embodiments may be modified as follows.

In the eighth and ninth embodiments, in the one teeth-side auxiliary groove 15 formed respectively on the inner circumferential surface 11*a* of each of the teeth 11, the center position in the circumferential direction of the bottom surface 15*a* thereof matches the center line Lk. As an alternative to this, the teeth-side auxiliary groove 15 may be formed where the center position in the circumferential direction of the bottom surface 15*a* is deviated in the clockwise direction or in the counterclockwise direction along the circumferential direction with the center line Lk as a center.

In this case, assuming an angle formed by the center line Lk from the axis O of the rotation shaft intersecting a central position in the circumferential direction of a radially inner circumferential surface of each of the teeth 11 and the straight line from the axis O of the rotation shaft intersecting the central position in the circumferential direction of the bottom surface 15*a* of the teeth-side auxiliary groove 15 as θs, the teeth-side auxiliary groove 15 is formed at a position deviated in the circumferential direction within a range of:

$$-(360/\phi)/(Nr/2) \leq \theta s \leq (360/\phi)/(Nr/2).$$

Thus, the detent torque becomes larger than the case without the teeth-side auxiliary groove 15 on the inner circumferential surface 11*a*.

Here, ϕ is the cycle ϕ of the cogging torque, and in the present embodiment, is a value obtained by dividing 360 degrees by the least common multiple of the number of magnetic poles of the rotor 4 and the number of slots of the stator 2, thus becomes ϕ=15 (=360/24) degrees.

As a result, if the teeth-side auxiliary groove 15 is formed at the position within the range of −24/(Nr/2)≤θs≤24/(Nr/2), the detent torque becomes larger than the case without the teeth-side auxiliary groove 15 on the inner circumferential surface 11*a*.

Here, Nr is the number of magnetic poles of the rotor 4. Accordingly, Nr/2=8/2=4 is obtained. Thus, if θs is set in a range of −6 degrees≤θs≤6 degrees, the detent torque becomes larger than the case without the teeth-side auxiliary groove 15 on the inner circumferential surface 11*a*.

Further, since the teeth-side auxiliary groove 15 is formed at the position where the center position in the circumferential direction of the bottom surface 15*a* is deviated in the clockwise direction or in the counterclockwise direction along the circumferential direction with the center line Lk as the center, size of the detent torque can be adjusted.

In the eighth and ninth embodiments, the teeth-side auxiliary groove 15 is formed on the inner circumferential surface 11*a* of each of the teeth 11, and thereby the inner circumferential surfaces 11*a* as a whole not to have the cross-sectional shape in a direction orthogonal to the axial direction that becomes the concentric circle having the axis O of the rotation shaft 3 as the center. As an alternative to this, for example, the cross-sectional shape in a direction orthogonal to the axial direction of the inner circumferential surfaces 11*a* of the teeth 11 may be formed into an elliptical shape or in a V-groove shape, so that the cross-sectional shape in a direction orthogonal to the axial direction as a whole does not become the concentric circle having the axis O of the rotation shaft 3 as the center.

In the eighth and ninth embodiments, one teeth-side auxiliary groove 15 is formed on the inner circumferential surface 11*a* of each of the teeth 11. As an alternative to this, a plurality of teeth-side auxiliary grooves 15 may be formed on each inner circumferential surface 11*a*. In this case, if they are provided at axially symmetric positions on both sides in the circumferential direction with the center line Lk as a symmetric axis, the same retaining force (detent torque) can be generated in both rotating directions of the rotor 4. In this configuration, it should be appreciated that the teeth-side auxiliary groove 15 positioned on the center line Lk may be formed on the inner circumferential surface 11*a*.

In the ninth embodiment, the first auxiliary grooves 25, and the second auxiliary grooves 26, 36 are respectively formed on the radially outer surfaces f1, f2 of the first and second claw magnetic pole portions 22, 32. The first auxiliary grooves 25, 35 and the second auxiliary grooves 26, 36 are positioned at the axially symmetric positions on both sides in the circumferential direction with the center lines L1, L2 as the centers. That is, as shown in FIG. 51, in the first claw magnetic pole portions 22, the first and second auxiliary grooves 25, 26 are formed at the positions respectively intersecting the first and second lines L1*a*, L1*b*. Further, in the second claw magnetic pole portions 32, the first and second auxiliary grooves 35, 36 are formed at the positions respectively intersecting the first and second lines L2*a*, L2*b*.

A pair of auxiliary grooves may be formed on both sides in the circumferential direction with the first and second lines L1*a*, L1*b* in the first claw magnetic poles 22 and the first and second lines L2*a*, L2*b* in the second claw magnetic poles 32 as a reference.

More specifically, in regards to each first line L1*a* in the first claw magnetic poles 22, one pair of auxiliary grooves is formed at the positions that become axially symmetric in the clockwise direction and in the counterclockwise direction along the circumferential direction with the first line L1a as the center. Further, in regards to each second line L1b in the first claw magnetic poles 22, one pair of auxiliary grooves is formed at the positions that become axially symmetric in the clockwise direction and in the counterclockwise direction along the circumferential direction with the second line L1b as the center.

In the same manner, in regards to each first line L2a in the second claw magnetic poles 32, one pair of auxiliary grooves is formed at the positions that become axially symmetric in the clockwise direction and in the counterclockwise direction along the circumferential direction with the first line L2a as the center. Further, in regards to each second line L2b in the second claw magnetic poles 32, one pair of auxiliary grooves is formed at the positions that become axially symmetric in the clockwise direction and in the counterclockwise direction along the circumferential direction with the second line L2b as the center.

Here, angles θr formed by a straight line extending from the center axis O and intersecting the center position of each pair of auxiliary grooves in the circumferential direction and the corresponding lines L1a, L1b, L2a, L2b are identical. Further, the angle θr is set such that the following relational equation is satisfied.

$$(1/4+n) \cdot \phi < \theta r < (3/4+n) \cdot \phi$$

Here, n is an integer, and n=0.
Accordingly, $(1/4) \cdot \phi < \theta r < (3/4) \cdot \phi$
is satisfied. Further, φ is the cycle (angle) of the cogging torque, and φ=15 degrees.

As a result, 3.75 degrees<θr<11.25 degrees
is satisfied. Further, the pairs of auxiliary grooves that are axially symmetric with the respectively corresponding lines L1a, L1b, L2a, L2b as the centers are formed in this range.

Accordingly, in this case, four auxiliary grooves are formed on each of the first and second claw magnetic poles 22, 32. Further, the radially outer surfaces f1, f2 of the first and second claw magnetic pole portions 22, 32 do not become a concentric circle having the axis O as a center, so the detent torque can be increased.

Further, for each first claw magnetic pole 22, one pair of auxiliary grooves is formed at the axially symmetric positions with the first and second lines L1a, L1b as the centers, and for each second claw magnetic pole 32, each one pair of auxiliary grooves is formed at the axially symmetric positions with the first and second lines L2a, L2b as the centers. Further, since the cycle of the detent torque caused by the four auxiliary grooves formed on each of the radially outer surfaces f1, f2 of the first and second claw magnetic pole portions 22, 32 matches the cogging torque, large detent torque can be drawn.

Figure 53:
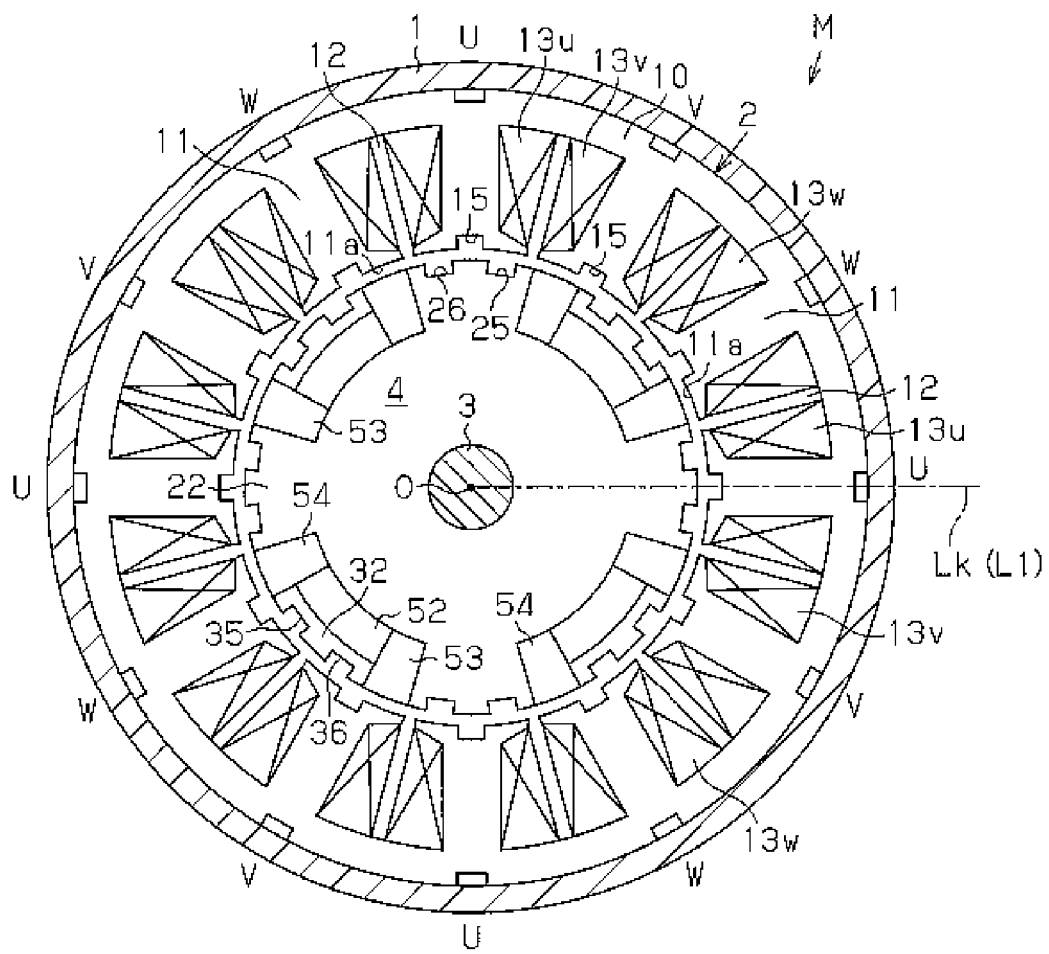
FIG. 53 is a cross-sectional view of a brushless motor as viewed in the axial direction illustrating another example of the ninth embodiment.
Figure 54A:
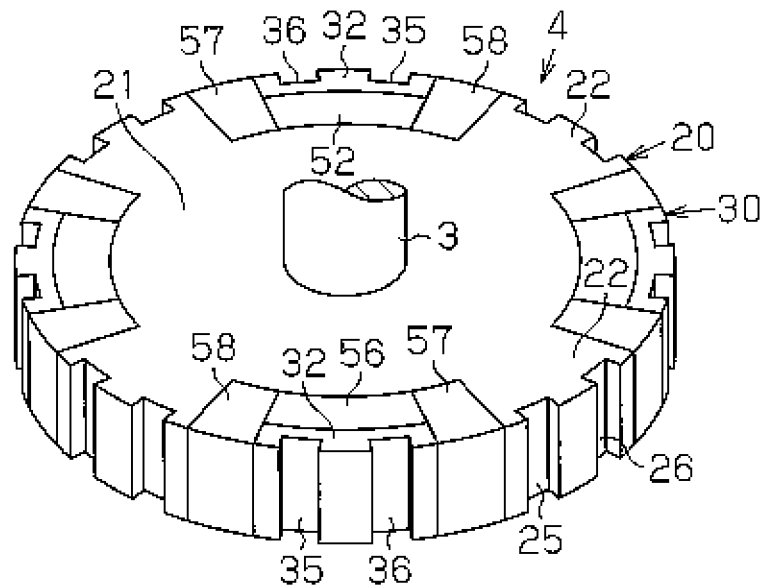
FIG. 54A is a perspective view of the rotor of FIG. 53 as viewed from a first rotor core side.
Figure 54B:
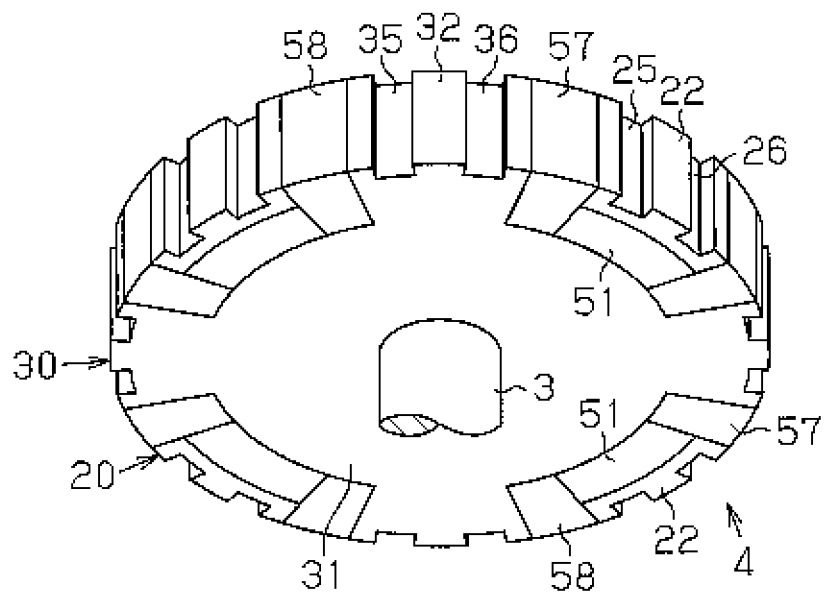
FIG. 54B is a perspective view of the rotor of FIG. 53 as viewed from a second rotor core side.

As shown in FIGS. 53 to 54B regarding the brushless motor M shown in the ninth embodiment, the first and second backside auxiliary magnets 55, 56 may respectively be provided on the radially inner surfaces f1d, f2d of the first and second magnetic pole portions 24, and the first and second interpolar auxiliary magnets 57, 58 may be arranged respectively between the first claw magnetic poles 22 and the second claw magnetic poles 32 in the circumferential direction.

More specifically, as shown in FIG. 54B, each first backside auxiliary magnet 55 is arranged on a radially inner surface f1d of the first magnetic pole portion 24, in a space defined by an outer circumferential surface 31c of the second core base 31, an outer circumferential surface 40c of the field magnet 40, and a surface of the first base portion 23 on a second rotor core 30 side. Further, as shown in FIG. 54A, each first backside auxiliary magnet 55 is arranged on a radially inner surface f2d of the second magnetic pole portion 34, in a space defined by an outer circumferential surface 21c of the first core base 21, the outer circumferential surface 40c of the field magnet 40, and a surface of the second base portion 33 on a first rotor core 20 side.

Further, in the first backside auxiliary magnet 55, in order to reduce leaking magnetic flux at that portion, a portion contact with the radially inner surface f1d of the first claw magnetic pole 22 (first magnetic pole portion 24) is magnetized as the N pole same as the first claw magnetic pole 22, and a portion contact with the second core base 31 is magnetized as the S pole same as the second core base 31. Further, in the second backside auxiliary magnet 56, in order to reduce leaking magnetic flux at that portion, a portion contact with the radially inner surface f2d of the second claw magnetic pole 32 (second magnetic pole portion 34) is magnetized as the S pole same as the second claw magnetic pole 32, and a portion contact with the first core base 21 is magnetized as the N pole same as the first core base 21.

As shown in FIGS. 54A, 54B, the first interpolar auxiliary magnet 57 is arranged between a flat surface formed by one circumferential end surface 22a of the first claw magnetic pole 22 and a circumferential end surface of the first backside auxiliary magnet 55, and a flat surface formed by the other circumferential end surface 32b of the second claw magnetic pole 32 and a circumferential end surface of the second backside auxiliary magnet 56. Further, the second interpolar auxiliary magnet 58 is arranged between a flat surface formed by the other circumferential end surface 22b of the first claw magnetic pole 22 and a circumferential end surface of the first backside auxiliary magnet 55, and a flat surface formed by one circumferential end surface 32a of the second claw magnetic pole 32 and a circumferential end surface of the second backside auxiliary magnet 56.

Further, the first and second interpolar auxiliary magnets 57, 58 are magnetized in the circumferential direction so as to be of the same polarities as the first and second claw magnetic poles 22, 32 respectively (portion on the first claw magnetic pole 22 side becomes the N pole, and portion on the second claw magnetic pole 32 side becomes the S pole).

Thus, in the brushless motor M shown in FIG. 53 to FIG. 54B, since an amount of the magnetic flux is increased by providing the first and second backside auxiliary magnets 55, 56 and the first and second interpolar auxiliary magnets 57, 58, the detent torque can be increased, and the retaining force of the brushless motor M in a stationary state can be increased.

In the eighth and ninth embodiments, the brushless motor M is of eight poles and twelve slots. The brushless motor may be of 2N-pole and 3N-slot type (here, N is an integer), for example, a brushless motor of ten poles and fifteen slots and the like.

A tenth embodiment of the present invention will now be described with reference to FIG. 55 to FIG. 59B.

Figure 55:
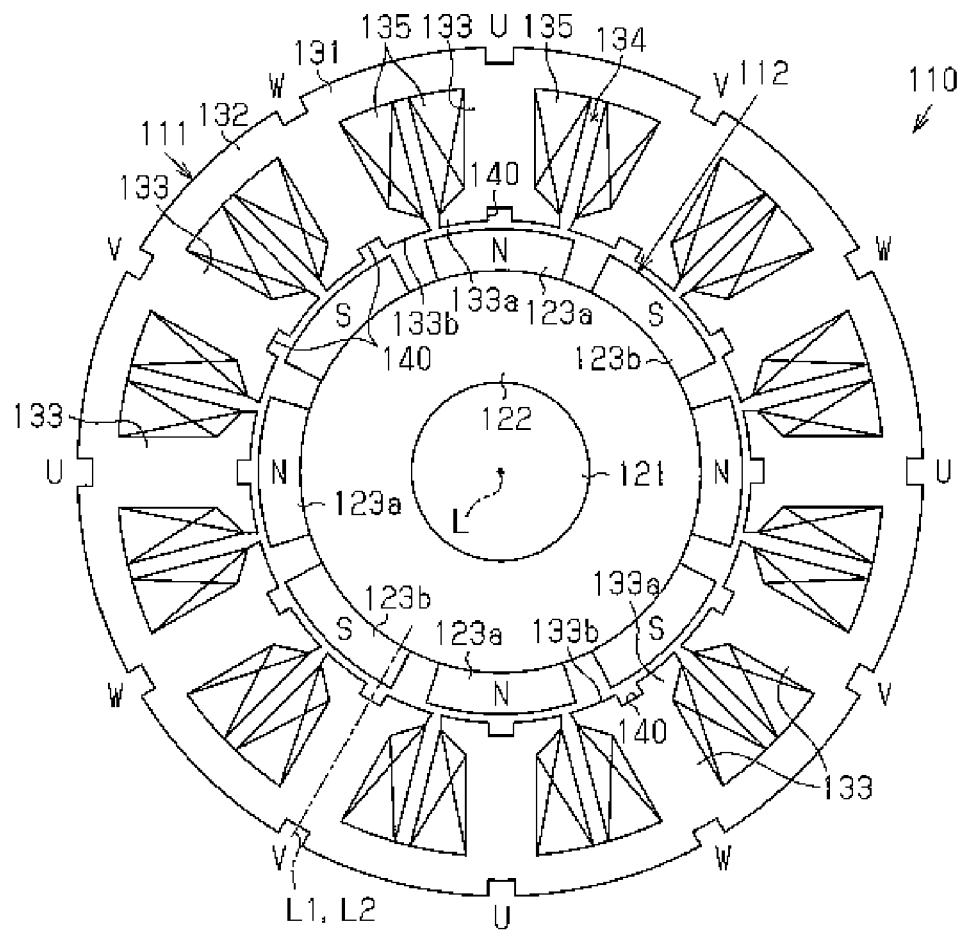
FIG. 55 is a plan view of a motor according to a tenth embodiment of the present invention.

As shown in FIG. 55, a motor 110 of the present embodiment is configured to have a rotor 112 arranged on a radially inner side of a substantially ring-shaped stator 111.

As shown in FIG. 55, the rotor 112 includes a substantially ring-shaped rotor core 122 configured of a magnetic metal material and fixed to an outer circumferential surface of a rotation shaft 121 rotatably supported by bearings that are not shown, for example. On an outer circumferential portion of the rotor core 122, magnets 123a magnetized so that a portion on the radially outer side becomes an N pole and magnets 123b magnetized so that a portion on the radially outer side becomes an S pole are alternately arranged in a circumferential direction. The plurality of magnets 123a, 123b has a substantially constant circumferential width, and is arranged on the outer circumferential portion of the rotor core 122 at a constant interval in the circumferential direction. Four each of the magnets 123a, 123b are provided. Thus, the rotor 112 of the present embodiment has a total of eight magnetic poles (pole number).

As shown in FIG. 55, a stator core 131 of the stator 111 includes twelve teeth 133 that extend in a radial direction from a ring portion 132. Accordingly, the number of slots 134 formed between the teeth 133 is also twelve. That is, the motor 110 of the present embodiment is configured so as to have the pole number of the rotor 112 of 2n (note that n is a natural number, and is four in the present embodiment), and the number of the slots 134 (slot number) of 3n, by which a ratio of the pole number and the slot number becomes 2:3.

As shown in FIG. 55, the teeth 133 are formed at equal intervals in the circumferential direction, and each teeth 133 has coils 135 of U-phase, V-phase, and W-phase wound thereon by concentrated winding. Protruding portions 133a that respectively protrude in both sides in the radial direction are formed at a distal end side of each of the teeth 133, and a distal end surface 133b (radially inner surface) of each of the teeth 133 has an arc shape with an axis line L of the motor 110 as a center. In addition, the distal end surface 133b of each of the teeth 133 extends from one of the protruding portions 133a to the other of the protruding portions 133a. The distal end surface 133b functions as both a distal end portion and a distal end surface.

As shown in FIG. 55, a teeth-side groove section 140 is formed on the distal end surface 133b of each of the teeth 133. The teeth-side groove section 140 has a concave shape in the radial direction, and extends continuously along an axial direction (direction along which the axis line L1 extends). Each of the teeth-side groove sections 140 is formed in a substantially same shape and at an identical position in the circumferential direction, as the corresponding one of the teeth 133.

Figure 56:
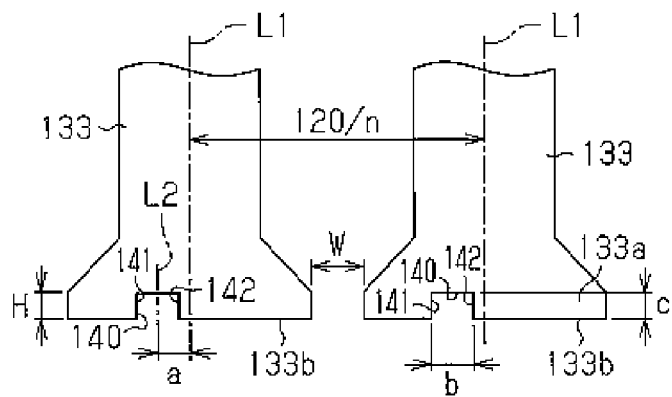
FIG. 56 is a schematic diagram illustrating teeth of FIG. 55.

As shown in FIG. 56, the teeth-side groove sections 140 are set to satisfy −24/n≤a≤24/n, assuming that an angle formed by a center line L1 of each of the teeth 133 in the circumferential direction and a center line L2 of the teeth-side groove section 140 in the circumferential direction is) a(°). Here, since the n is 4 (n=the pole number/2 or n=the slot number/3), the teeth-side groove sections 140 are provided to satisfy −6≤a≤6. More preferably, the teeth-side groove sections 140 are formed so that the center lines L2 in the circumferential direction that are the centers of the teeth-side groove sections 140 in the circumferential direction conform to the center lines L1 in the circumferential direction of the teeth, that is, at the centers of the teeth in the circumferential direction. By configuring as above, the teeth 133 of the present embodiment are configured to be axially symmetric relative to the center lines L1 in the circumferential direction.

Further, each teeth-side groove section 140 includes a pair of side surface portions 141, 142 which are opposed to each other in the circumferential direction. Assuming that a length between the side surface portion 141 on one side and the side surface portion 142 on the other side of the teeth-side groove section 140 (a circumferential width of the teeth-side groove section 140) is b, and an opening width of the slot 134 is W, the teeth-side groove section 140 is provided to satisfy 1.5≤b/W≤2.0. The opening width W of the slot 134 refers to a length in the circumferential direction between adjacent ones of protruding portions 133a in the circumferential direction, among the teeth 133 that are adjacent in the circumferential direction.

Further, the teeth-side groove section 140 is provided to satisfy 0.0<c/H≤0.25, assuming that a radial length thereof (depth of the teeth-side groove section 140) is c, and a radial length (thickness) of the protruding portions 133a as the distal end portion of the teeth 133 is H.

Next, the operation of the motor 110 will be described.

Figure 57A:
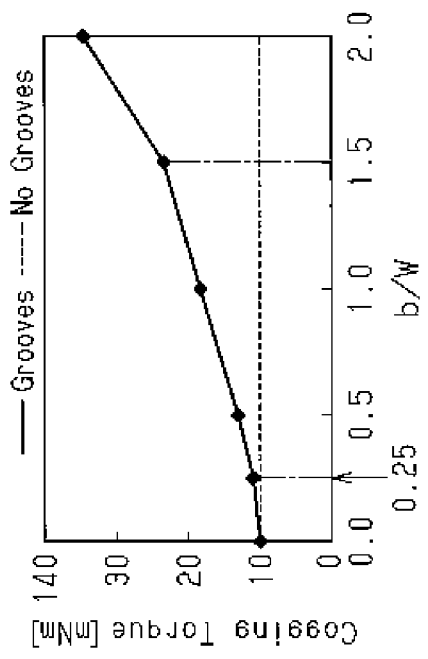
FIG. 57A is a diagram illustrating a change in cogging torque caused by a difference in groove section forming positions relative to the teeth of FIG. 55.
Figure 57B:
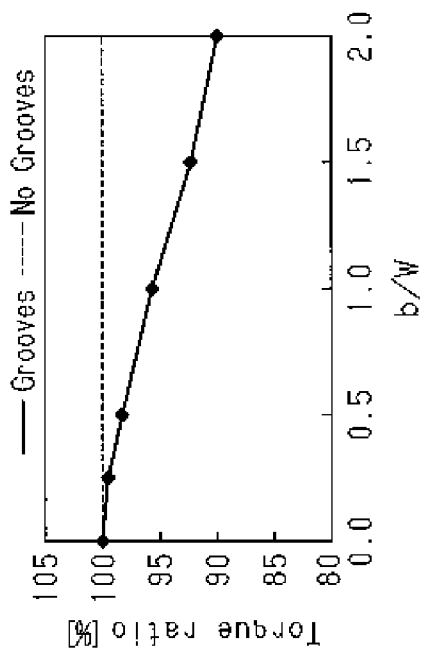
FIG. 57B is a diagram illustrating a change in torque ratio caused by the difference in the groove section forming positions relative to the teeth of FIG. 55.

Here, a change in cogging torque caused by a difference in groove section forming position relative to the teeth is shown in FIG. 57A, and a change in a torque ratio caused by the difference in the groove section forming position relative to the teeth is shown in FIG. 57B. In FIGS. 57A and 57B, a bold line shows a case "grooves" in which the teeth-side groove sections 140 are formed on the teeth 133, and a broken line shows a case "no grooves" in which the teeth-side groove sections 140 are not formed on the teeth 133. Here, the teeth-side groove sections 140 in the case "grooves" are configured to satisfy b/W=0.75, and c/H=0.5.

As shown in FIG. 57A, by forming the teeth-side groove sections 140 to satisfy −6≤a≤6, the cogging torque increases compared to the case without the teeth-side groove sections 140. Especially, in the case of a=0, the cogging torque is increased the most.

Further, as shown in FIG. 57B, assuming that the torque ratio in the case without the teeth-side groove sections 140 is 100%, the teeth-side groove sections 140 formed to satisfy −6≤a≤6 as described above slightly decreases the torque ratio, but can ensure the torque ratio of about 95% or more.

Figure 58A:
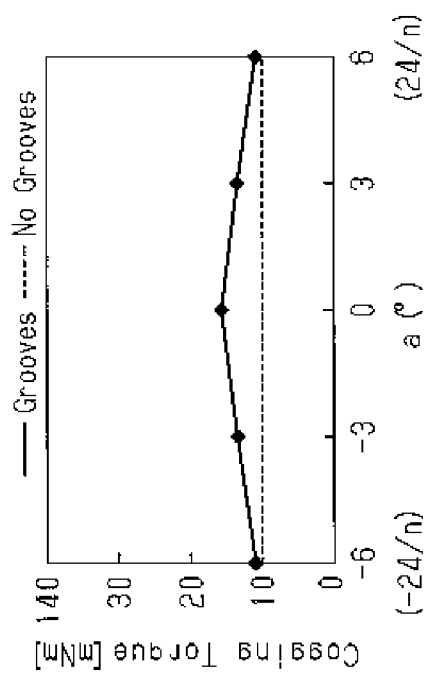
FIG. 58A is a diagram illustrating a change in the cogging torque caused by a difference in a circumferential width of groove sections of FIG. 55.
Figure 58B:
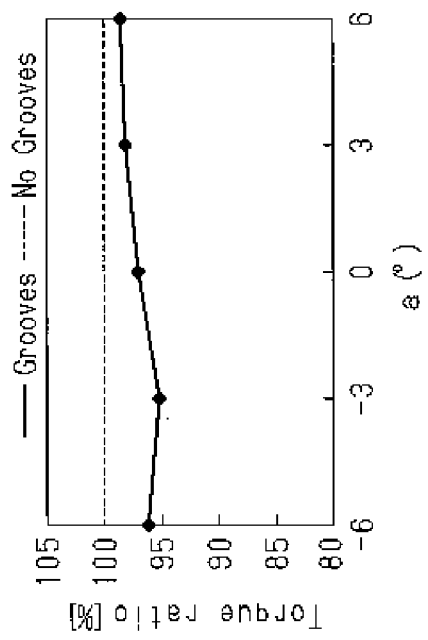
FIG. 58B is a diagram illustrating a change in the torque ratio caused by a difference in a circumferential length (width) of the groove sections of FIG. 55.

Here, a change in the cogging torque caused by a difference in the circumferential width of the groove sections is shown in FIG. 58A, and a change in the torque ratio caused by the difference in the circumferential width of the groove sections is shown in FIG. 58B. In FIGS. 58A and 58B, a bold line shows the case "grooves" in which the teeth-side groove sections 140 are formed on the teeth 133, and a broken line show a case "no grooves" in which the teeth-side groove sections 140 are not formed. Here, the teeth-side groove sections 140 in the case "grooves" are configured to satisfy a=0, and c/H=0.5.

As shown in FIG. 58A, by forming the teeth-side groove sections 140 to satisfy 0<b/W≤2.0, the cogging torque increases compared to the case without the teeth-side groove sections 140. Further, by forming the teeth-side groove sections 140 to satisfy 0.25≤b/W≤2.0, even higher cogging torque can be obtained. Especially, in a range of 1.5≤b/W≤2.0, an increased amount of the cogging torque relative to a changed amount of b/W is prominent, thus, high contribution to the increase in the cogging torque is obtained by forming the teeth-side groove sections 140 in the range of 1.5≤b/W≤2.0.

Further, as shown in FIG. 58B, assuming that the torque ratio in the case without the teeth-side groove sections 140 is 100%, the teeth-side groove sections 140 formed to satisfy 0<b/W≤2.0 as described above decreases the torque ratio slightly, but can ensure the torque ratio of about 90% or more. Further, in the range of 1.5≤b/W≤2.0, a decrease rate of the torque ratio relative to the changed amount of b/W is small.

Figure 59A:
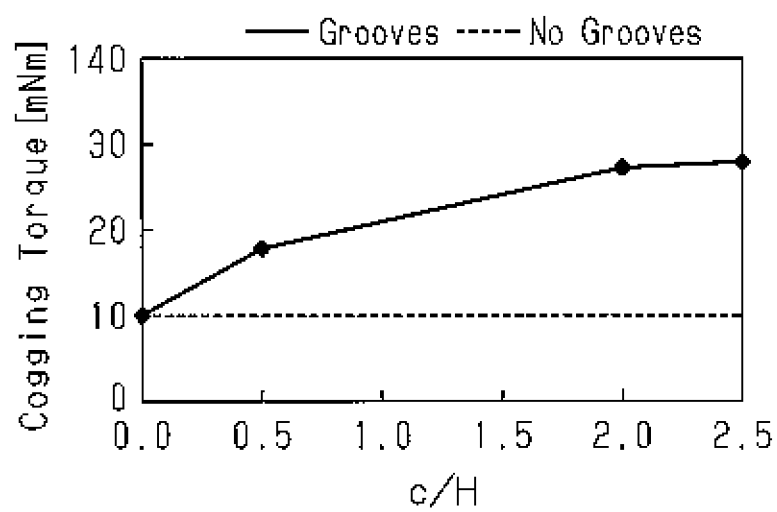
FIG. 59A is a diagram illustrating a change in the cogging torque caused by a difference in a radial length (depth) of the groove sections of FIG. 55.
Figure 59B:
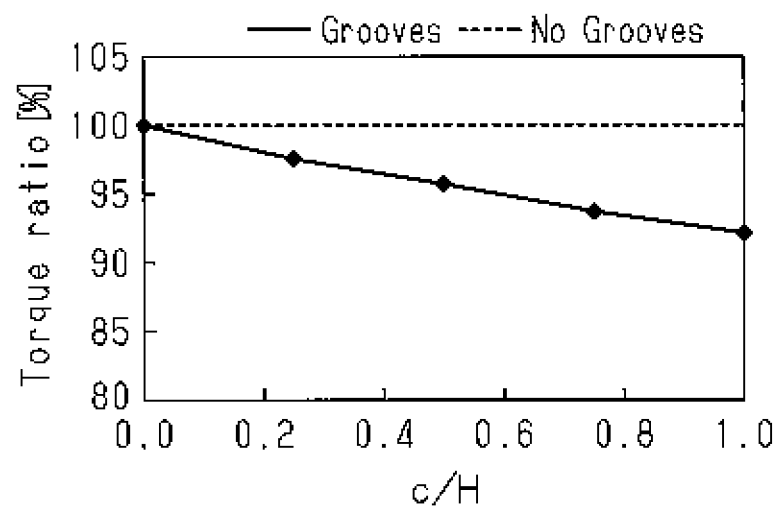
FIG. 59B is a diagram illustrating a change in the torque ratio caused by a difference in a radial length (depth) of the groove sections of FIG. 55.

Here, a change in the cogging torque caused by a difference in the radial length (depth) of the groove sections is shown in FIG. 59A, and a change in the torque ratio caused by the difference in the radial length (depth) of the groove sections is shown in FIG. 59B. In FIGS. 59A and 59B, a bold line shows the case "grooves" in which the teeth-side groove sections 140 are formed on the teeth 133, and a broken line shows the case "no grooves" in which the teeth-side groove sections 140 are not formed on the teeth 133. Notably, the teeth-side groove sections 140 in the case "grooves" are configured to satisfy a=0, and b/W=1.0.

As shown in FIG. 59A, by forming the teeth-side groove sections 140 to satisfy 0.0<c/H≤2.5, the cogging torque increases compared to the case without the teeth-side groove sections 140. Especially, in a range of 0.0<c/H≤2.0, the increased amount of the cogging torque relative to a changed amount of c/H is prominent, thus, the increased amount of the cogging torque relative to the changed amount of c/H is suppressed to the range of 2.0<c/H≤2.5. Thus, by forming the teeth-side groove sections 140 to satisfy 0.0<c/H≤2.0, a high contribution to the increase in the cogging torque is obtained. As shown in FIG. 59B, assuming that the torque ratio in the case without the teeth-side groove sections 140 is 100%, the teeth-side groove sections 140 formed to satisfy 0.0<c/H≤1.0 decreases the torque ratio slightly, but can ensure the torque ratio of about 90% or more. Further, in the range of 0.0<c/H≤0.25, the decrease rate of the torque ratio relative to the changed amount of c/H is small.

The tenth embodiment has the following advantages in addition to advantage (1) of the first embodiment.

(27) In the motor 110 configured so that the ratio of the pole number and the slot number becomes 2:3, the cogging torque can be increased as shown in FIG. 57A to FIG. 59B by forming the teeth-side groove sections 140 at the substantial centers in the circumferential direction on the distal end portions of the teeth 133 (more specifically, the distal end surfaces 133b as the distal end surfaces). Thus, the retaining force of the rotor 112 can be increased.

(28) The cogging torque can be increased as shown in FIG. 57A by setting the range of the above-described substantial centers in the circumferential direction in the range of −24/n≤a≤24/n (range of −24/6≤a≤24/6), and the retaining force of the rotor 112 can be increased. As shown in FIG. 57A, the cogging torque can further be increased by forming the teeth-side groove sections 140 at the positions that satisfies the angle a=0, that is, at the centers of the teeth 133 in the circumferential direction, and the retaining force of the rotor 112 can further be increased.

(29) As shown in 58A, contribution can be made to increasing the cogging torque by forming the teeth-side groove sections 140 to satisfy 0.25≤b/W≤2.0, and the retaining force of the rotor 112 can be increased.

(30) The teeth-side groove sections 140 are formed to satisfy 1.5≤b/W≤2.0. Since this range highly contributes to increasing the cogging torque as shown in FIG. 58A, the cogging torque can more preferably be increased and the retaining force of the rotor can be increased.

(31) As shown in FIG. 59A, contribution can be made to increasing the cogging torque by forming the teeth-side groove sections 140 to satisfy 0.0<c/H≤2.0, and the retaining force of the rotor 112 can be increased.

In addition, the tenth embodiment may be changed as follows.

In the tenth embodiment, although the motor 110 is configured such that the pole number of the rotor 112 is eight and the slot number of the stator 111 is twelve, no limitation is made hereto. So long as the ratio of the pole number and the slot number is 2:3, the pole number of the rotor 112 and the slot number of the stator 111 may suitably be changed.

In the tenth embodiment, although the teeth-side groove sections 140 formed on the stator 111 are configured such that the angle a formed by the center lines L2 of the groove sections 140 in the circumferential direction and the center lines L1 of the teeth 133 in the circumferential direction becomes 0 degree, the teeth-side groove sections 140 may suitably be changed within the range of −24/n≤a≤24/n.

In the tenth embodiment, although the teeth-side groove sections 140 formed on the stator 111 are formed to satisfy 1.5≤b/W≤2.0 assuming that the circumferential width of the groove sections is b and the opening width of the slots is W, a change may suitably be made in the range of 0.25≤b/W≤2.0 or in the range of 0<b/W≤2.0.

In the tenth embodiment, although the motor of the configuration having a so-called full magnet type rotor that the N pole magnets 123a and the S pole magnets 123b are alternately arranged in the circumferential direction, no limitation is made hereto.

Figures 60, 61:
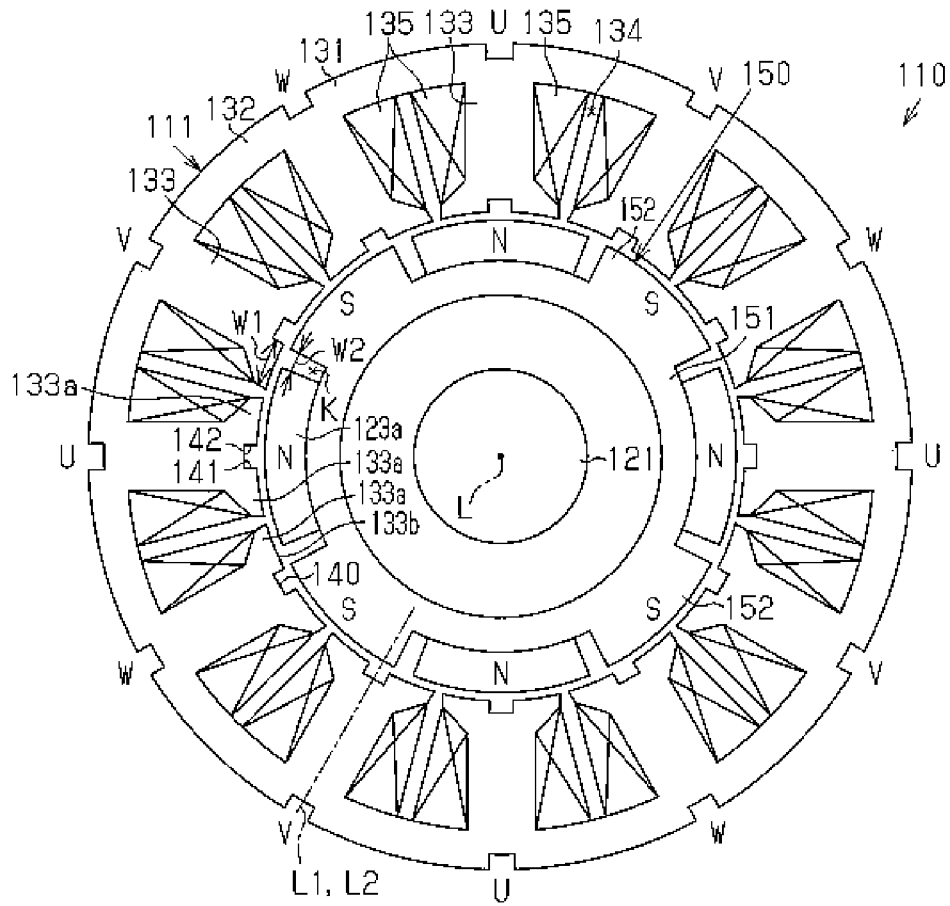
FIG. 60 is a plan view of a motor in another example of the tenth embodiment.
FIG. 61 is a perspective view of a rotor of FIG. 60.

For example, as shown in FIG. 60, the present invention may be adapted to a motor having a rotor of a so-called consequent-pole type (half magnet type), which uses salient poles of a rotor core arranged between magnets with spaces (gaps) as a substitute for magnets. As shown in FIG. 60, in a rotor 150 of this configuration, four N pole magnets 123a are arranged at equal intervals in a circumferential direction on an outer circumferential portion of a rotor core 151, and salient poles 152 integrally formed on the outer circumferential portion of the rotor core 151 are arranged between the magnets 123a with a space K. That is, each of the magnets 123a and the salient poles 152 is arranged alternately at an equal angular interval, and the rotor 150 is of the so-called consequent-pole type with eight magnetic poles, which causes the salient poles 152 to function as S poles relative to the N pole magnets 132a. Here, each space K is formed such that its circumferential width W2 is equal to or less than a distance W1 in the circumferential direction between one of protruding portions 133a of the teeth 133 and closer one of side surface portions 141, 142 of teeth-side groove section 140 to the aforementioned protruding portion 133a in the circumferential direction. Further, if one of the spaces K is arranged so as to overlap with a portion having the distance W1 when seen in a radial direction, other spaces K are also arranged so as to overlap with portions having the distance W1 when seen in the radial direction.

For example, a so-called permanent magnet field Lundell type rotor that includes a combination of rotor cores having a plurality of claw magnetic poles in the circumferential direction, and between the rotor cores, an annular magnet as a field magnet is arranged to cause respective claw magnetic poles to alternately function as different magnetic poles may be employed.

Figure 62:
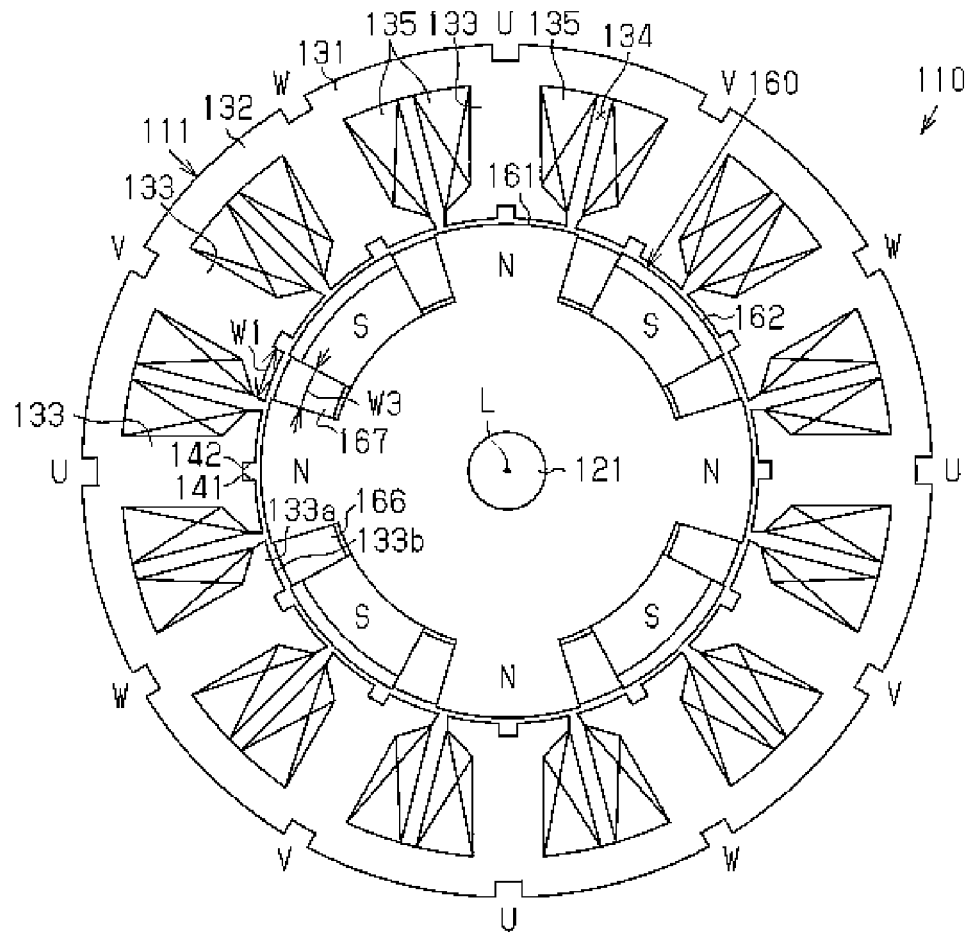
FIG. 62 is a plan view of a motor provided with the rotor of FIG. 61.
Figure 63:
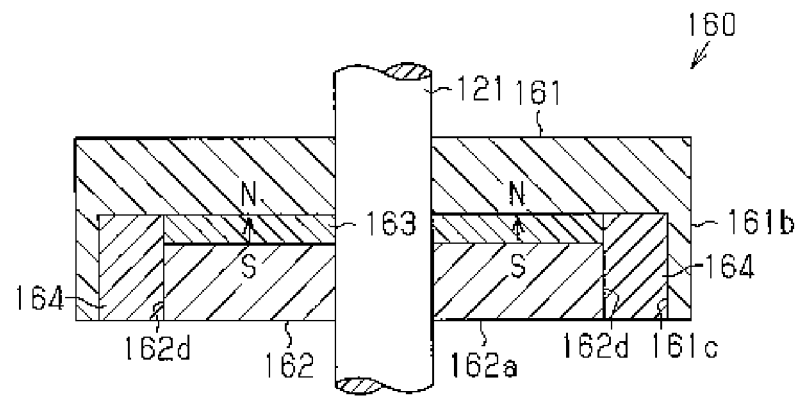
FIG. 63 is a cross-sectional view of the rotor of FIG. 62.

As shown in FIG. 61 to FIG. 63, a rotor 160 of this configuration includes first and second rotor cores 161, 162, an annular magnet 163 as a field magnet, backside auxiliary magnets 164, 165, and interpolar magnets 166, 167.

The first rotor core 161 includes a substantially disk-shaped first core base 161a, and a plurality (five in the present embodiment) of first claw magnetic poles 161b arranged at equal intervals on an outer circumferential portion of the first core base 161a. The first claw magnetic poles 161b are formed to protrude to a radially outer side and extend in an axial direction.

The second rotor core 162 has an identical shape as the first rotor core 161, and includes a substantially disk-shaped second core base 162a, and a plurality of plurality of second claw magnetic poles 162b arranged at equal intervals on an outer circumferential portion of the second core base 162a. The second claw magnetic poles 162b are formed to protrude to the radially outer side and extend in the axial direction. Further, the second rotor core 162 is assembled onto the first rotor core 161 such that each second claw magnetic pole 162b is arranged between corresponding ones of the first claw magnetic poles 161b, and the annular magnet 163 (refer to FIG. 58) is arranged (sandwiched) between the first core base 161a and the second core base 162a in the axial direction.

As shown in FIG. 63, the annular magnet 163 has its outer diameter set to be identical to an outer diameter of the first and second core bases 161a, 162a, and is magnetized in the axial direction so as to cause the first claw magnetic poles 161b to function as first magnetic poles (N poles in the present embodiment), and the second claw magnetic poles 162b to function as second magnetic poles (S poles in the present embodiment). Accordingly, the rotor 160 of this configuration is a so-called Lundell type structured rotor that uses the annular magnet 163 as the field magnet. The rotor 160 has the first claw magnetic poles 161b as the N poles and the second claw magnetic poles 162b as the S poles arranged alternately in the circumferential direction, and as a result, the number of magnetic poles is eight poles (the number of pole pairs is four) like the above embodiment.

As shown in FIG. 63, the backside auxiliary magnet 164 is arranged between a back surface 161c (radially inner surface) of each of the first claw magnetic poles 161b and an outer circumferential surface 162d of the second core base 162a. Each backside auxiliary magnet 164 has a cross-section of a substantially sector shape in a direction orthogonal to the axial direction, and a portion on the side contact with the back surface 161c of the first claw magnetic pole 161b is magnetized to an N pole same as the first claw magnetic pole 161b, and a portion on the side contact with the outer circumferential surface 162d of the second core base 162a is magnetized to an S pole same as the second core base 162a.

Further, the backside auxiliary magnet 165 is arranged between a back surface 162c of each of the second claw magnetic poles 162b and an outer circumferential surface 161d of the first core base 161a, similar to the first claw magnetic poles 161b. Each backside auxiliary magnet 165 has a cross-section of a sector shape in a direction orthogonal to the axial direction, and a portion on the side contact with the back surface 162c is magnetized to an S pole, and a portion on the side contact with the outer circumferential surface 161d of the first core base 161a is magnetized to an N pole. As the backside auxiliary magnets 164, 165, for example, ferrite magnets may be used.

As shown in FIG. 61, the interpolar magnets 166, 167 are arranged between the first claw magnetic poles 161b and the second claw magnetic poles 162b in the circumferential direction.

Further, the interpolar magnets 166, 167 are formed such that their circumferential width W3 is equal to or less than a distance W1 in the circumferential direction between one of protruding portions 133a of the teeth 133 and closer one of side surface portions 141, 142 of teeth-side groove section 140 to the aforementioned protruding portion 133a in the circumferential direction.

The invention claimed is:

1. A motor comprising:
 a rotation shaft;
 a rotor including
 a first rotor core that includes a first core base, which is fixed to the rotation shaft, and a plurality of first claw magnetic pole portions, which are arranged at equal intervals on an outer circumferential portion of the first core base and extend in an axial direction from the outer circumferential portion,
 a second rotor core that includes a second core base, which is fixed to the rotation shaft, and a plurality of second claw magnetic pole portions, which are provided at equal intervals on an outer circumferential portion of the second core base and extend in the axial direction from the outer circumferential portion, wherein each of the second claw magnetic pole portions is arranged between the first claw magnetic pole portions that are adjacent to each other in a circumferential direction, and a field magnet arranged between the first core base and the second core base, wherein the field magnet is magnetized along the axial direction so that the first claw magnetic pole portions function as first magnetic poles and the second claw magnetic pole portions function as second magnetic poles; and
 a stator including
 a stator core arranged at an outer side of the rotor and including a plurality of teeth arranged at equal intervals along the circumferential direction, wherein radially inner surfaces of the plurality of teeth face radially outer surfaces of the first and second claw magnetic poles, and
 a coil wound around each of the teeth, wherein the coil generates a rotating magnetic field when supplied with power,
 wherein at least either the radially outer surfaces of the first claw magnetic pole portions and the second claw magnetic pole portions or the radially inner surfaces of the teeth each have a cross-sectional shape in a direction orthogonal to the axial direction that is not concentric to a circle of which center is an axis of the rotation shaft.

2. The motor according to claim 1, further comprising:
 an interpolar auxiliary magnet arranged between ones of the first claw magnetic pole portions and the second claw magnetic pole portions that are adjacent to each other in the circumferential direction; and
 a backside auxiliary magnet arranged at a radially inner side of each of the first claw magnetic pole portions and the second claw magnetic pole portions.

3. The motor according to claim 1, wherein the radially outer surface of each of the first claw magnetic pole portions and the second claw magnetic pole portions has a cross-sectional shape in the direction orthogonal to the axial direction with a bulging shape that protrudes more radially outward as a central position becomes closer.

4. The motor according to claim 3, wherein the radially outer surfaces of the first claw magnetic pole portions and the second claw magnetic pole portions each include a plurality of flat surfaces extending along the axial direction.

5. The motor according to claim 1, wherein
 the first claw magnetic poles and the second claw magnetic poles each include an auxiliary groove,
 the auxiliary groove extends along the axial direction on the radially outer surface of each of the first claw magnetic poles and the second claw magnetic poles, and
 the cross-sectional shape in the direction orthogonal to the axial direction of the radially outer surface of each of the first claw magnetic poles and the second claw magnetic poles is not concentric with a circle of which center is the axis of the rotation shaft.

6. The motor according to claim 1, wherein
 the first claw magnetic pole portions and the second claw magnetic pole portions each include a first auxiliary groove and a second auxiliary groove, and
 the first auxiliary groove and the second auxiliary groove extend along the axial direction at two circumferential positions respectively separated by one-half of a cycle of a cogging torque toward two circumferential sides from a circumferentially central position of each of the radially outer surfaces of the first claw magnetic pole portions and the second claw magnetic pole portions.

7. The motor according to claim 5, wherein the first auxiliary groove and the second auxiliary groove extending along the axial direction are each located at two sides of each of the first claw magnetic pole portions and the second claw magnetic pole portions.

8. The motor according to claim 5, wherein the first auxiliary groove and the second auxiliary groove extending along the axial direction are located in a central section of each of the first claw magnetic pole portions and the second claw magnetic pole portions.

9. The motor according to claim 1, wherein
the first claw magnetic pole portions and the second claw magnetic pole portions each include a first auxiliary groove and a second auxiliary groove, and
the first auxiliary groove and the second auxiliary groove extend along the axial direction at positions deviated from two circumferential positions respectively separated by one-half of a cycle of a cogging torque toward two circumferential sides from a circumferentially central position of each of the radially outer surfaces of the first claw magnetic pole portions and the second claw magnetic pole portions.

10. The motor according to claim 9, wherein the first auxiliary groove and the second auxiliary groove extending along the axial direction are each located at two sides of each of the first claw magnetic pole portions and the second claw magnetic pole portions.

11. The motor according to claim 9, wherein the first auxiliary groove and the second auxiliary groove extending along the axial direction are located at a central section of each of the first claw magnetic pole portions and the second claw magnetic pole portions.

12. The motor according to claim 9, wherein the positions deviated from two circumferential positions respectively separated by one-half of a cycle of a cogging torque toward two circumferential sides from the circumferentially central position are symmetric positions separated toward two sides in the circumferential direction from the position separated by one-half of the cycle of the cogging torque.

13. The motor according to claim 1, wherein
each tooth includes an auxiliary groove,
the auxiliary groove extends along the axial direction in the radially inner surface of the tooth, and
the radially inner surface of the tooth has a cross-sectional shapes in a direction orthogonal to the axial direction that is not concentric to a circle of which center is the axis of the rotation shaft.

14. The motor according to claim 13, wherein
when a cycle of a cogging torque is $\phi$, a magnetic pole number of the rotor is Nr, and an angle between a center line from an axis of the rotation shaft intersecting a central position in the circumferential direction of the radially inner surface of each of the teeth and a straight line from a center line of the rotation shaft intersecting a circumferentially central position of the auxiliary groove is $\theta s$,
each of the auxiliary grooves is formed at a position deviated in the circumferential direction within a range of $-(360/\phi)/(Nr/2) \leq \theta s \leq (360/\phi)/(Nr/2)$.

15. The motor according to claim 14, wherein
each of the auxiliary grooves has a U-shaped cross-section in the direction orthogonal to the axial direction, and
the auxiliary groove is a single auxiliary groove that extends along the axial direction at the circumferentially central position of the radially inner surface.

16. The motor according to claim 1, wherein an outer diameter of each of the radially outer surfaces of the first claw magnetic pole portions and the second claw magnetic pole portions continuously decreases from a first end portion toward a second end portion in the circumferential direction.

17. The motor according to claim 16, wherein
when an air gap at the first end portion in the circumferential direction is $\alpha$, and an air gap at the second end portion in the circumferential direction is $\beta$,
the radially outer surfaces are configured to satisfy $1.0 < \alpha/\beta \leq 5.0$.

18. The motor according to claim 16, wherein the radially outer surfaces each have a curved cross-sectional shape in the direction orthogonal to the axial direction.

19. The motor according to claim 1, wherein the first claw magnetic pole portions and the second claw magnetic pole portions each have an outer diameter that decreases in a stepwise manner from a first end portion to a second end portion in the circumferential direction.

20. The motor according to claim 19, wherein
each of the radially outer surfaces includes two arcuate surfaces separated at a central position, and
an outer diameter of the arcuate surface closer to the second end portion in the circumferential direction than the central position is shorter than an outer diameter of the arcuate surface closer to the first end portion in the circumferential direction than the central position.

21. The motor according to claim 1, wherein when the pole number of the rotor is 2n and the slot number of the stator is 3n, a ratio of the pole number and the slot number is 2:3, where n is a natural number.

22. The motor according to claim 1, wherein when the pole number of the rotor is 2n and the slot number of the stator is 3n, a ratio of the pole number and the slot number is 2:3, where n is a natural number, and
each of the teeth includes a single auxiliary groove extending along an axial direction at a circumferentially central position in the radially inner surface.

23. A method for manufacturing the motor according to claim 6, the method comprising:
punching out and forming an insertion hole, into which the rotation shaft is inserted and fixed, the core bases, which are disk-shaped, and portions extending in the radial direction from the core bases;
forming the auxiliary grooves by elastically deforming one side surface of a portion extending in the radial direction from each of the core bases; and
axially bending the portion extending in the radial direction.

* * * * *